(12) United States Patent
Shimoshikiryoh et al.

(10) Patent No.: US 10,761,377 B2
(45) Date of Patent: Sep. 1, 2020

(54) LIQUID CRYSTAL PANEL

(71) Applicant: Sharp Kabushiki Kaisha, Sakai, Osaka (JP)

(72) Inventors: Fumikazu Shimoshikiryoh, Sakai (JP); Shinichi Terashita, Sakai (JP); Kouichi Watanabe, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 16/585,325

(22) Filed: Sep. 27, 2019

(65) Prior Publication Data

US 2020/0103713 A1    Apr. 2, 2020

Related U.S. Application Data

(60) Provisional application No. 62/738,108, filed on Sep. 28, 2018.

(51) Int. Cl.
*G02F 1/1337* (2006.01)
*G02F 1/1335* (2006.01)

(52) U.S. Cl.
CPC .. *G02F 1/133753* (2013.01); *G02F 1/133512* (2013.01)

(58) Field of Classification Search
CPC ................................. G02F 1/133753
See application file for complete search history.

(56) References Cited

U.S. PATENT DOCUMENTS

| | | | |
|---|---|---|---|
| 6,724,452 B1 | 4/2004 | Takeda et al. | |
| 2005/0162576 A1 | 7/2005 | Sasaki et al. | |
| 2006/0146243 A1 | 7/2006 | Nakanishi et al. | |
| 2015/0221267 A1* | 8/2015 | Yoshida | G09G 3/3614 345/694 |

FOREIGN PATENT DOCUMENTS

| | | |
|---|---|---|
| JP | 2947350 B2 | 9/1999 |
| JP | 2005-208309 A | 8/2005 |
| JP | 2006-189610 A | 7/2006 |

* cited by examiner

*Primary Examiner* — Edmond C Lau
(74) *Attorney, Agent, or Firm* — Keating & Bennett, LLP

(57) ABSTRACT

[Object] To suppress a decrease in transparency while maintaining an effect of improving viewing angles.
[Solution] Each of pixels (P) of a liquid crystal panel (100) includes a bright subpixel (BS) and a dark subpixel (DS). The bright subpixel (BS) includes four bright domains (BD) in which alignment directions of liquid crystal molecules (41) are different from one another. The dark subpixel (DS) includes two dark domains (DD) in which alignment directions of liquid crystal molecules (41) are different from each other.

13 Claims, 75 Drawing Sheets

FIG. 3
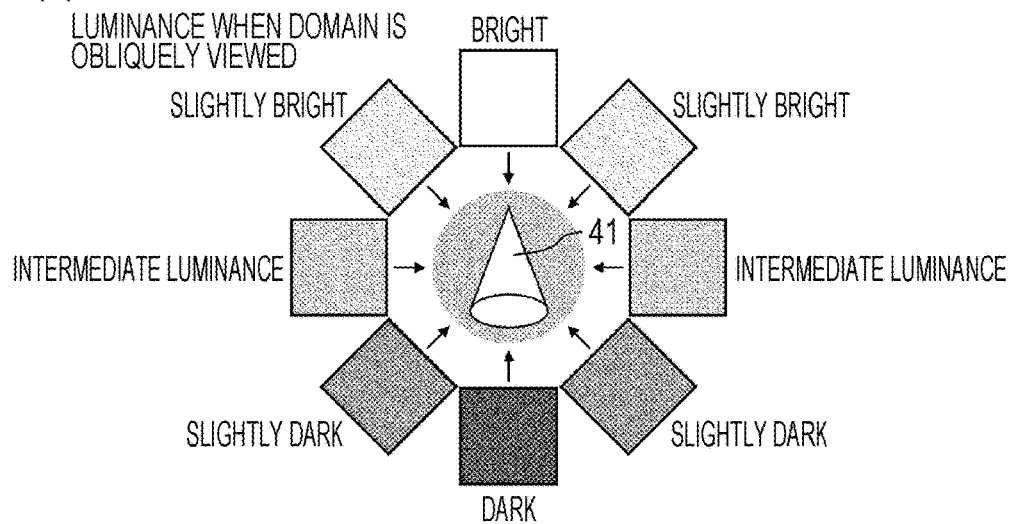
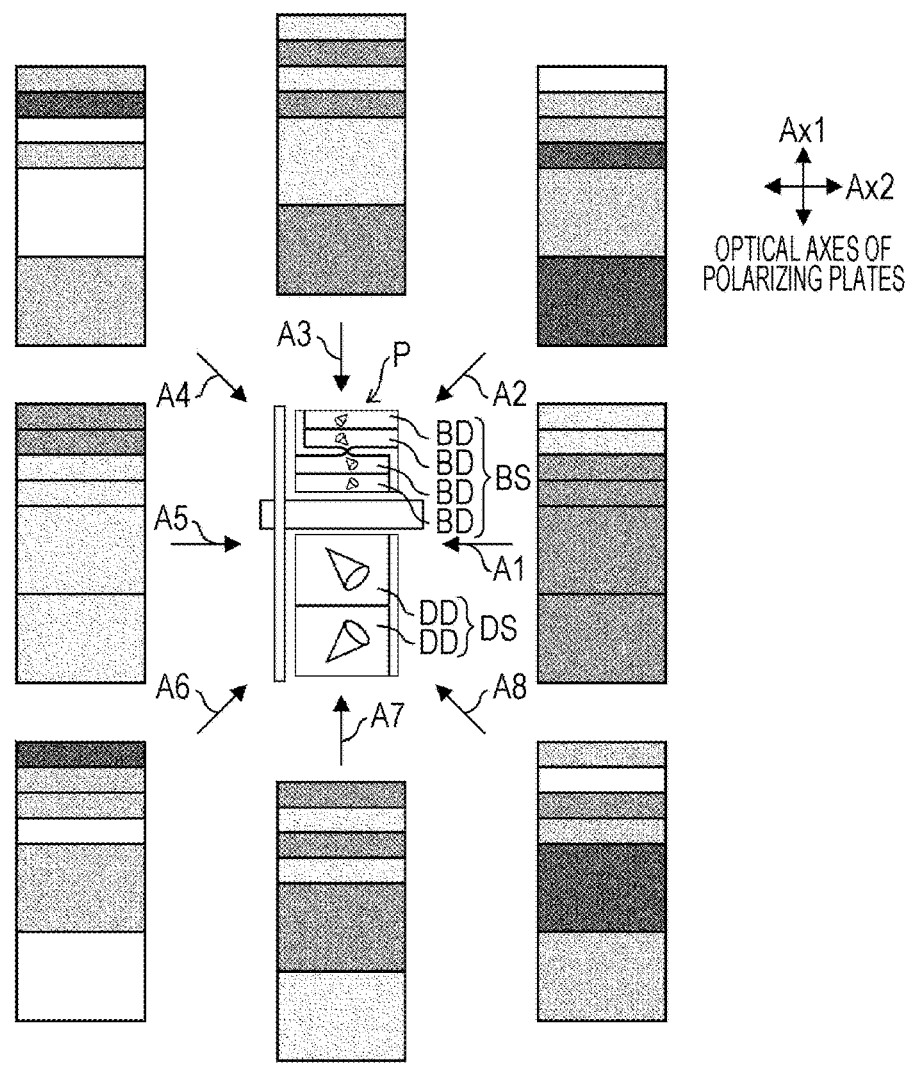

LOW TO INTERMEDIATE TONE

FIG. 11
II LOW TO INTERMEDIATE TONE 
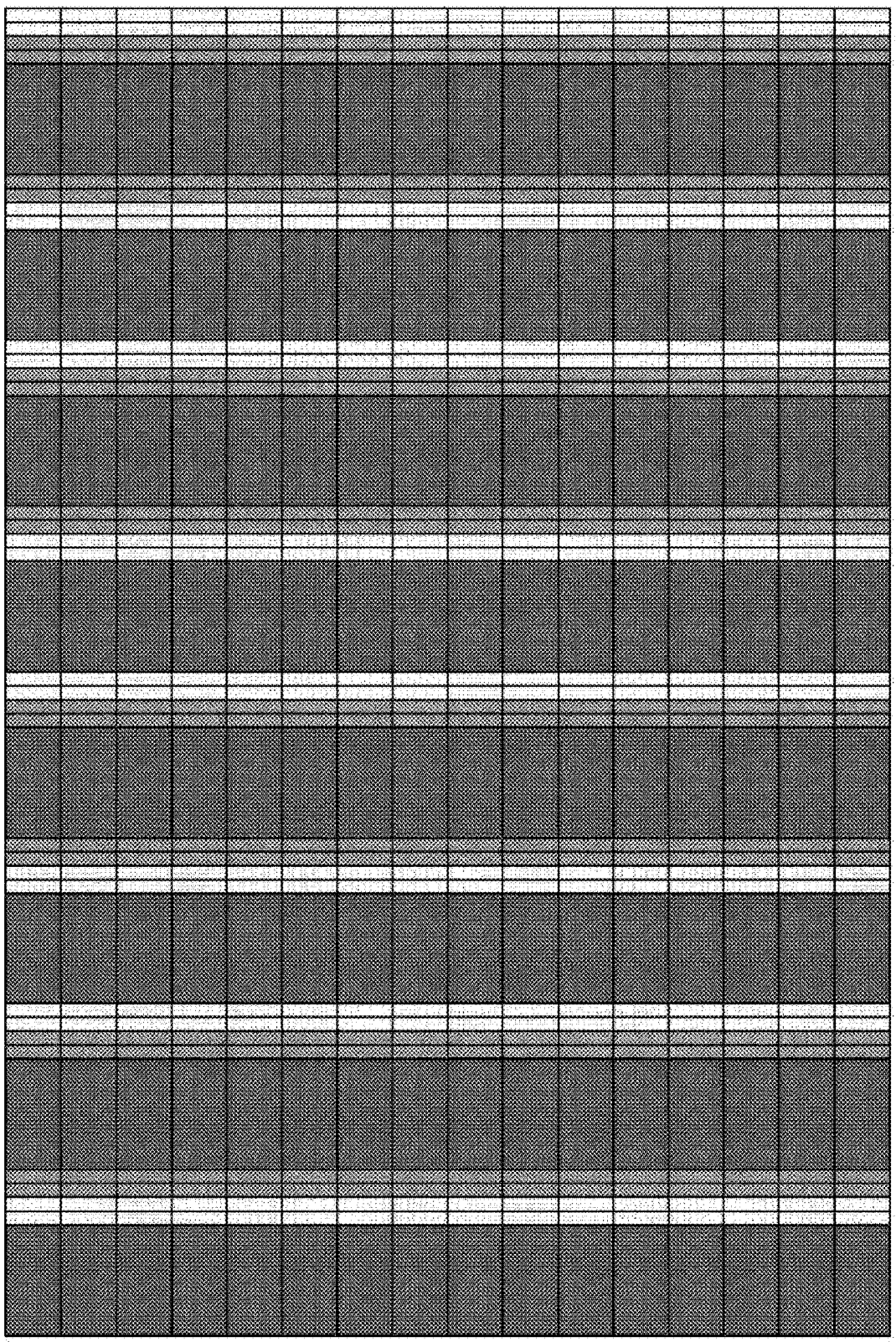

FIG. 12
II
LOW TO INTERMEDIATE TONE 
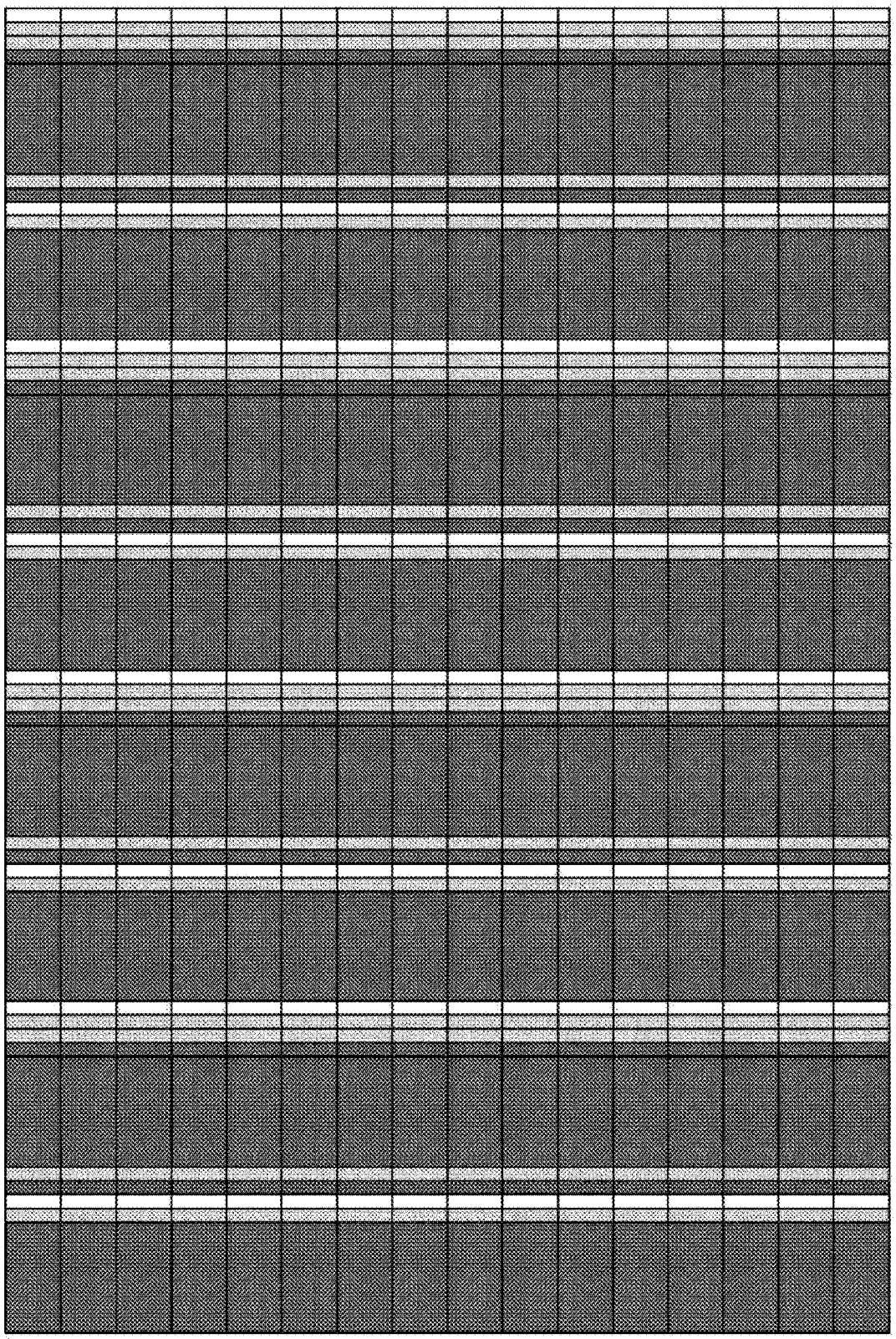

FIG. 14
II INTERMEDIATE TO HIGH TONE 
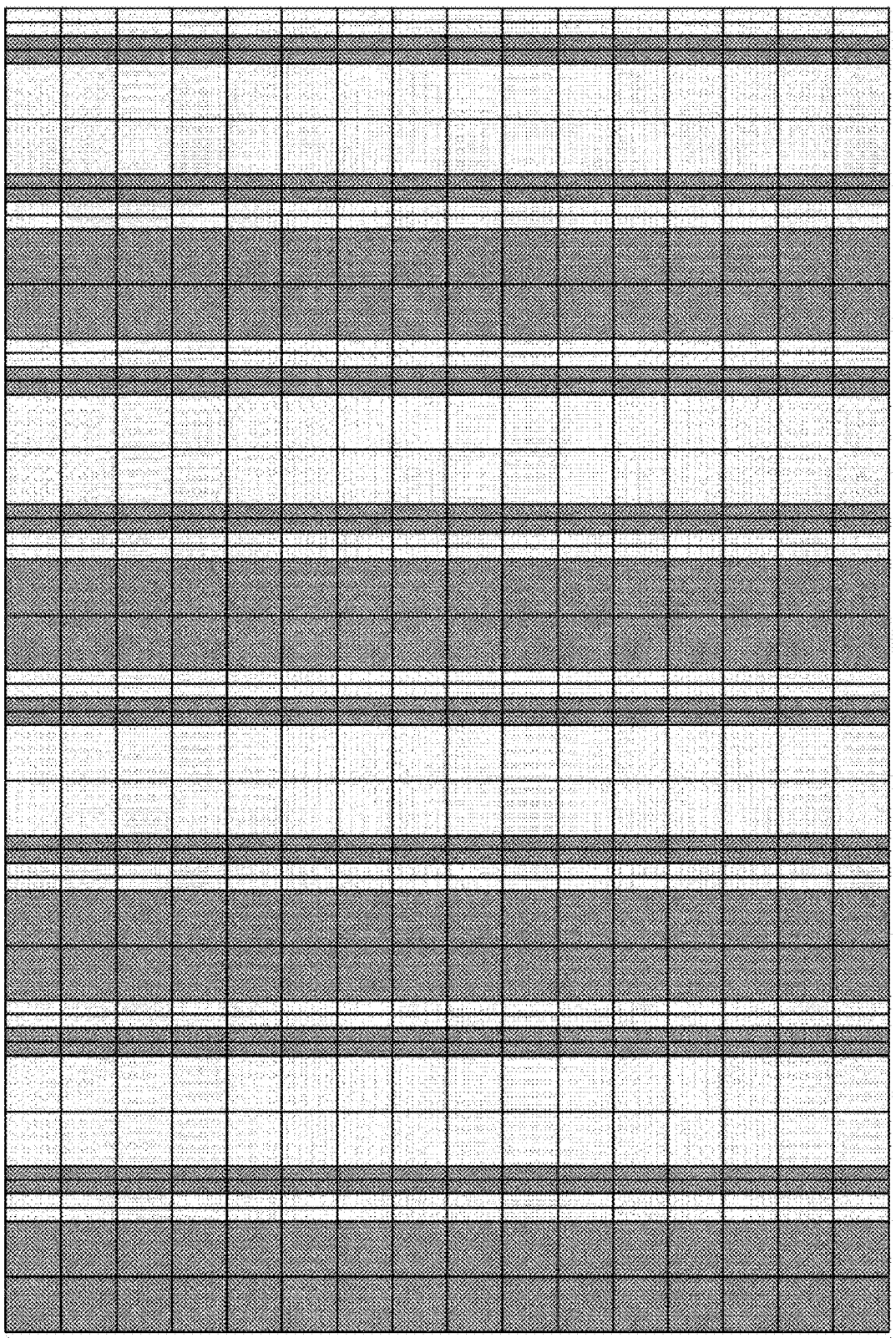

FIG. 15
II
INTERMEDIATE TO HIGH TONE 
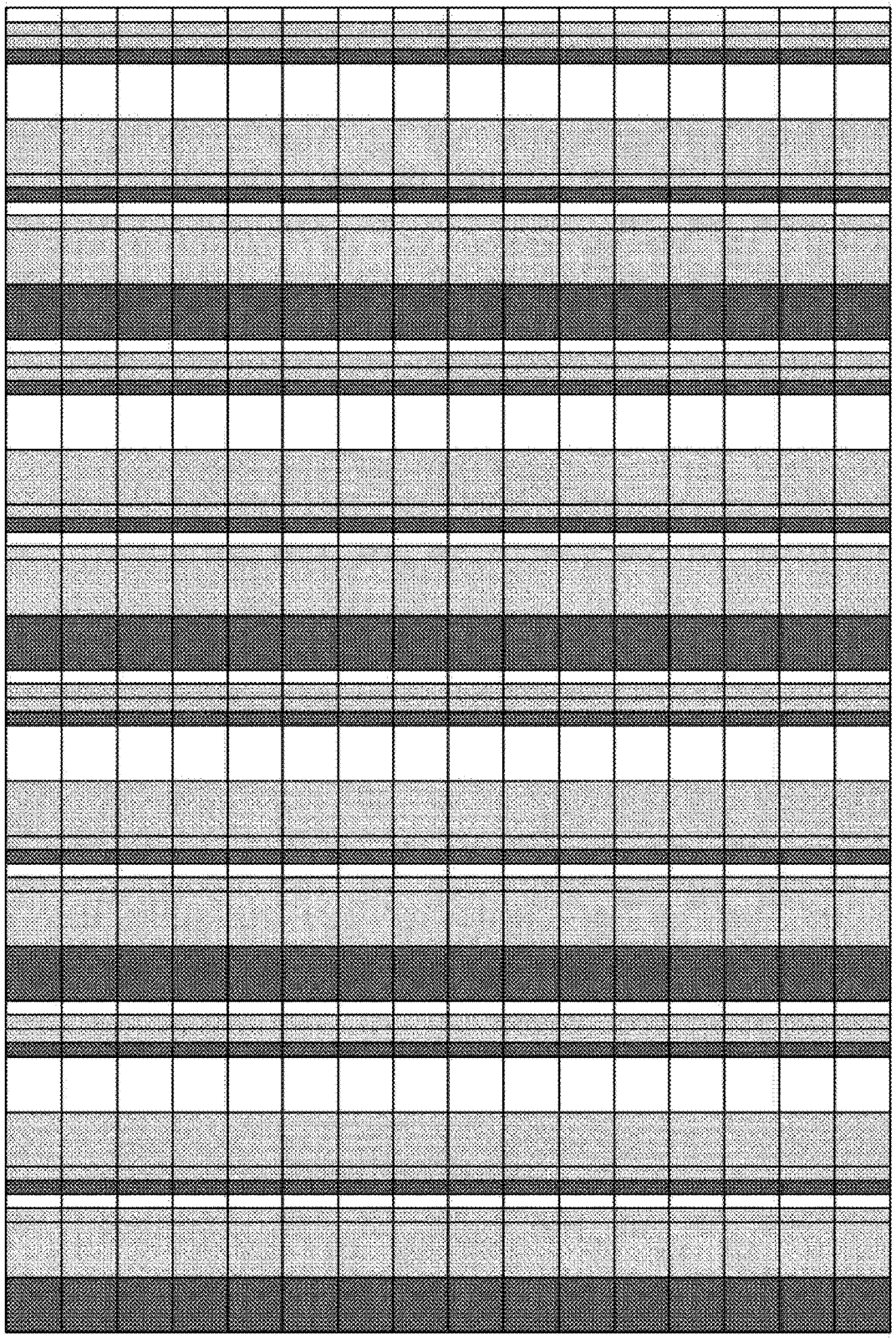

II INTERMEDIATE TO HIGH TONE

III
LOW TO INTERMEDIATE TONE ← A1

III
LOW TO INTERMEDIATE TONE

III
LOW TO INTERMEDIATE TONE

III
INTERMEDIATE TO HIGH TONE

III
INTERMEDIATE TO HIGH TONE

FIG. 26
IV
LOW TO INTERMEDIATE TONE
A2
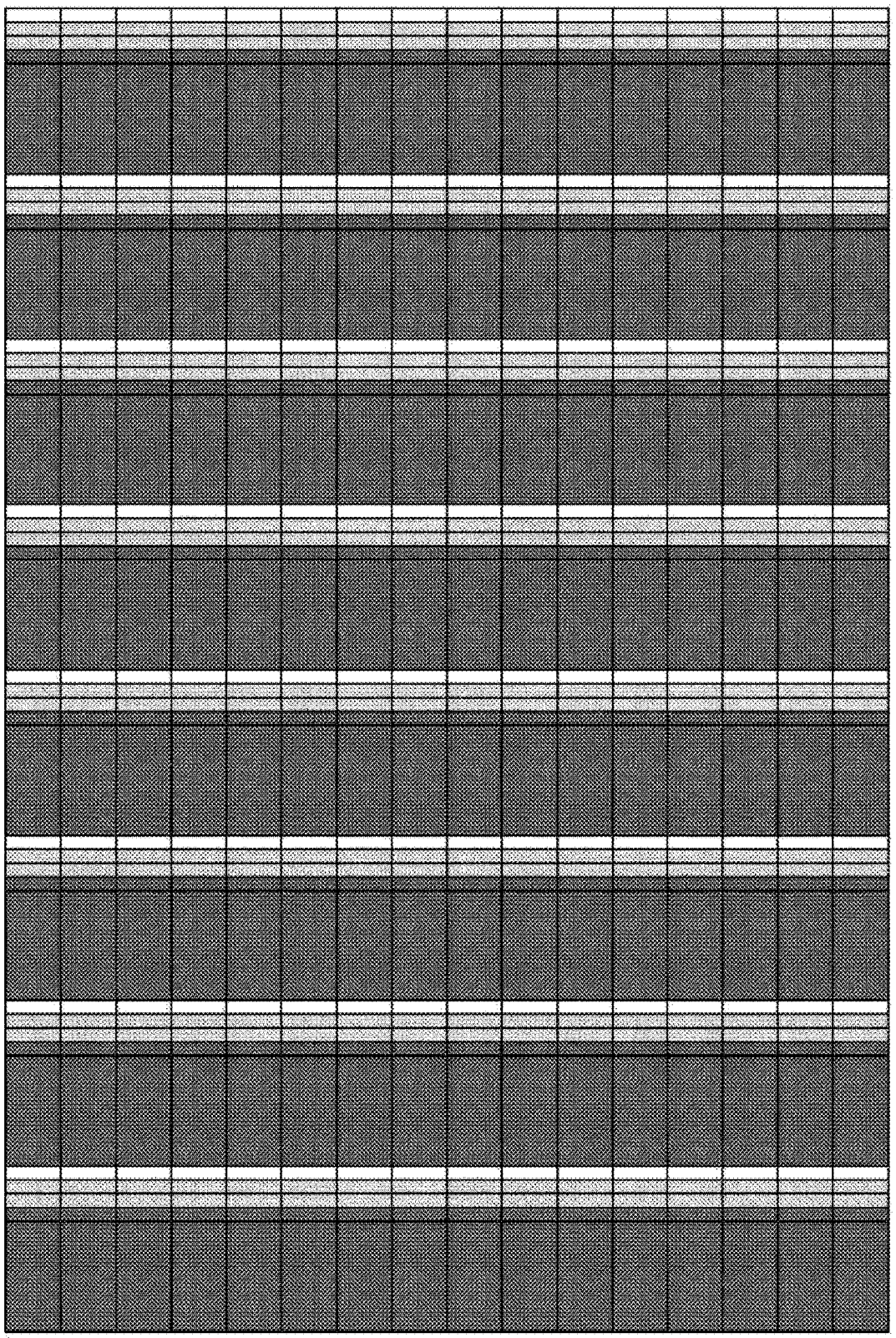

FIG. 36
V
INTERMEDIATE TO HIGH TONE 
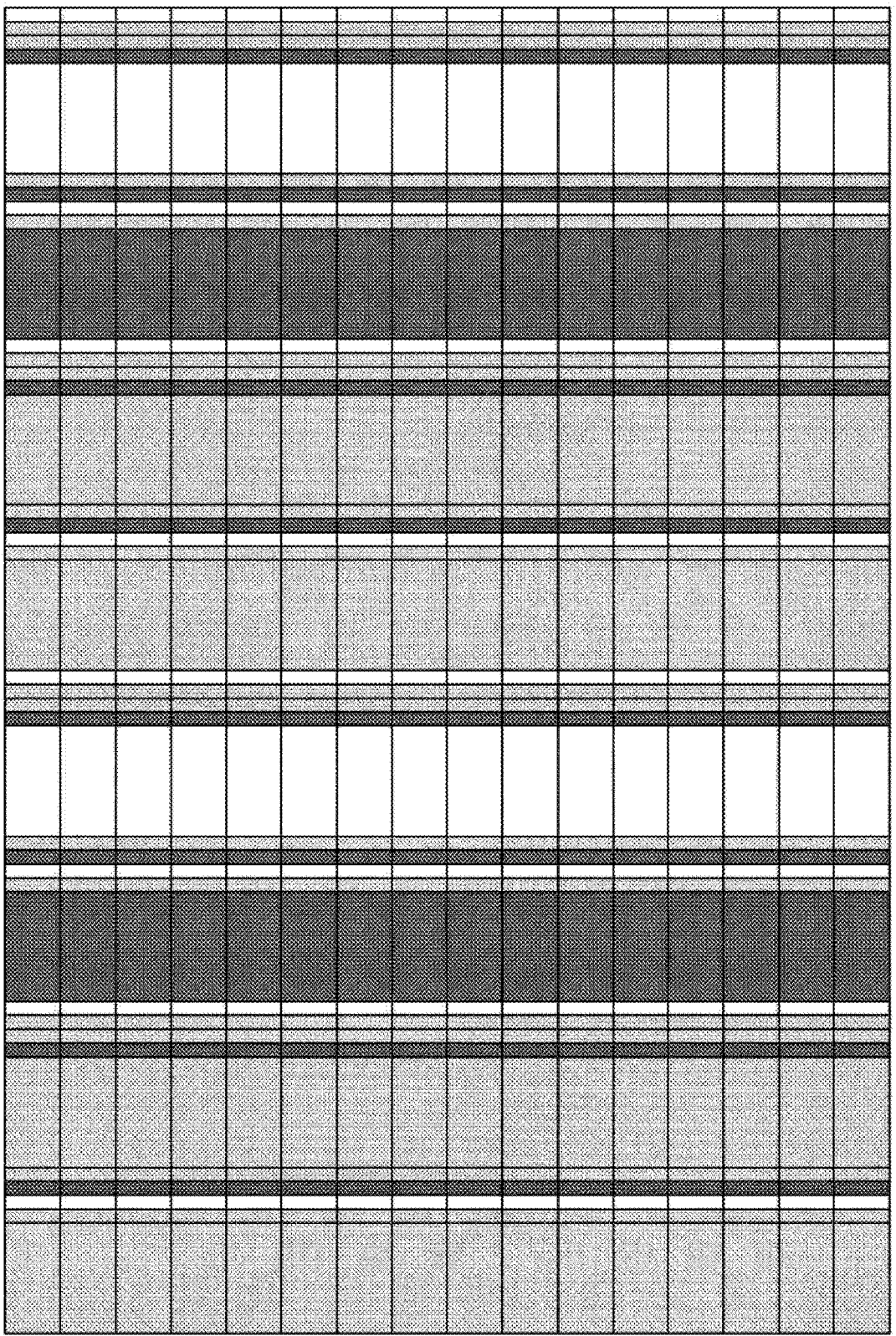

VI LOW TO INTERMEDIATE TONE

VII
LOW TO INTERMEDIATE TONE

VII
INTERMEDIATE TO HIGH TONE ← A1

VIII
LOW TO INTERMEDIATE TONE

VIII INTERMEDIATE TO HIGH TONE

VIII
INTERMEDIATE TO HIGH TONE

FIG. 59

| DOMAIN ALIGNMENT AND DARK LINE OCCURRENCE CONDITION (TWO DOMAINS) | | | | | |
|---|---|---|---|---|---|
| Ax1 ↔ Ax2 OPTICAL AXES OF POLARIZING PLATES | | UPPER ALIGNMENT | | | |
| | | 41, 41S, F, 41T | H, 41 | 41, B | 41, D |
| LOWER ALIGNMENT | 41, F | | HORIZONTAL: 3 VERTICAL: 1 | HORIZONTAL: 4 VERTICAL: 1 | HORIZONTAL: 2 VERTICAL: 1 |
| | H, 41 | ○ 41, DS DD, DL, DD HORIZONTAL: 1 VERTICAL: 1 | | HORIZONTAL: 2 VERTICAL: 1 | HORIZONTAL: 2 VERTICAL: 1 |
| | 41, B | HORIZONTAL: 2 VERTICAL: 1 | HORIZONTAL: 2 VERTICAL: 1 | | ○ 41, DS DD, DL, DD HORIZONTAL: 1 VERTICAL: 1 |
| | 41, D | HORIZONTAL: 2 VERTICAL: 1 | HORIZONTAL: 4 VERTICAL: 1 | HORIZONTAL: 3 VERTICAL: 1 | |

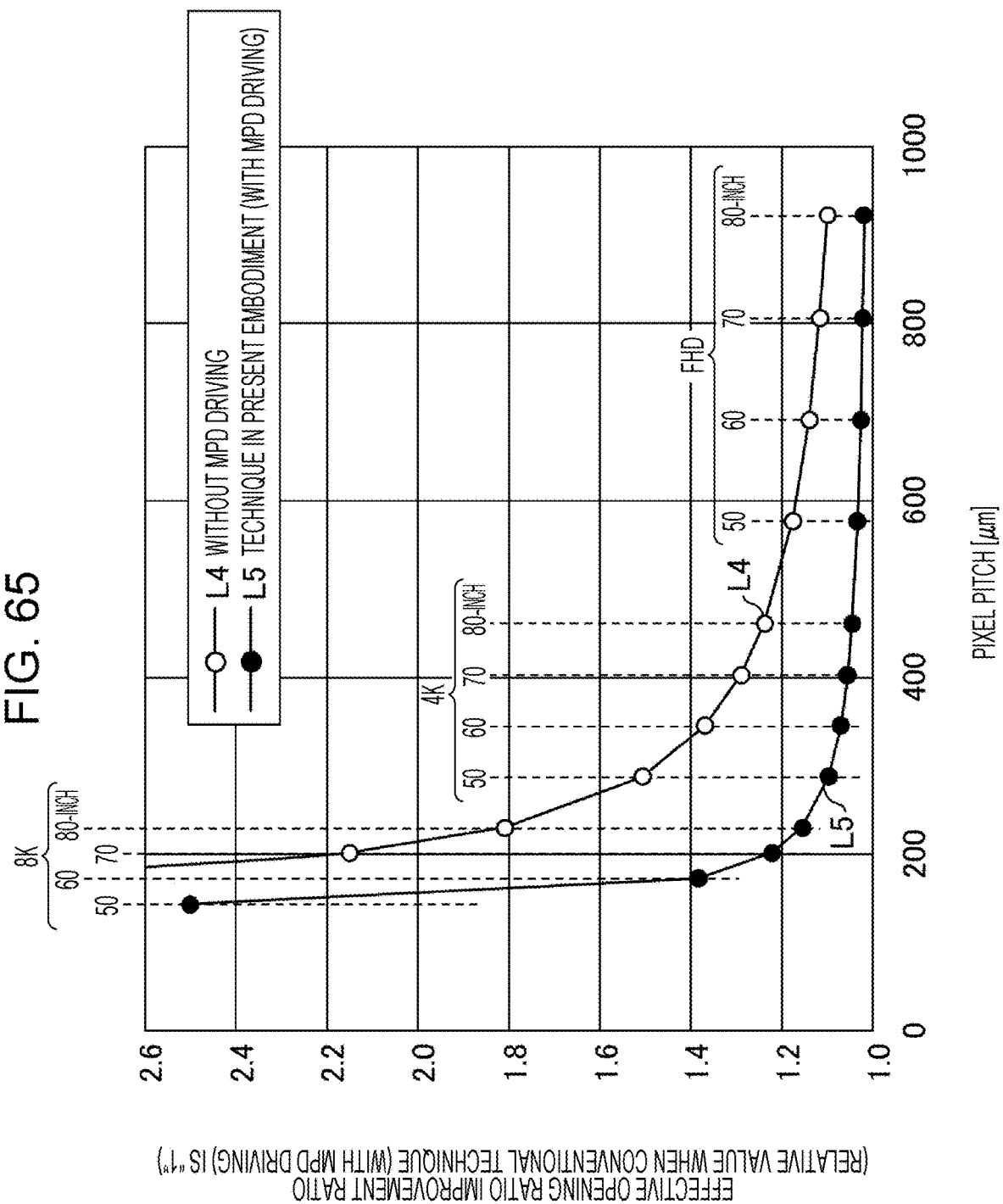

FIG. 66

| | LOW TO INTERMEDIATE TONE | | | INTERMEDIATE TO HIGH TONE AND WHITE DISPLAY | | |
|---|---|---|---|---|---|---|
| | VIEWING ANGLE | TRANSPARENCY | | VIEWING ANGLE | TRANSPARENCY | |
| BRIGHT SUBPIXEL EFFECT LEVEL | HIGH | HIGH | | MODERATE | MODERATE | |
| DARK SUBPIXEL EFFECT LEVEL | LOW | LOW | | MODERATE | MODERATE (HIGH*) | |
| IMPORTANCE OF PANEL PERFORMANCE IMPROVEMENT | HIGH | LOW | | LOW | HIGH | |
| IMPROVEMENT POINT | ■ BRIGHT SUBPIXEL DESIGNED TO PRIORITIZE VIEWING ANGLE | | | | ■ DARK SUBPIXEL DESIGNED TO PRIORITIZE TRANSPARENCY | |

FIG. 69

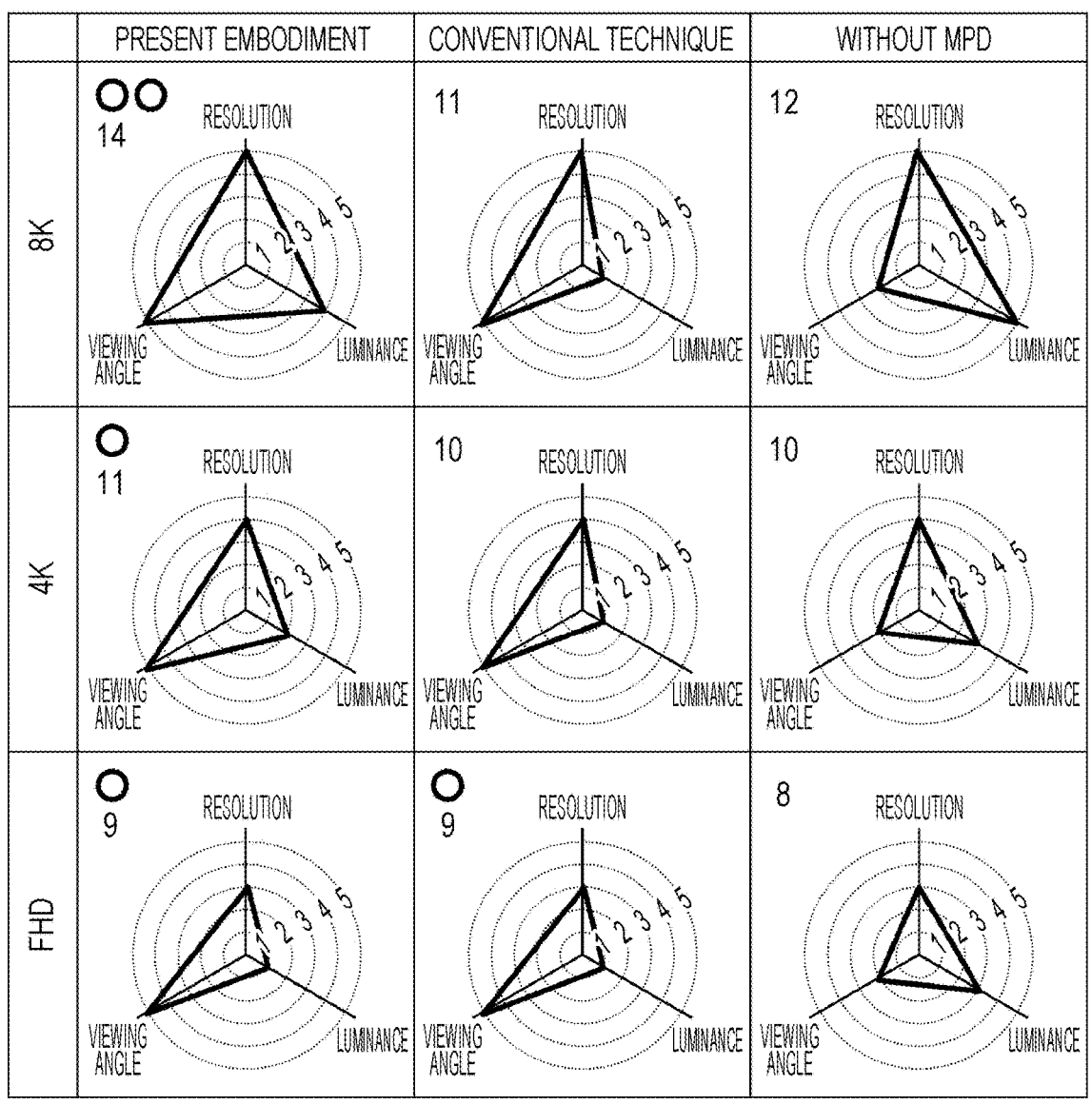

○ : BEST AT EACH RESOLUTION
○○ : BEST BY FAR AT EACH RESOLUTION

| SCORE | RESOLUTION | VIEWING ANGLE | LUMINANCE |
|---|---|---|---|
| 5 | 8K | IMPROVEMENT IN WHITE GLOW (MPD DRIVING) | MORE THAN 1.5 TIMES THAN BEFORE |
| 4 | 4K | NO TONE REVERSAL | UP TO 1.5 TIMES THAN BEFORE |
| 3 | FHD | ---- | UP TO 1.2 TIMES THAN BEFORE |
| 2 | HD720 | WHITE REVERSAL | UP TO 1.1 TIMES THAN BEFORE |
| 1 | WVGA | BLACK REVERSAL | SAME AS BEFORE |
| 0 | LOWER THAN MVGA | ASYMMETRIC CHARACTERISTICS | LOWER THAN BEFORE |

LIQUID CRYSTAL PANEL

TECHNICAL FIELD

The present invention relates to a liquid crystal panel of a vertical alignment type in which pixels, each of which corresponds to one of three primary colors of light, each include a bright subpixel and a dark subpixel.

BACKGROUND ART (Single-Domain VA (Vertical Alignment) Method for Liquid Crystal Panels)

First, a single-domain VA method for liquid crystal panels will be described. In FIG. 71, (a) to (d) are graphs illustrating relationships between viewing angles and relative luminance in a conventional single-domain VA method, and (e) is a diagram illustrating an alignment direction of a liquid crystal molecule 41 in the single-domain VA method.

The alignment direction of the liquid crystal molecule 41 illustrated in FIG. 71(e) will be described herein using an alignment vector at a time when a liquid crystal panel is viewed in a plan view, an end of a longitudinal axis of the liquid crystal molecule 41 closer to a first substrate is determined as an initial point 41S, and an end of the longitudinal axis closer to a second substrate is determined as a final point 41T.

FIG. 71(a) illustrates a relationship between viewing angles in directions indicated by arrows A and E in FIG. 71(e) and the relative luminance of the liquid crystal molecule 41 with various tones. FIG. 71(b) illustrates a relationship between viewing angles in directions indicated by arrows B and F and the relative luminance with the various tones. FIG. 71(c) illustrates a relationship between viewing angles in directions indicated by arrows C and G and the relative luminance with the various tones, and FIG. 71(d) illustrates a relationship between viewing angles in directions indicated by arrows D and H and the relative luminance with the various tones.

As illustrated in FIG. 71, in the single-domain VA method, changes in relative luminance with the various tones due to viewing angles are large, and there is no symmetry in up, down, left, and right directions. In the up and down directions, black reversal and white reversal occur. In particular, when black reversal occurs, a natural image looks like a negative-positive reversal image, which poses a serious problem in terms of display quality.

Viewing angle characteristics are thus problematic in the single-domain VA method for liquid crystal panels. In order to solve the problem of viewing angle characteristics, the following MVA (multi-domain vertical alignment) method and MPD (multi-pixel drive) technique were developed.

(MVA Method for Liquid Crystal Panels)

FIGS. 72(a) to (d) are graphs illustrating relationships between viewing angles and relative luminance in the conventional MVA method, and (e) is a diagram illustrating alignment directions of liquid crystal molecules in the MVA method.

FIG. 72(a) illustrates a relationship between viewing angles in directions indicated by arrows A and E in FIG. 72(e) and the relative luminance of four liquid crystal molecules 41 whose alignment directions are different from one another with various tones. FIG. 72(b) illustrates a relationship between viewing angles in directions indicated by arrows B and F and the relative luminance with the various tones. FIG. 72(c) illustrates a relationship between viewing angles in directions indicated by arrows C and G and the relative luminance with the various tones, and FIG. 72(d) illustrates a relationship between viewing angles in directions indicated by arrows D and H and the relative luminance with the various tones.

In the MVA method, a plurality of, generally four, domains whose alignment directions (directions in which the liquid crystal molecules 41 are tilted when voltage is applied) are different from one another are provided. As a result, viewing angle characteristics that had been asymmetric in the up, down, left, and right directions could be significantly improved to substantially symmetric characteristics. Especially black and white reversal phenomena in the up direction could be significantly improved, and the problem that a natural image looked like a negative-positive reversal image was substantially solved (PTL 1). As a result, liquid crystal panels employing the MVA method were widely used for TV purposes.

As described above, in the MVA method, viewing angle characteristics were significantly improved by providing a plurality of domains whose alignment directions were different from one another, and viewing angle characteristics symmetric in the up, down, left, and right directions were achieved. Black reversal was eliminated, and white reversal was significantly improved.

(MPD Technique for Liquid Crystal Panels)

After viewing angle characteristics were significantly improved by introducing the MVA method, the MPD technique was developed in order to achieve further improvements. In the MPD technique, each pixel is divided into a plurality of, generally two, subpixels to which different voltages can be applied (PTL 2 and PTL 3). More specifically, a bright subpixel that exhibits a luminance higher than a luminance achieved by a displayed intermediate tone and a dark subpixel that exhibits a luminance lower than the luminance achieved by the displayed intermediate tone are provided. As a result, changes in luminance (also called "white glow") and changes in color when an intermediate tone is displayed can be significantly improved. This is because viewing angle characteristics (changes in luminance in oblique view) of a four-domain VA mode tend to be better with an intermediate tone of a relatively high luminance than with an intermediate tone of a relatively low luminance. Furthermore, whereas luminance tends to increase in the case of a relatively low luminance as a viewer switches from front view to oblique view, luminance tends to show an opposite tendency, that is, decrease, in the case of a relatively high luminance as a viewer switches from front view to oblique view. When an intermediate tone is displayed, therefore, viewing angle performance can be improved by combining a bright subpixel, which is bright, and a dark subpixel, which is dark, with each other and exhibiting a desired luminance as an average in a whole pixel.

FIG. 73(a) is a diagram illustrating tilt directions of liquid crystal molecules 41 without the MPD technique, and (b) and (c) are graphs illustrating relationships between viewing angles and relative luminance without the MPD technique. (d) is a diagram illustrating tilt directions of liquid crystal molecules with the MPD technique, and (e) and (f) are graphs illustrating relationships between viewing angles and relative luminance with the MPD technique.

FIG. 73(b) illustrates a relationship between viewing angles in directions indicated by arrows A and E in FIG. 73(a) and the relative luminance of the liquid crystal molecules 41 with various tones. FIG. 73(c) illustrates a relationship between viewing angles in directions indicated by arrows B and F and the relative luminance with the various tones.

FIG. 73(e) illustrates a relationship between viewing angles in directions indicated by arrows A and E in FIG. 73(d) and the relative luminance of the liquid crystal molecules 41 with the various tones. FIG. 73(f) illustrates a relationship between viewing angles in directions indicated by arrows B and F and the relative luminance with the various tones.

When the MPD technique is used as in FIGS. 73(d) to (f), changes in luminance when a viewing angle has changed are smaller and better viewing angle performance is achieved than when the MPD technique is not used as in FIGS. 73(a) to (c). In the case of a tone of 96/225, for example, changes in luminance in the A-E directions illustrated in FIG. 73(b) is 2.2 times at maximum in a front luminance ratio and 2.2 times in the B-F directions illustrated in FIG. 73(c) when the MPD technique is not used. When the MPD technique is used, on the other hand, the changes are 1.3 times at maximum in the A-E directions illustrated in FIGS. 73(e) and 1.4 times in the B-F directions illustrated in FIG. 73(f), which indicates significant improvements.

Viewing angle characteristics, which had posed a problem in the single-domain VA method, no longer posed a problem as a result of the introduction of the MVA method and the MPD technique.

CITATION LIST

Patent Literature

[PTL 1] Japanese Patent No. 2947350
[PTL 2] Japanese Unexamined Patent Application Publication No. 2005-208309
[PTL 3] Japanese Unexamined Patent Application Publication No. 2006-189610

SUMMARY OF INVENTION

Technical Problem

As the resolution of liquid crystal TV increases from HD to FHD, 4K, and then to 8K, however, a new problem has surfaced. The new problem is a decrease in the transparency of liquid crystal panels due to the introduction of the MVA method and MPD driving.

At a time when the MVA method and the MPD driving were developed and introduced, the resolution of liquid crystal TV is mainly HD and FHD, and a decrease in transparency did not pose a serious problem. As the resolution of liquid crystal TV has increased to 4K and 8K, however, a problem of a decrease in transparency has surfaced.

FIG. 74 is a diagram illustrating an image of openings of an FHD liquid crystal panel with MVA and MPD after an increase in resolution. An image of openings Ap of the FHD liquid crystal panel at a time when gate wiring-related shades, source wiring-related shades, and alignment domain dark lines have their respective constant widths is illustrated. Since the liquid crystal panel having a resolution of FHD has a sufficient area of the openings Ap, a decrease in transparency does not pose a serious problem.

FIG. 75 is a diagram illustrating an image of openings of a 4K liquid crystal panel with MVA and MPD after an increase in resolution. An image of openings Ap in 4K at a time when gate wiring-related shades, source wiring-related shades, and alignment domain dark lines have their respective constant widths is illustrated. When the resolution of a liquid crystal panel increases from FHD to 4K, the area of the openings Ap further decreases, and a decrease in transparency poses a problem.

FIG. 76 is a diagram illustrating an image of openings in 8K with MVA and MPD after an increase in resolution. An image of openings Ap in 8K at a time when gate wiring-related shades, source wiring-related shades, and alignment domain dark lines have their respective constant widths is illustrated. When the resolution of a liquid crystal panel increases from 4K to 8K, the area of the openings Ap further decreases, and a decrease in transparency poses a serious problem.

As illustrated in FIGS. 74 to 76, the openings Ap are covered by dark lines at boundaries between domains, and the transparency of the liquid crystal panel decreases, which is a problem. The transparency of a liquid crystal panel, especially a high-resolution 4K or 8K liquid crystal panel, thus undesirably decreases as a side effect of the introduction of the MVA method and the MPD technique.

An aspect of the present invention aims to achieve a liquid crystal panel capable of suppressing a decrease in transparency while maintaining an effect of improving viewing angles based on the introduction of the MVA method and the MPD driving.

Solution to Problem (1) An embodiment of the present invention is a liquid crystal panel of a vertical alignment type including a first substrate including a plurality of pixels arranged in a matrix, a liquid crystal layer including liquid crystal molecules and a second substrate in this order. The plurality of pixels each correspond to one of three primary colors of light. Each of the plurality of pixels includes a bright subpixel and a dark subpixel, luminance of light passing through the dark subpixel being lower than luminance of light passing through the bright subpixel when the liquid crystal panel displays an intermediate tone. The bright subpixel includes M (M≥2) bright domains in which alignment directions of the liquid crystal molecules are different from each other. The dark subpixel includes (M−1) or less dark domains in which alignment directions of the liquid crystal molecules are different from each other.

(2) In addition, another embodiment of the present invention is the liquid crystal panel according to (1). The bright subpixel and the dark subpixel of each of the plurality of pixels are arranged side-by-side in a first direction, which is either a column direction or a row direction. The M bright domains of the bright subpixel of each of the plurality of pixels are arranged side-by-side in the first direction. The (M−1) or less dark domains of the dark subpixels of each of the plurality of pixels are arranged side-by-side in the first direction. Alignment directions of liquid crystal molecules in K-th (1≤K≤M) bright domains among the M bright domains arranged side-by-side in the first direction of the plurality of pixels arranged side-by-side in a second direction, which is another of the column direction and the row direction, are the same. Alignment directions of liquid crystal molecules in L-th (1≤L≤(M−1)) dark domains among the (M−1) or less dark domains arranged side-by-side in the first direction of the plurality of pixels arranged side-by-side in the second direction are the same.

(3) In addition, another embodiment of the present invention is the liquid crystal panel according to (2). The alignment directions of the liquid crystal molecules in the bright domains and the alignment directions of the liquid crystal molecules in the dark domains are the same in 88 or more pixels arranged side-by-side in the second direction.

(4) In addition, another embodiment of the present invention is the liquid crystal panel according to (1). The M bright domains of the bright subpixel of each of the plurality of pixels are arranged side-by-side in a first direction, which is either a column direction or a row direction. Alignment directions of liquid crystal molecules in K-th ($1 \leq K \leq M$) bright domains among the M bright domains arranged side-by-side in the first direction of the plurality of pixels arranged side-by-side in the first direction are the same.

(5) In addition, another embodiment of the present invention is the liquid crystal panel according to (1). The dark subpixel includes two or more dark domains. The dark domains of the dark subpixel of each of the plurality of pixels are arranged side-by-side in a first direction, which is either a column direction or a row direction. An angle between alignment directions of liquid crystal molecules in two adjacent dark domains is equal to or smaller than 135 degrees.

(6) In addition, another embodiment of the present invention is the liquid crystal panel according to (5). The alignment directions of the liquid crystal molecules in the two adjacent dark domains are different from each other by 90 degrees.

(7) In addition, another embodiment of the present invention is the liquid crystal panel according to (1). The dark subpixel includes two dark domains. The two dark domains of the dark subpixel of each of the plurality of pixels are arranged side-by-side in a first direction, which is either a column direction or a row direction. A pattern of the alignment directions of the liquid crystal molecules in the two dark domains is repeated in every second pixel in the first direction of the plurality of pixels arranged in a matrix.

(8) In addition, another embodiment of the present invention is the liquid crystal panel according to (7). The pattern of the alignment directions of the liquid crystal molecules in the two dark domains is repeated eight times or more in every second pixel.

(9) In addition, another embodiment of the present invention is the liquid crystal panel according to (7). Final points of the alignment directions of the liquid crystal molecules in the two dark domains are directed to a boundary line between the two dark domains. An angle between the alignment directions of the liquid crystal molecules in the two dark domains is equal to or smaller than 135 degrees.

(10) In addition, another embodiment of the present invention is the liquid crystal panel according to (1). The dark subpixel includes one dark domain. A pattern of the alignment direction of the liquid crystal molecules corresponding to the dark domain is repeated in every fourth pixel in a first direction, which is either a column direction or a row direction, of the plurality of pixels arranged in a matrix.

(11) In addition, another embodiment of the present invention is the liquid crystal panel according to (10). The pattern of the alignment direction of the liquid crystal molecules corresponding to the dark domain is repeated eight times or more in every fourth pixel.

(12) In addition, another embodiment of the present invention is the liquid crystal panel according to (1). The dark subpixel includes N dark domains. When an integral multiple of 4 is denoted by A and a quotient obtained when A is divided by N and a remainder is zero is denoted by B, a pattern of the alignment directions of the liquid crystal molecules in the N dark domains is repeated eight times or more in every B-th pixel in a first direction, which is either a column direction or a row direction, of the plurality of pixels arranged in a matrix.

(13) In addition, another embodiment of the present invention is the liquid crystal panel according to (1). The plurality of pixels are driven by a line inversion driving method, in which polarities of driving of the liquid crystal layer are the same in a first direction, which is either a column direction or a row direction, and different in a second direction, which is another of the column direction and the row direction.

Advantageous Effects of Invention

According to an aspect of the present invention, a decrease in transparency can be suppressed while maintaining an effect of improving viewing angles based on introduction of an MVA method and MPD driving.

BRIEF DESCRIPTION OF DRAWINGS

FIG. 3(a) is a diagram illustrating luminance at a time when a domain of a liquid crystal molecule is obliquely viewed, and (b) is a schematic diagram illustrating bright-dark patterns at a time when domains of liquid crystal molecules are obliquely viewed.

FIG. 11 is an enlarged schematic plan view illustrating a bright-dark pattern with a low to intermediate tone at a time when the liquid crystal panel is obliquely viewed from the direction indicated by the arrow.

FIG. 12 is an enlarged schematic plan view illustrating a bright-dark pattern with a low to intermediate tone at a time when the liquid crystal panel is obliquely viewed from the direction indicated by the other arrow.

FIG. 14 is an enlarged schematic plan view illustrating a bright-dark pattern with an intermediate to high tone at a time when the liquid crystal panel is obliquely viewed from the direction indicated by the arrow.

FIG. 15 is a schematic plan view illustrating a bright-dark pattern with an intermediate to high tone at a time when the liquid crystal panel is obliquely viewed from the direction indicated by the other arrow.

FIG. 26 is an enlarged schematic plan view illustrating a bright-dark pattern with a low to intermediate tone when the liquid crystal panel is obliquely viewed from the direction indicated by the other arrow.

FIG. 36 is an enlarged schematic plan view illustrating a bright-dark pattern with an intermediate to high tone when the liquid crystal panel is obliquely viewed from the direction indicated by the other arrow.

FIG. 59 is a diagram illustrating a relationship between the domain arrangement of a two-domain dark subpixel and a dark line occurrence condition according to the embodiment.

FIG. 65 is a graph illustrating a relationship between the pixel resolution and an effect of improving the effective opening ratio according to the embodiment.

FIG. 66 is a diagram illustrating viewing angle characteristics and transparency of the liquid crystal panel according to the embodiment.

FIG. 69 is a diagram illustrating the resolution, viewing angles, and luminance of the liquid crystal panels according to the embodiment and in the comparative example.

DESCRIPTION OF EMBODIMENTS

An embodiment of the present invention will be described in detail hereinafter.

[First Embodiment]

(Configuration of Liquid Crystal Display Apparatus)

Figure 1:
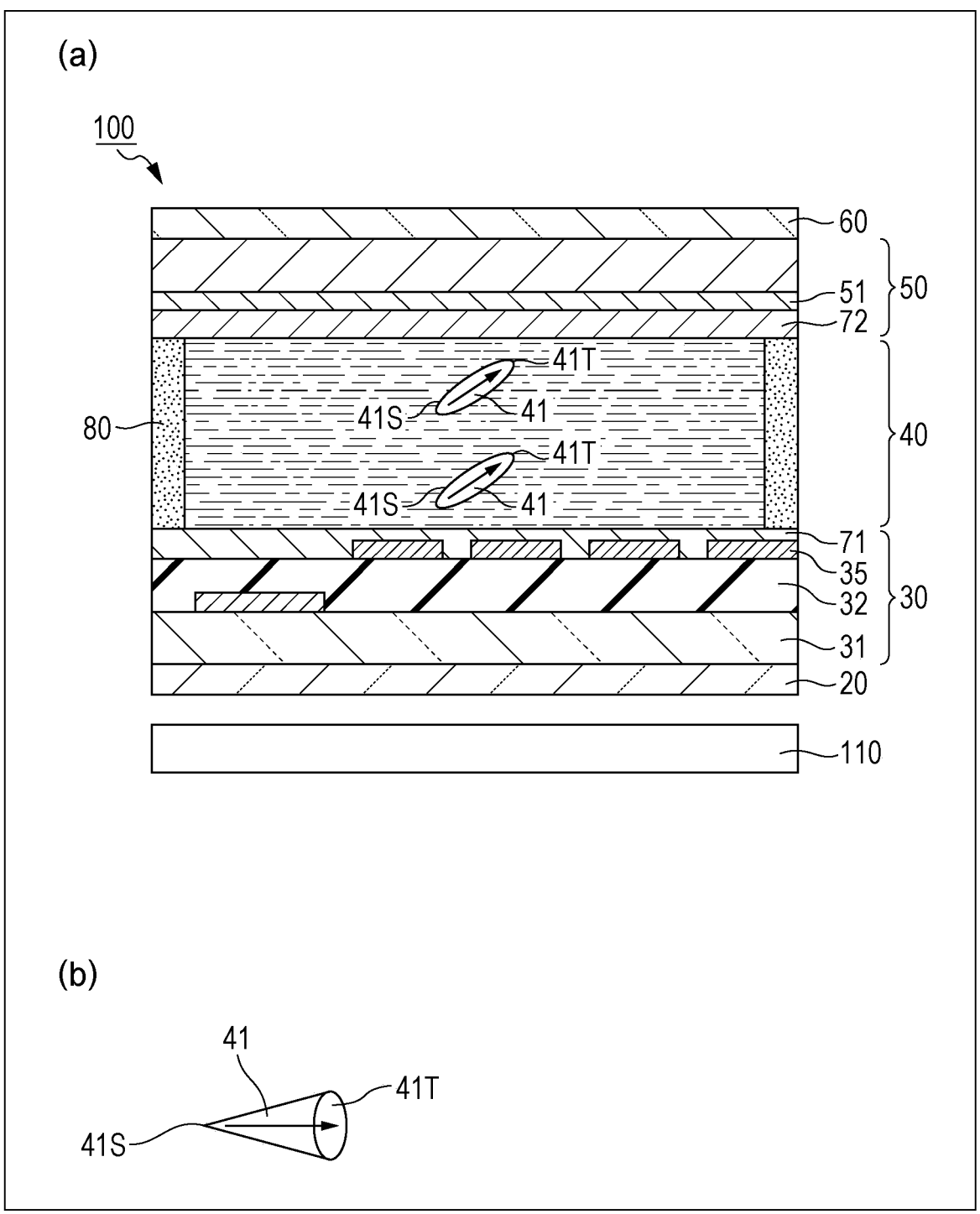
FIG. 1(a) is a cross-sectional view schematically illustrating an example of a liquid crystal display apparatus according to an embodiment, and (b) is a diagram illustrating a relationship between a tilt direction and an alignment vector of a liquid crystal molecule of a liquid crystal panel provided for the liquid crystal display apparatus.

FIG. 1(a) is a cross-sectional view schematically illustrating an example of a liquid crystal display apparatus according to the embodiment, and (b) is a diagram illustrating a relationship between a tilt direction and an alignment vector of a liquid crystal molecule 41 of a liquid crystal panel provided for the liquid crystal display apparatus.

As illustrated in FIG. 1(a), the liquid crystal display apparatus according to the present embodiment includes a liquid crystal panel 100 and a backlight 110 provided on a back of the liquid crystal panel 100. The liquid crystal panel 100 includes a first substrate 30 including a backside polarizing plate 20, a transparent substrate 31, an insulating film 32, a plurality of pixel electrodes 35, and a first alignment film 71, a liquid crystal layer 40 containing liquid crystal molecules 41, a second substrate 50 including a second alignment film 72 and a counter electrode 51, and a display-side polarizing plate 60 in this order. The liquid crystal panel 100 also includes a sealing material 80 around the liquid crystal layer 40.

First, a display method employed by the liquid crystal display apparatus according to the present embodiment will be described. In the liquid crystal display apparatus according to the present embodiment, light is incident on the liquid crystal panel 100 from the backlight 110, and the amount of light passing through the liquid crystal panel 100 is controlled by switching the alignment of the liquid crystal molecules 41 in the liquid crystal layer 40. The switching of the alignment of the liquid crystal molecules 41 is achieved by applying voltages to the liquid crystal layer 40 using the plurality of pixel electrodes 35 and the counter electrode 51. When voltages applied to the liquid crystal layer 40 are lower than a threshold (when no voltage is applied), the first alignment film 71 and the second alignment film 72 regulate the initial alignment of the liquid crystal molecules 41.

When no voltage is applied, the liquid crystal molecules 41 are substantially vertically aligned to the first substrate 30 and the second substrate 50. Here, "substantially vertically" means that the liquid crystal molecules 41 are slightly obliquely aligned to the first substrate 30 and the second substrate 50 as a result of an alignment process performed on the first alignment film 71 and the second alignment film 72. Pretilt directions of the liquid crystal molecules 41 relative to the first substrate 30 and the second substrate 50 when no voltage is applied are preferably equal to or larger than 85° but smaller than 90°. When voltages are applied between the pixel electrodes 35 and the counter electrode 51, vertical electric fields are generated in the liquid crystal layer 40, and the liquid crystal molecules 41 are tilted more sharply while maintaining the tilt directions thereof at a time when no voltage was applied.

In FIG. 1(b), a liquid crystal molecule 41 is represented by a pin (cone) in order to clearly indicate a tilt direction thereof. A bottom surface of the cone indicates a direction of the second substrate 50 (observer) and a vertex of the cone indicates a direction of the first substrate 30.

The tilt direction of each liquid crystal molecule 41 will be described herein using an alignment vector at a time when the liquid crystal panel 100 is viewed in a plan view and an end of a longitudinal axis of the liquid crystal molecule 41 closer to the first substrate 30 is determined as an initial point (hereinafter also referred to as a "head of a liquid crystal director") 41T as necessary. A direction of an alignment vector is the same as the tilt direction of a liquid crystal molecule 41 relative to the first alignment film 71 in the first substrate 30 and opposite the tilt direction of the liquid crystal molecule 41 relative to the second alignment film 72 in the second substrate 50. A "direction" herein refers to a direction when liquid crystal molecules 41 are projected onto a substrate surface, and a tilt angle (a polar angle, a pretilt direction) from a normal of the substrate surface is not taken into consideration. In addition, since the liquid crystal molecules 41 are substantially vertically aligned (slightly obliquely) when no voltage is applied and, when voltages are applied, sharply tilted while maintaining the tilt directions at a time when no voltage was applied, initial points 41S and final points 41T of alignment vectors may be checked with voltages applied to the liquid crystal layer 40.

(Configuration of Liquid Crystal Panel)

In the present embodiment, the number of domains of each dark subpixel DS, which relatively hardly affects display quality, is reduced from conventional four to two, one, or the like in order to improve the transparency of the liquid crystal panel 100. Because degrees of freedom increase in terms of the domain arrangement of the dark subpixels DS as a result of the reduction, and domain arrangement for achieving optimal display quality has been examined, and optimal conditions have been found.

(First Example of Tilt Directions of Liquid Crystal Molecules)

Figure 2:
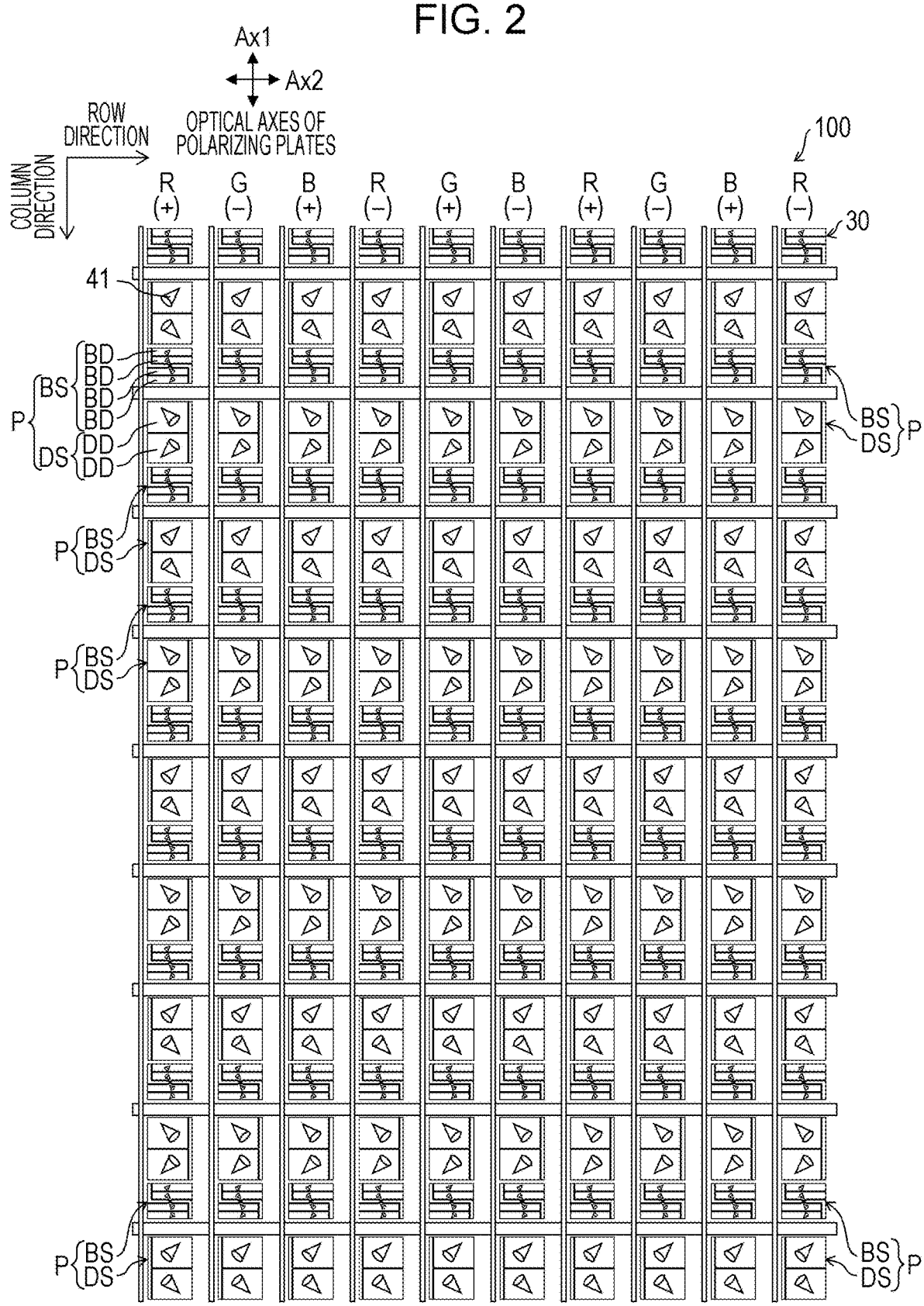
FIG. 2 is a schematic plan view illustrating tilt directions of liquid crystal molecules of the liquid crystal panel.

FIG. 2 is a schematic plan view illustrating the tilt directions of the liquid crystal molecules 41 of the liquid crystal panel 100. The first substrate 30 provided in the liquid crystal panel 100 includes a plurality of pixels P arranged in a matrix. Here, the pixels P refer to display unit display areas that overlap corresponding pixel electrodes 35. R pixels that overlap R (red) color filters, G pixels that overlap G (green) color filter, and B pixels that overlap B (blue) color filters are provided. Stripe color filters extending in a column direction are arranged in the second substrate 50 in order of R, G, and B in a row direction. That is, the pixels P are repeatedly arranged in the row direction in order of an R pixel, a G pixel, and B pixel, and pixels P of the same color are successively arranged in the column direction.

In addition, polarities of driving voltages for pixels P in the column direction become the same as a result of column inversion driving. That is, positive polarity (+) or negative polarity (−) of each pixel P is repeated in the column direction. A polarity of each pixel P is reversed in each frame, that is, for example, at intervals of $\frac{1}{120}$ second or $\frac{1}{60}$ second.

As a result, interference between a horizontal stripe pattern caused in every plural rows and the polarity of the pixels P due to the reduction in the number of dark domains DD and provision of dark domains DD in which tilt directions of liquid crystal molecules 41 are different from each other in pixels P adjacent to each other in the column direction, which will be described later, can be avoided. Even if the luminance of pixels P having a positive polarity (+) and the luminance of pixels P having a negative polarity (−) are different from each other due to deviation in counter voltage or the like and luminance becomes uneven in a pattern of a vertical stripe, for example, the uneven luminance does not interfere with the above-mentioned horizontal stripe pattern, and deterioration in display quality can be minimized.

If horizontal line inversion driving, in which positive polarity (+) or negative polarity (−) is repeated in the row direction, is employed, and if the luminance of pixels P having a positive polarity (+) and the luminance of pixels P having a negative polarity (−) are different from each other due to deviation in counter voltage or the like and luminance becomes uneven in a pattern of a horizontal stripe, on the other hand, the luminance interferes with the above-mentioned horizontal stripe pattern, and display quality significantly deteriorates.

In addition, in the case of dot inversion driving, in which positive polarity (+) or negative polarity (−) is arranged in a checked pattern, a symptom can be alleviated compared to the case of horizontal line inversion driving, but deterioration in display quality due to the interference with the horizontal stripe pattern cannot be avoided.

Each pixel P includes a bright subpixel BS and a dark subpixel DS arranged side-by-side in the column direction. When the liquid crystal panel 100 displays an intermediate tone, the luminance of light passing through the dark subpixel DS is lower than that of light passing through the bright subpixel BS. The bright subpixel BS includes four bright domains BD in which alignment directions of liquid crystal molecules 41 are different from one another. The four bright domains BD are arranged side-by-side in the column direction. The dark subpixel DS includes two dark domains DD in which alignment directions of liquid crystal molecules 41 are different from each other. The two dark domains DD are arranged side-by-side in the column direction.

The bright subpixels BS thus secure viewing angle performance, and transparency improves since the dark subpixels DS each include two domains and dark lines are reduced.

Alignment directions of liquid crystal molecules 41 in K-th ($1 \leq K \leq 4$) bright domains BD among four bright domains BD arranged in the column direction of more than 88 pixels P arranged in the row direction are the same. Alignment directions of liquid crystal molecules 41 in L-th ($1 \leq L \leq 2$) dark domains DD among two dark domains DD arranged in the column direction of the more than 88 pixels P arranged in the row direction are the same.

Alignment directions of liquid crystal molecules 41 in K-th ($1 \leq K \leq 4$) bright domains BD among four bright domains BD arranged in the column direction of pixels P arranged in the column direction are the same.

Alignment directions of liquid crystal molecules 41 in the two dark domains DD provided for the dark subpixel DS of each pixel P are different from each other by 90 degrees. As a result, a dark line caused at a boundary between the two dark domains DD can be minimized.

A pattern of the alignment directions of the liquid crystal molecules 41 in the two dark domains DD of each dark subpixel DS is repeated eight times or more in every second pixel in the column direction of the pixels P arranged in a matrix.

When the number of dark domains DD included in each dark subpixel DS is N, an integral multiple of 4 is denoted by A, and a quotient obtained when A is divided by N and a remainder is zero is denoted by B, a pattern of alignment directions of liquid crystal molecules 41 in N dark domains DD may be repeated eight times or more in every B-th pixel P in the column direction of the pixels P arranged in a matrix.

The pixels P are driven by a column inversion driving method, in which the polarity of driving of the liquid crystal layer 40 is the same in the column direction and different in the row direction.

Bright domains BD and dark domains DD in which alignment directions of liquid crystal molecules 41 are different from each other can be formed by making alignment directions relative to the first alignment film 71 and the second alignment film 72 different from each other. When voltages are applied to the liquid crystal layer 40, the liquid crystal molecules 41 are tilted to match alignment vectors of the bright domains BD and the dark domains DD.

FIG. 3(a) is a diagram illustrating luminance at a time when a domain of a liquid crystal molecule 41 is obliquely viewed, and (b) is a schematic diagram illustrating bright-dark patterns at a time when domains of liquid crystal molecules 41 are obliquely viewed.

As illustrated in FIG. 3(a), liquid crystal molecules of a liquid crystal panel employing a VA method have viewing angle characteristics in which brightness differs depending on a viewing angle relative to alignment directions of the liquid crystal molecules 41. As illustrated in FIG. 3(b), therefore, a pixel P, which has been described with reference to FIG. 2, including a bright subpixel BS including four bright domains BD and a dark subpixel DS including two dark domains DD exhibits different bright-dark patterns between different viewing angles indicated by arrows A1 to A8.

Figure 4:
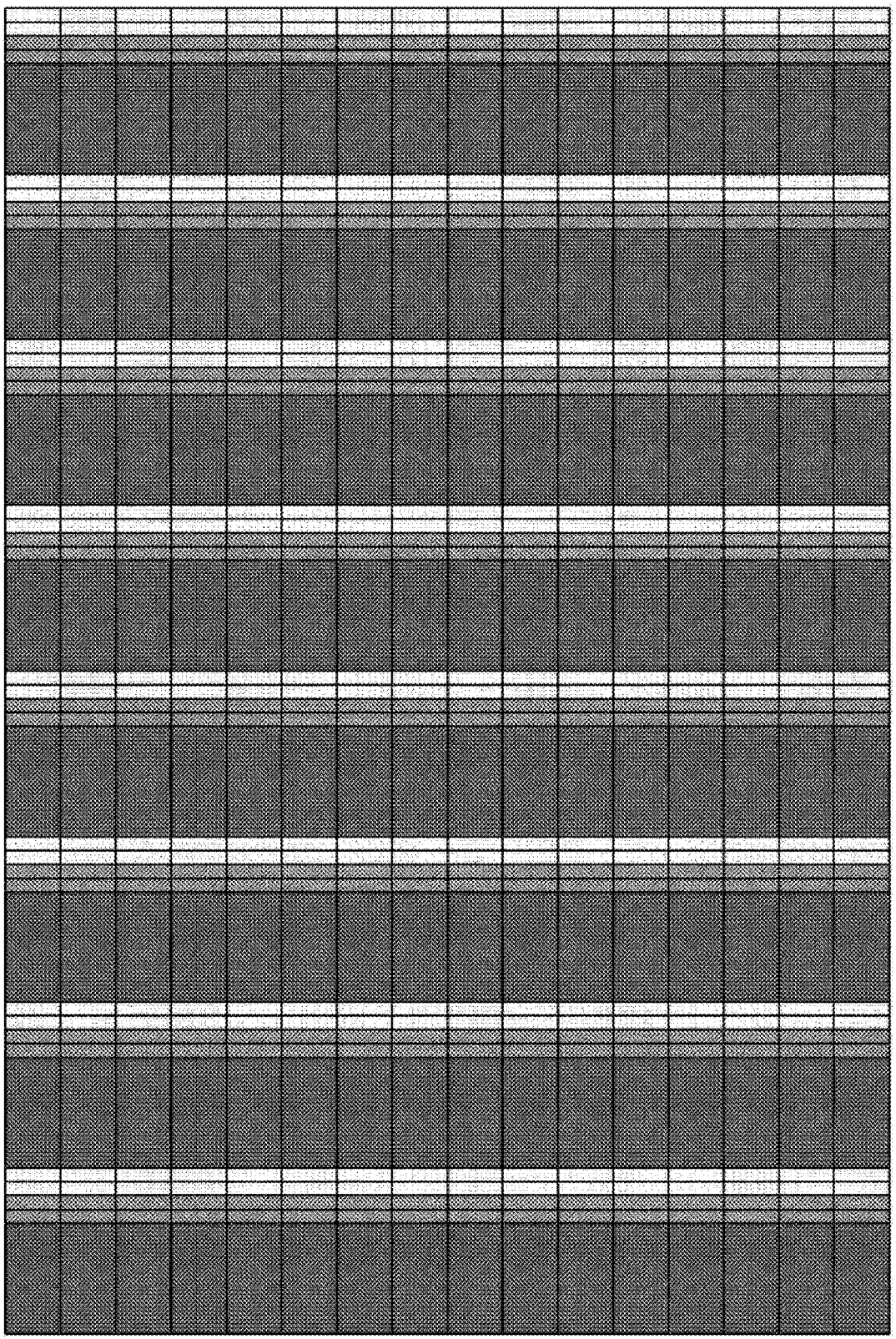
FIG. 4 is an enlarged schematic plan view illustrating a bright-dark pattern with a low to intermediate tone at a time when the liquid crystal panel is obliquely viewed from a direction indicated by an arrow.
Figure 5:
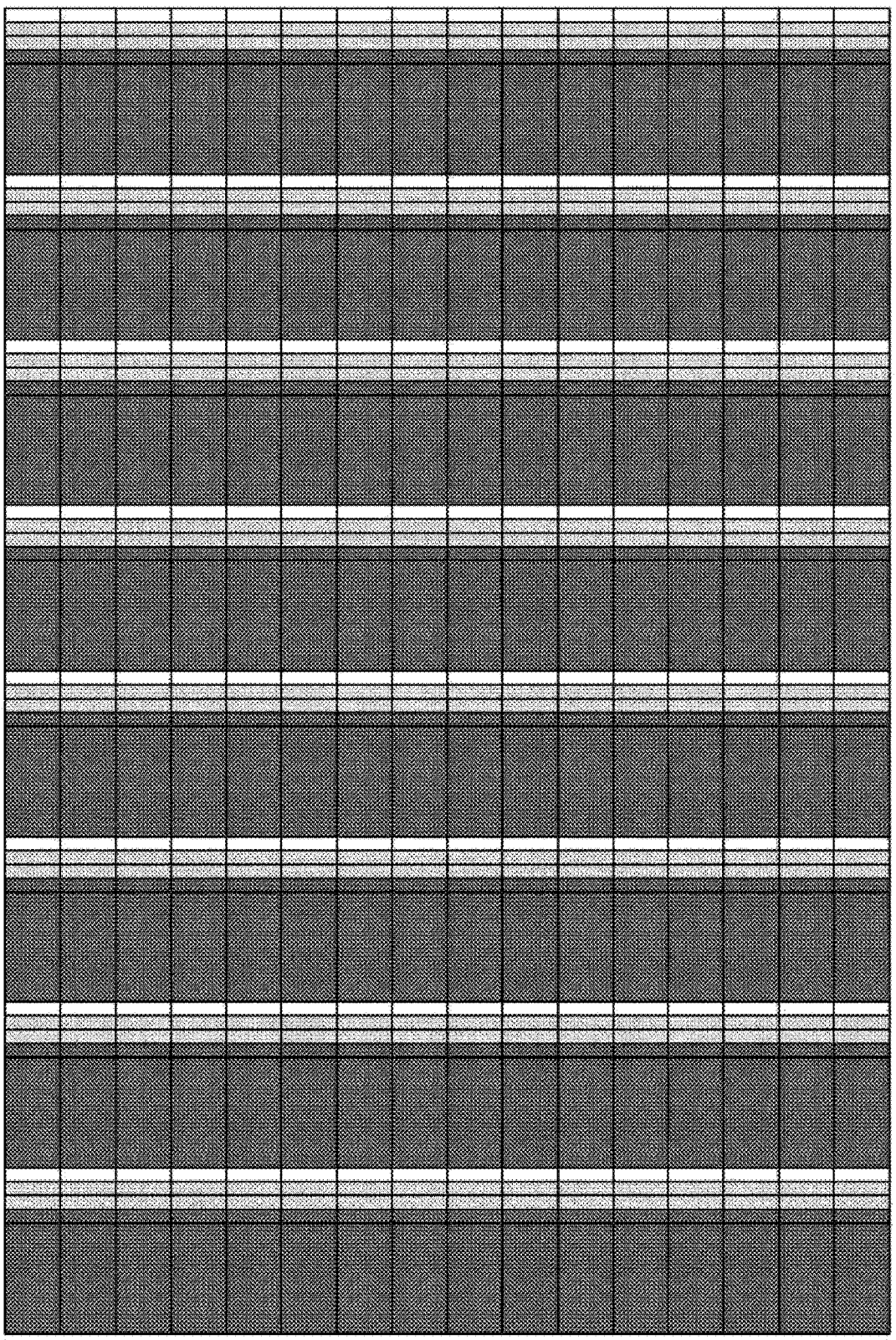
FIG. 5 is an enlarged schematic plan view illustrating a bright-dark pattern with a low to intermediate tone at a time when the liquid crystal panel is obliquely viewed from a direction indicated by another arrow.
Figure 6:
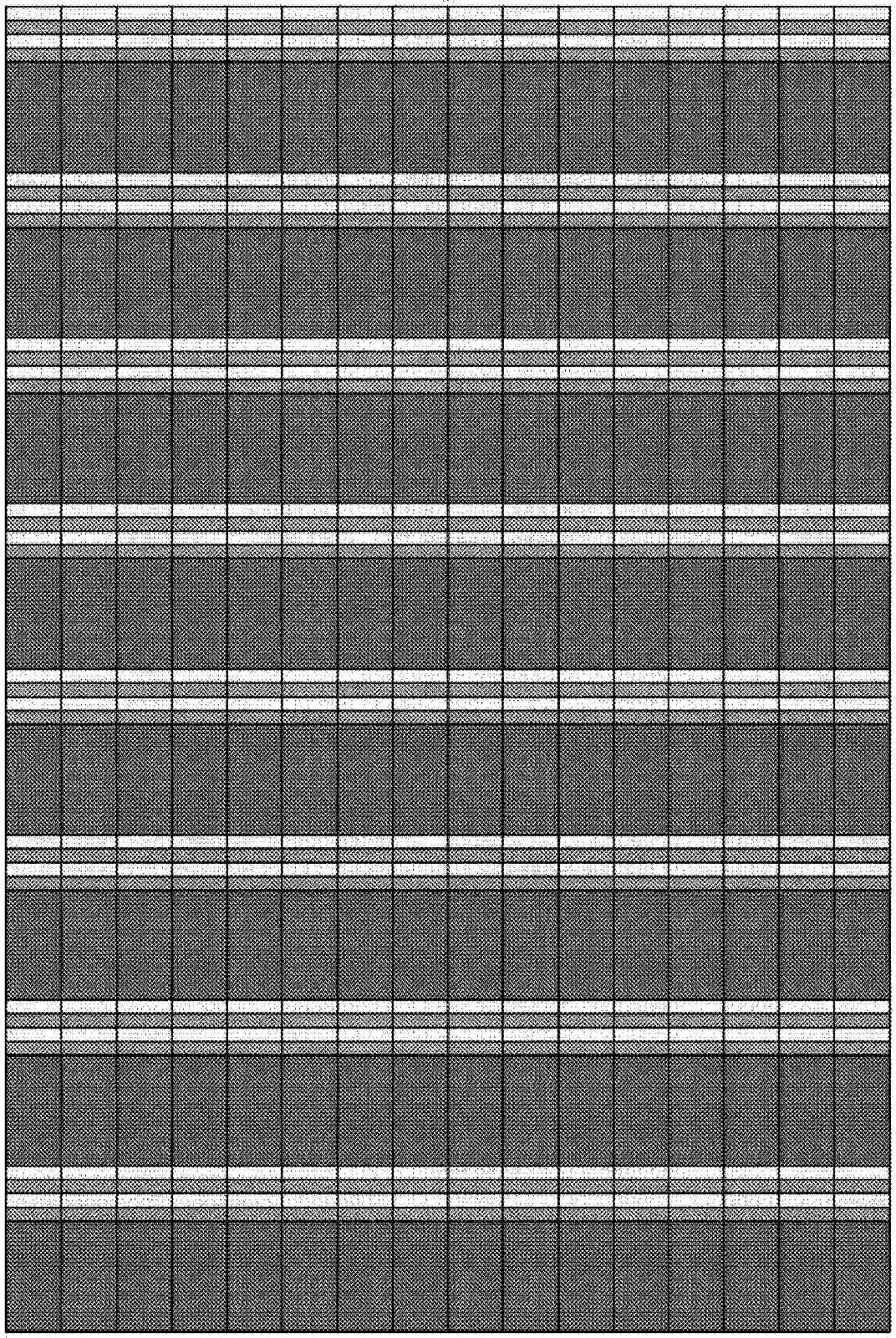
FIG. 6 is an enlarged schematic plan view illustrating a bright-dark pattern with a low to intermediate tone at a time when the liquid crystal panel is obliquely viewed from a direction indicated by yet another arrow.
Figure 7:
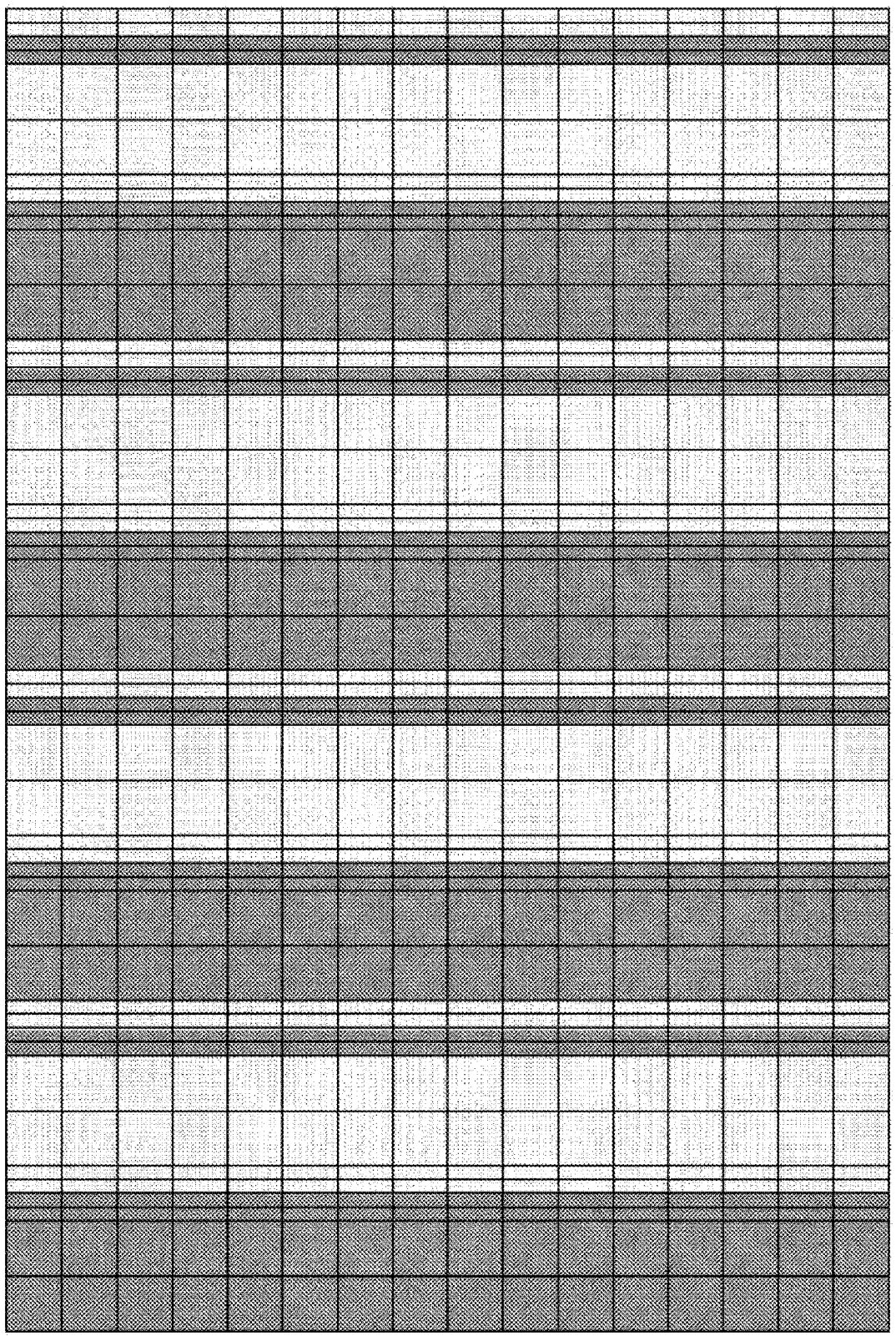
FIG. 7 is a schematic plan view illustrating a bright-dark pattern with an intermediate to high tone at a time when the liquid crystal panel is obliquely viewed from the direction indicated by the arrow.
Figure 8:
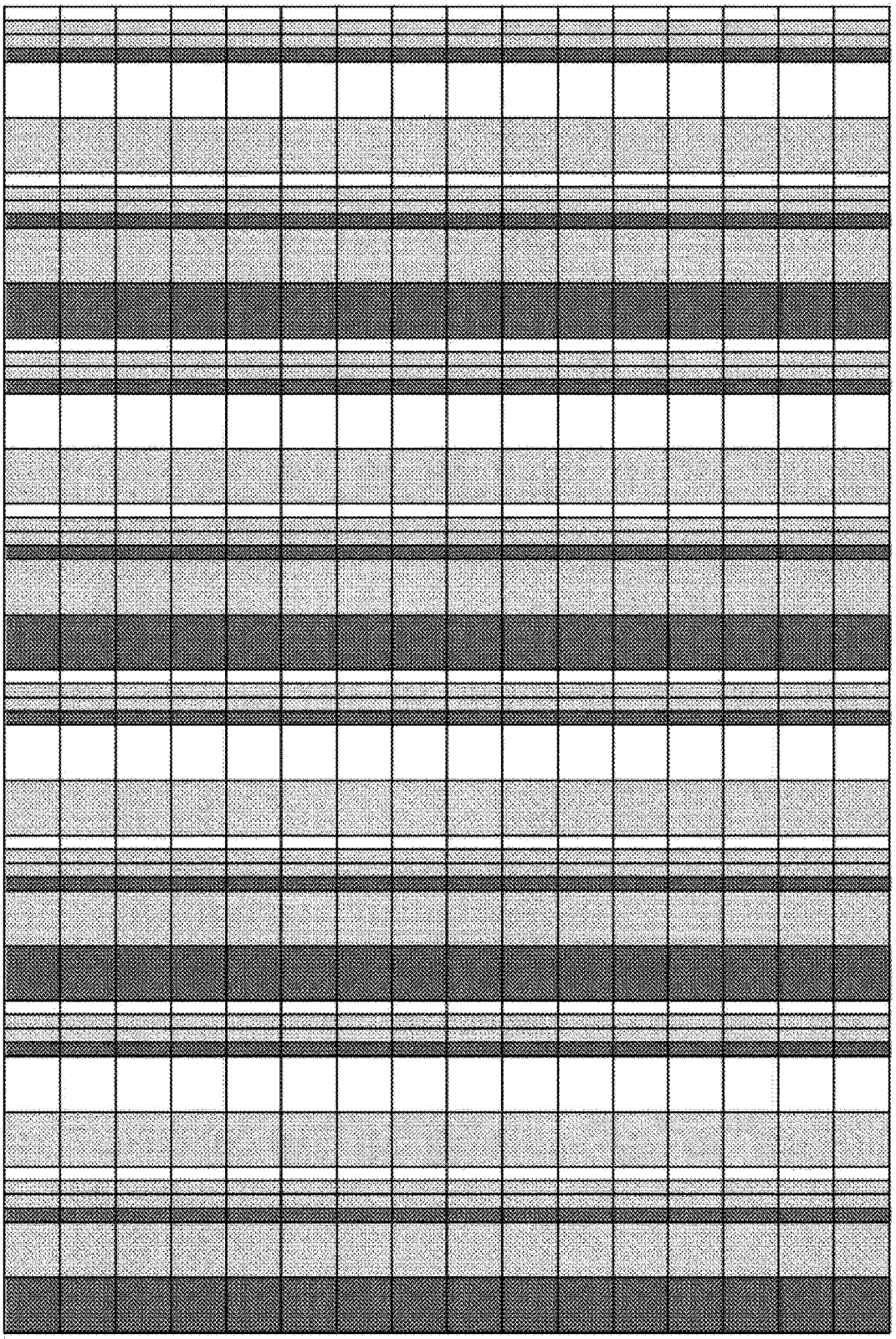
FIG. 8 is an enlarged schematic plan view illustrating a bright-dark pattern with an intermediate to high tone at a time when the liquid crystal panel is obliquely viewed from the direction indicated by the other arrow.
Figure 9:
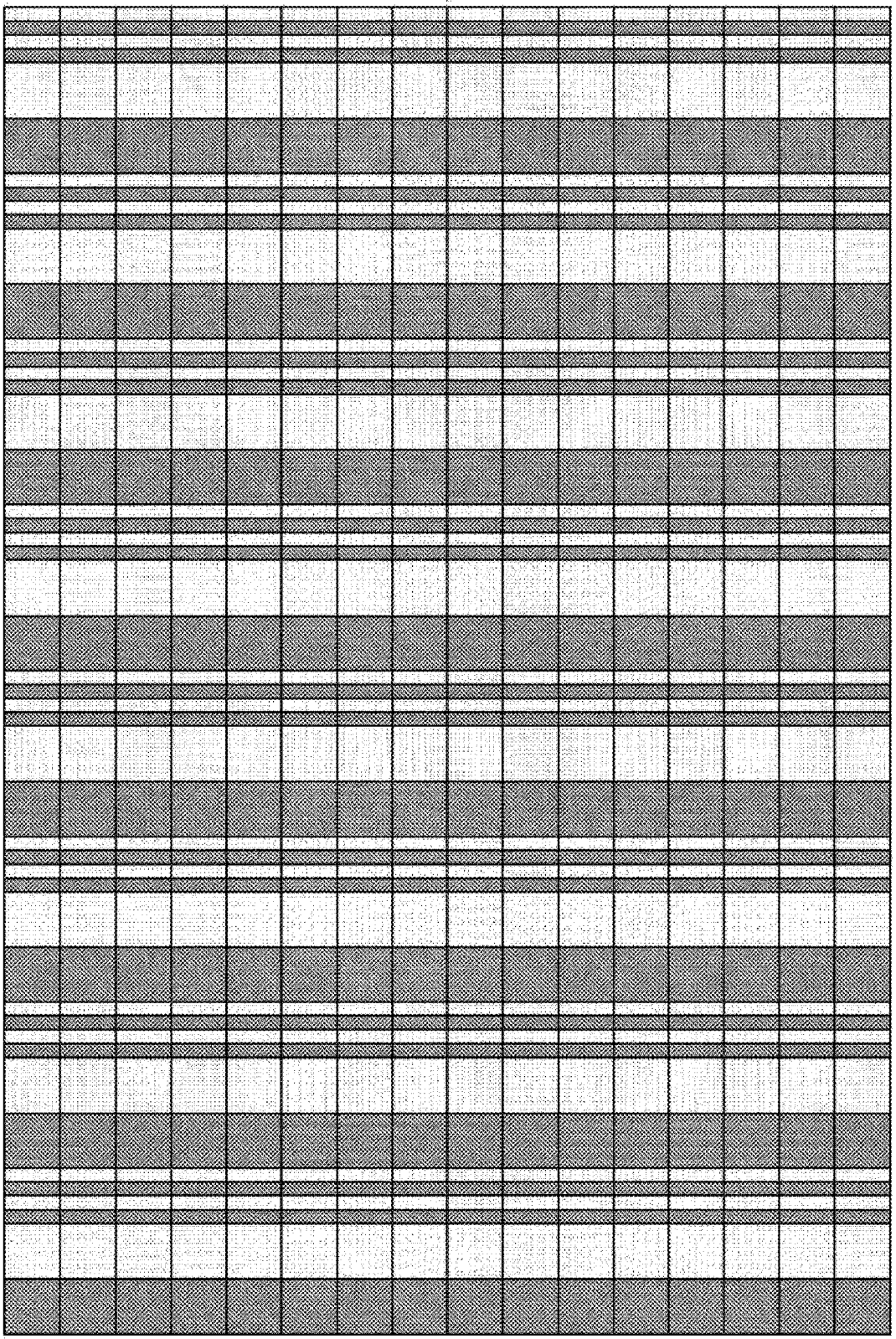
FIG. 9 is an enlarged schematic plan view illustrating a bright-dark pattern with an intermediate to high tone at a time when the liquid crystal panel is obliquely viewed from the direction indicated by the yet another arrow.

FIG. 4 is an enlarged schematic plan view illustrating a bright-dark pattern with a low to intermediate tone at a time when the liquid crystal panel 100 is obliquely viewed from a direction indicated by the arrow A1. FIG. 5 is an enlarged schematic plan view illustrating a bright-dark pattern with a low to intermediate tone at a time when the liquid crystal panel 100 is obliquely viewed from a direction indicated by the arrow A2. FIG. 6 is an enlarged schematic plan view illustrating a bright-dark pattern with a low to intermediate tone at a time when the liquid crystal panel 100 is obliquely viewed from a direction indicated by the arrow A3. FIG. 7 is a schematic plan view illustrating a bright-dark pattern with an intermediate to high tone at a time when the liquid crystal panel 100 is obliquely viewed from the direction indicated by the arrow A1. FIG. 8 is an enlarged schematic plan view illustrating a bright-dark pattern with an intermediate to high tone at a time when the liquid crystal panel 100 is obliquely viewed from the direction indicated by the arrow A2. FIG. 9 is an enlarged schematic plan view illustrating a bright-dark pattern with an intermediate to high tone at a time when the liquid crystal panel 100 is obliquely viewed from the direction indicated by the arrow A3.

Since the luminance of the dark subpixel DS is low with a low to intermediate tone, display quality depends on the bright subpixel BS. Since the bright subpixel BS includes four bright domains BD and a pattern of alignment directions of liquid crystal molecules 41 in two bright domains BD is repeated in every pixel in the column direction of the plurality of pixels P arranged in a matrix, high-resolution display is achieved regardless of a viewing direction.

The luminance of the dark subpixel DS is higher with an intermediate to high tone, and an effect of the dark subpixel DS is added to that of the bright subpixel BS in terms of display quality.

Since a pattern of alignment directions of liquid crystal molecules 41 in the two dark domains DD of each dark subpixel DS is repeated in every second pixel in the column direction of the plurality of pixels P arranged in a matrix, a bright-dark pattern is repeated at intervals of two rows as illustrated in FIGS. 7 and 8 when the liquid crystal panel 100 is obliquely viewed from the directions indicated by the arrows A1 and A2 in the case of intermediate to high tone display.

That is, in the case of an intermediate to high tone, an 8K panel exhibits a resolution equivalent to that of 4K when viewed in the A1 and A2 directions, and a 4K panel exhibits a resolution equivalent to that of FHD. That is, practically sufficient display quality is achieved.

In the case of front view, resolution does not decrease with any tone. With a low to intermediate tone, resolution does not decrease regardless of a direction from which the liquid crystal panel 100 is obliquely viewed. With an intermediate to high tone, resolution does not decrease when the liquid crystal panel 100 is obliquely viewed from the A3 direction.

Display quality that does not pose any practical problem is thus maintained while achieving both excellent transparency performance and excellent viewing angle performance.

(Second Example of Tilt Directions of Liquid Crystal Molecules)

Figure 10:
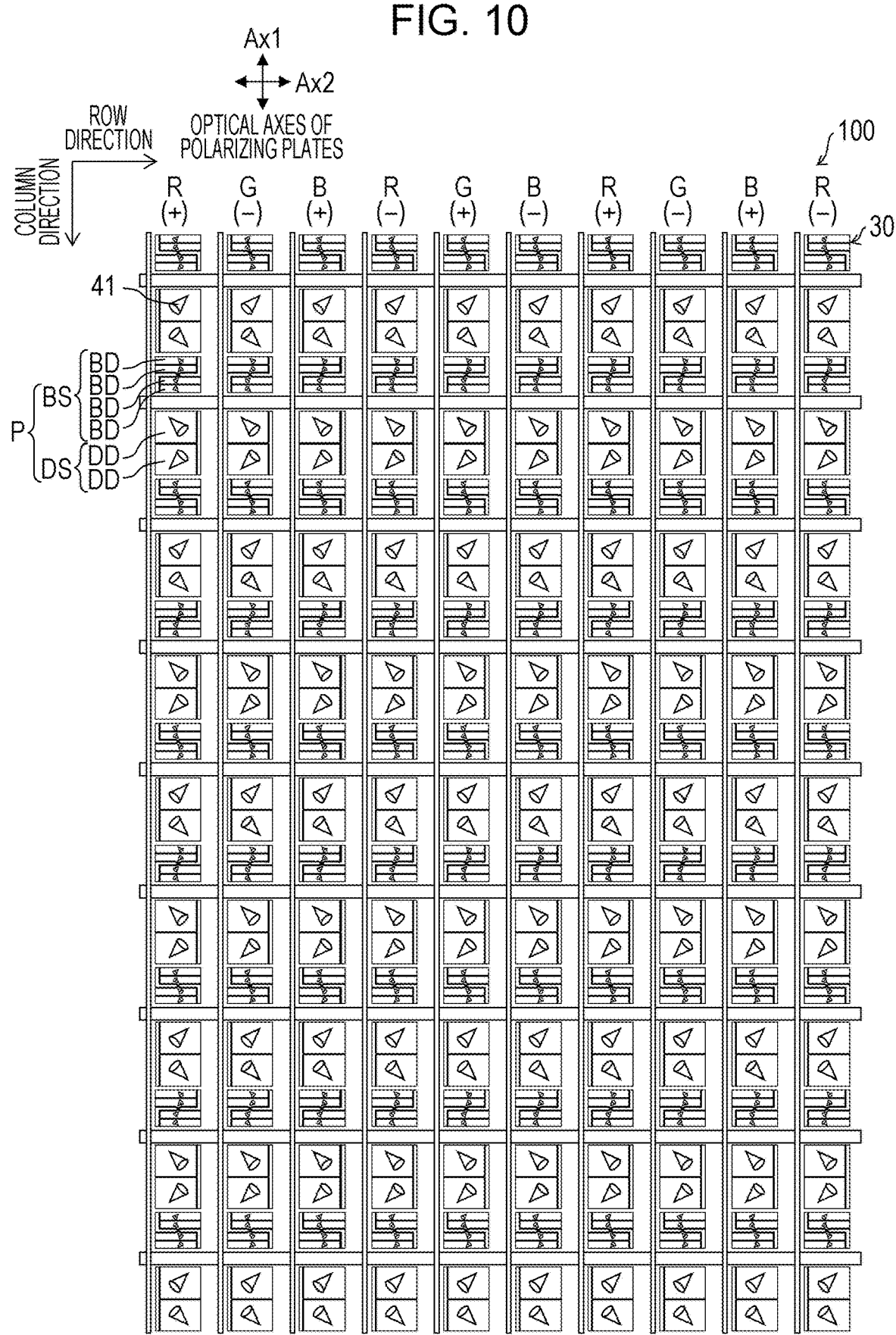
FIG. 10 is a schematic plan view illustrating other tilt directions of the liquid crystal molecules of the liquid crystal panel according to the embodiment.

FIG. 10 is a schematic plan view illustrating other tilt directions of the liquid crystal molecules 41 of the liquid crystal panel 100 according to the embodiment. The same components as those described above are given the same reference numerals, and detailed description thereof is not repeated.

A difference from the first example described with reference to FIG. 2 is that whereas the pattern of the alignment directions of the liquid crystal molecules 41 in the four bright domains BD is the same in the column direction of the pixels P arranged in matrix in the example illustrated in FIG. 2, a pattern of alignment directions of four bright domains BD is repeated in every second pixel in the column direction of the pixels P in the second example illustrated in FIG. 10.

Figure 13:
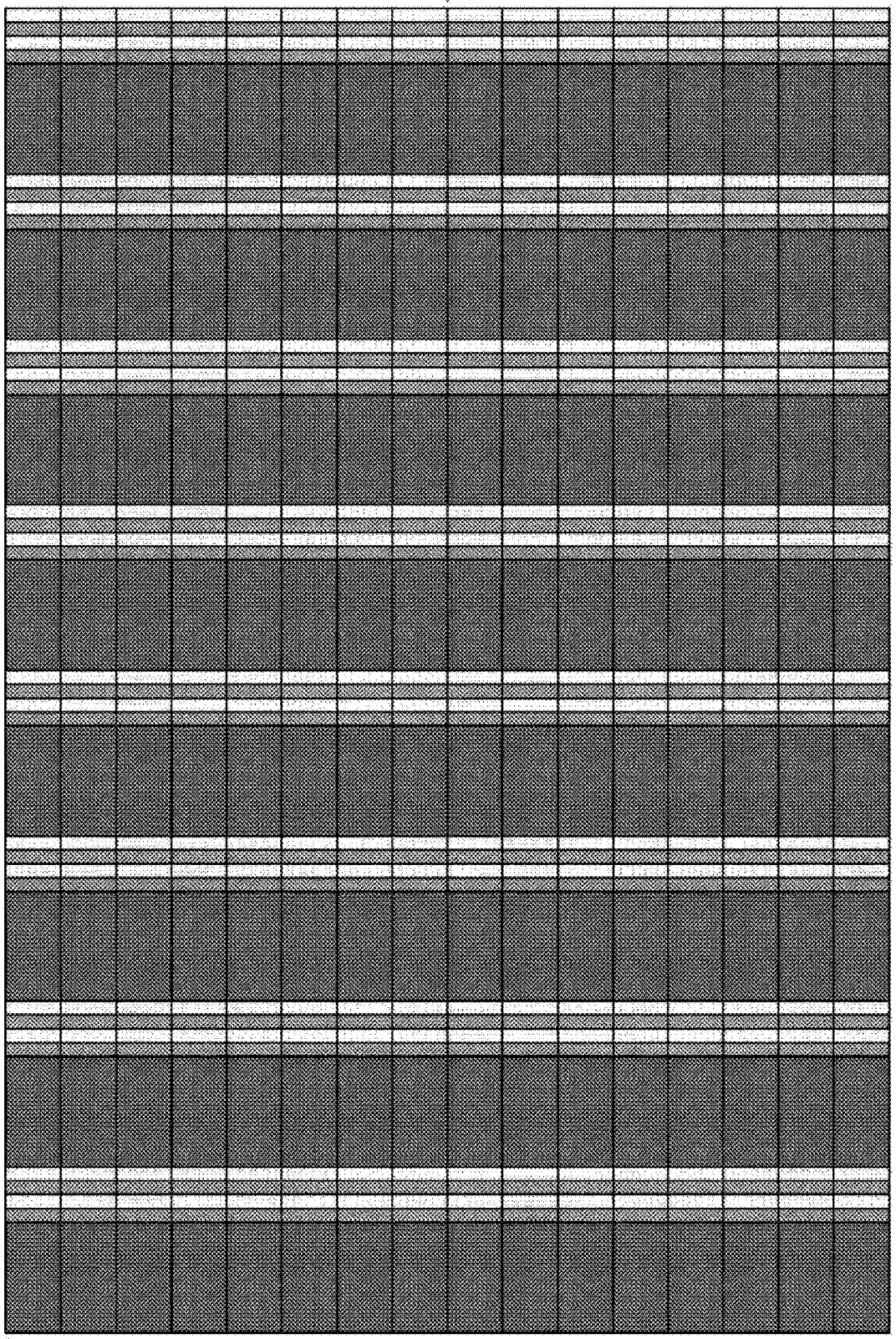
FIG. 13 is an enlarged schematic plan view illustrating a bright-dark pattern with a low to intermediate tone at a time when the liquid crystal panel is obliquely viewed from the direction indicated by the yet another arrow.
Figure 16:
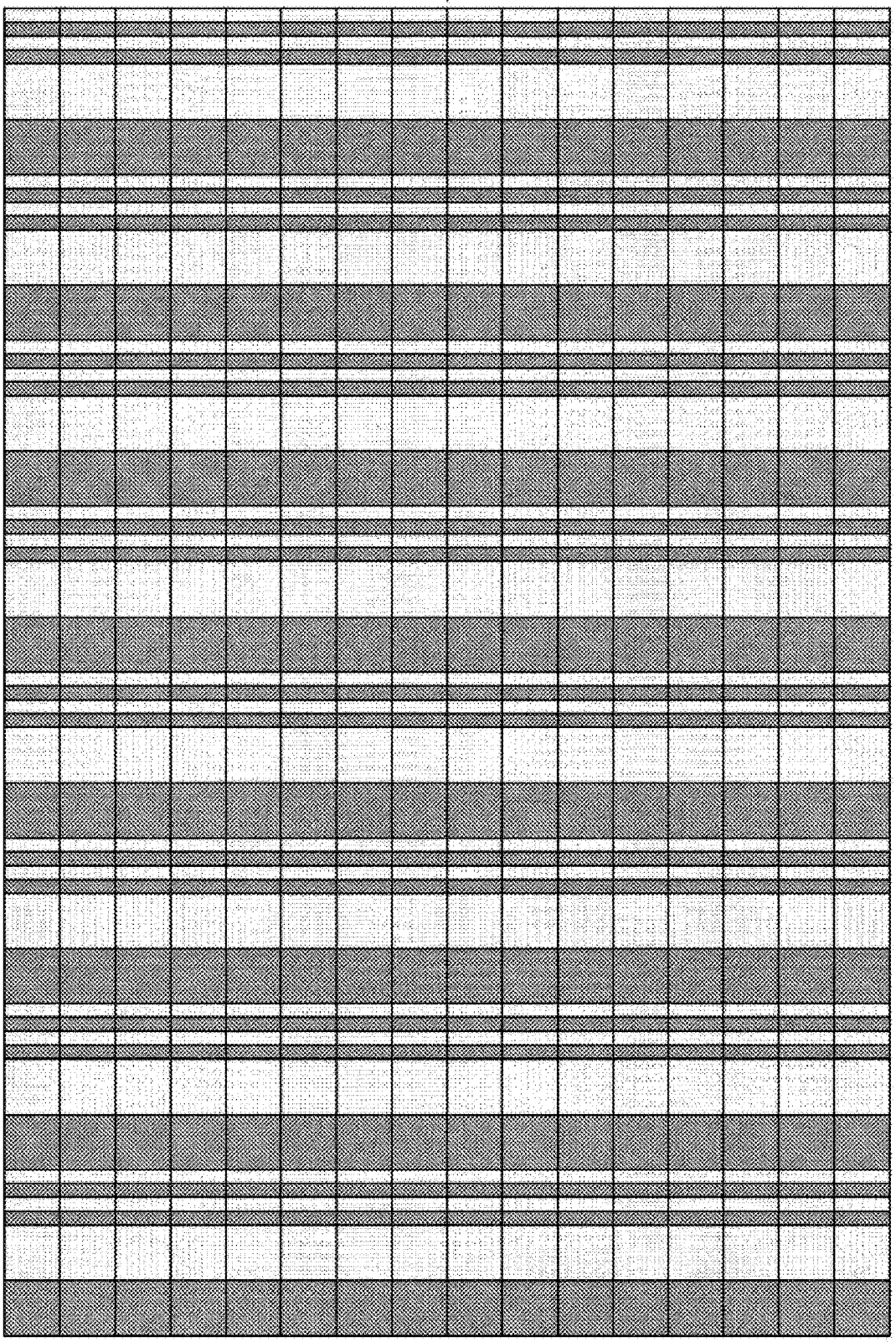
FIG. 16 is an enlarged schematic plan view illustrating a bright-dark pattern with an intermediate to high tone at a time when the liquid crystal panel is obliquely viewed from the direction indicated by the yet another arrow.

FIG. 11 is an enlarged schematic plan view illustrating a bright-dark pattern with a low to intermediate tone at a time when the liquid crystal panel 100 is obliquely viewed from the direction indicated by the arrow A1. FIG. 12 is an enlarged schematic plan view illustrating a bright-dark pattern with a low to intermediate tone at a time when the liquid crystal panel 100 is obliquely viewed from the direction indicated by the arrow A2. FIG. 13 is an enlarged schematic plan view illustrating a bright-dark pattern with a low to intermediate tone at a time when the liquid crystal panel 100 is obliquely viewed from the direction indicated by the arrow A3. FIG. 14 is a schematic plan view illustrating a bright-dark pattern with an intermediate to high tone at a time when the liquid crystal panel 100 is obliquely viewed from the direction indicated by the arrow A1. FIG. 15 is an enlarged schematic plan view illustrating a bright-dark pattern with an intermediate to high tone at a time when the liquid crystal panel 100 is obliquely viewed from the direction indicated by the arrow A2. FIG. 16 is an enlarged schematic plan view illustrating a bright-dark pattern with an intermediate to high tone at a time when the liquid crystal panel 100 is obliquely viewed from the direction indicated by the arrow A3.

As in the first example described above, since a pattern of alignment directions of the liquid crystal molecules 41 in the two dark domains DD of each dark subpixel DS is repeated in every second pixel in the column direction of the pixels P arranged in a matrix, a bright-dark pattern is repeated at intervals of two rows as illustrated in FIGS. 14 and 15 when the liquid crystal panel 100 is obliquely viewed from the directions indicated by the arrows A1 and A2 in the case of intermediate to high tone display.

Since a pattern of alignment directions of the liquid crystal molecules 41 in the four bright domains BD of each bright subpixel BS and the two dark domains DD of each dark subpixel DS is repeated in every second pixel in the column directions of the pixels P arranged in a matrix in the present embodiment, a bright-dark pattern is repeated at intervals of two rows as illustrated in FIGS. 14 and 15 when the liquid crystal panel 100 is obliquely viewed from the directions indicated by the arrows A1 and A2 regardless of a type of tone display.

That is, an 8K panel exhibits a resolution equivalent to that of 4K when viewed in the A1 and A2 directions, and a 4K panel exhibits a resolution equivalent to that of FHD. That is, practically sufficient display quality is achieved.

In the case of front view, resolution does not decrease with any tone. With a low to intermediate tone, resolution does not decrease regardless of a direction from which the liquid crystal panel 100 is obliquely viewed.

By repeating a pattern of alignment directions of four bright domains BD in every second pixel in the column direction of the pixels P, stable display quality is achieved even if domain size is reduced. This is because variation in domain area caused during a manufacturing process is compensated by vertically adjacent pixels P.

(Comparative Example)

Figure 17:
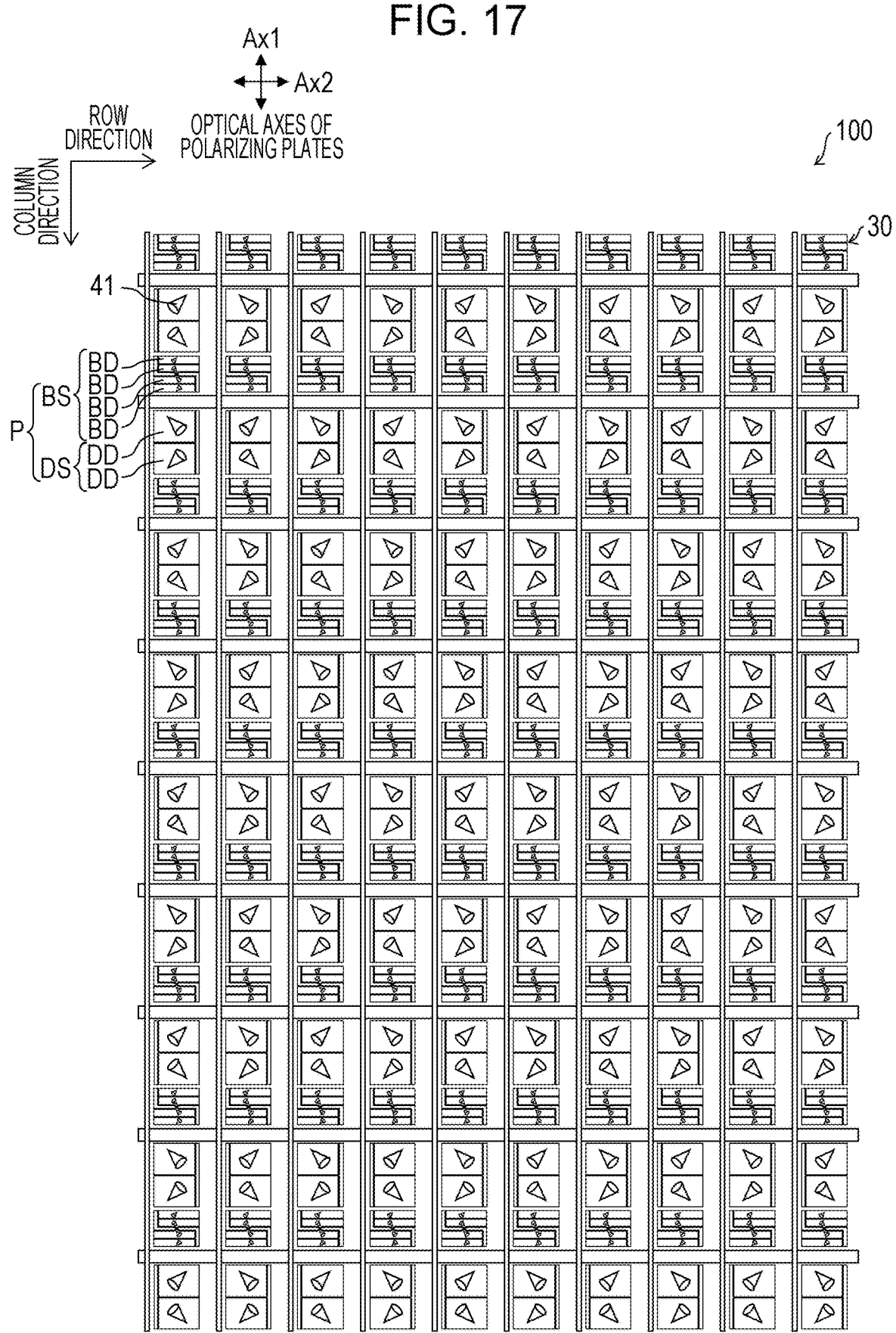
FIG. 17 is a schematic plan view illustrating tilt directions of liquid crystal molecules of a liquid crystal panel in a comparative example.

FIG. 17 is a schematic plan view illustrating tilt directions of liquid crystal molecules of a liquid crystal panel in a comparative example. The same components as those described above are given the same reference numerals, and detailed description thereof is not repeated.

A difference from the first example described with reference to FIG. 2 is that whereas alignment directions of liquid crystal molecules 41 in the L-th (1≤L≤2) dark domains DD among every two dark domains DD arranged in the column direction of the pixels P arranged in the row direction are the same, the alignment directions are different from one another in the comparative example illustrated in FIG. 17.

Figure 18:
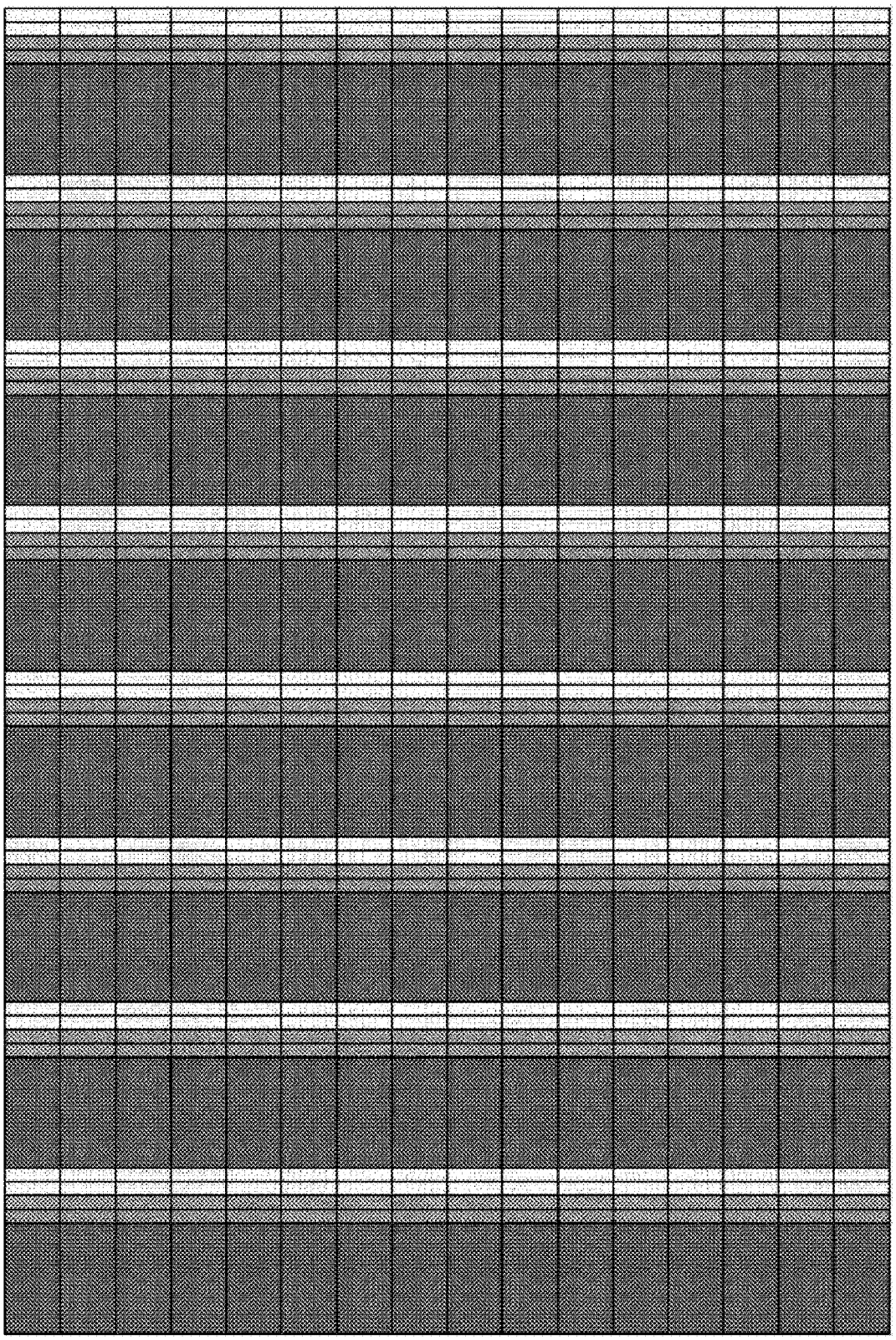
FIG. 18 is an enlarged schematic plan view illustrating a bright-dark pattern with a low to intermediate tone when the liquid crystal panel is obliquely viewed from the direction indicated by the arrow.
Figure 19:
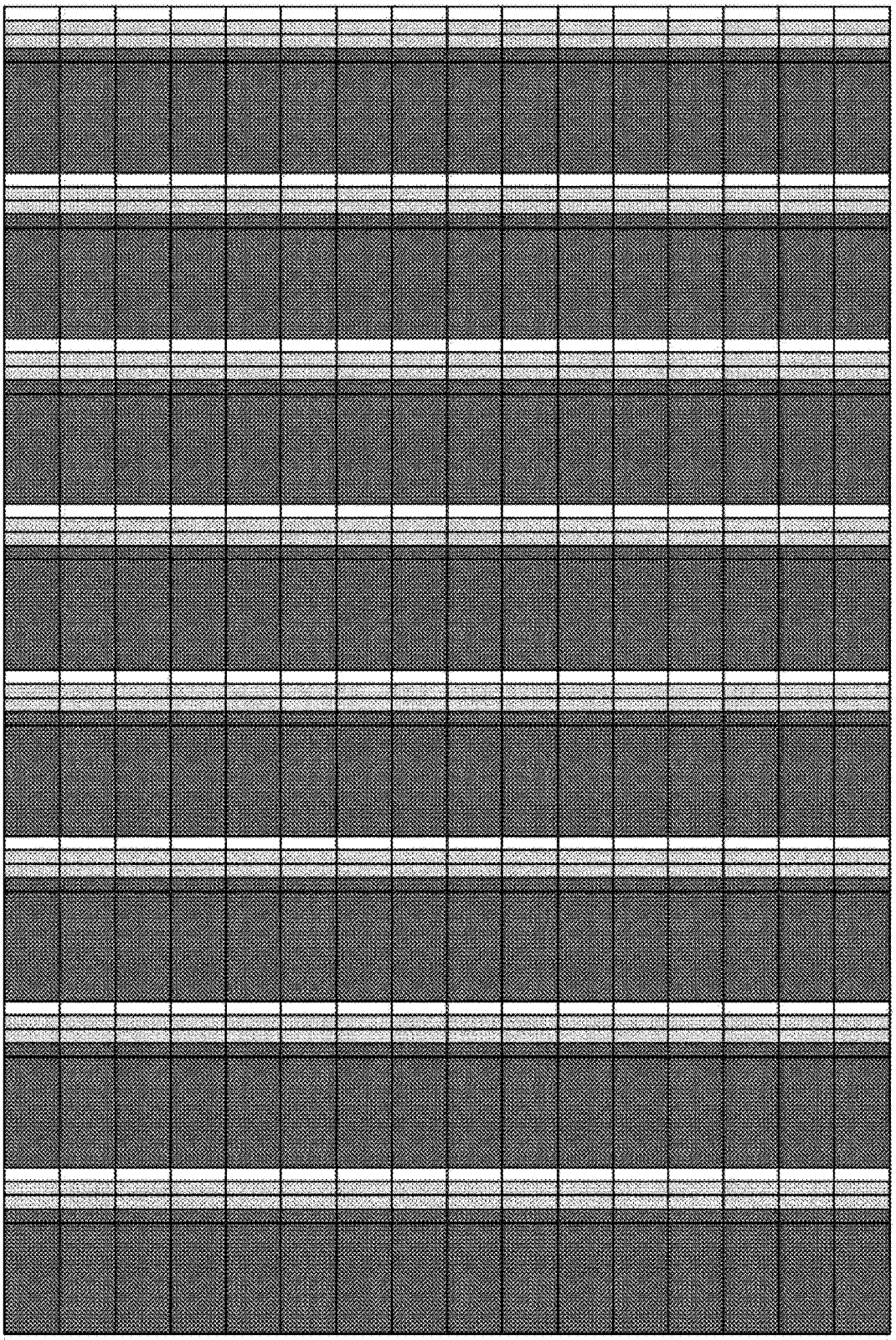
FIG. 19 is an enlarged schematic plan view illustrating a bright-dark pattern with a low to intermediate tone when the liquid crystal panel is obliquely viewed from the direction indicated by the other arrow.
Figure 20:
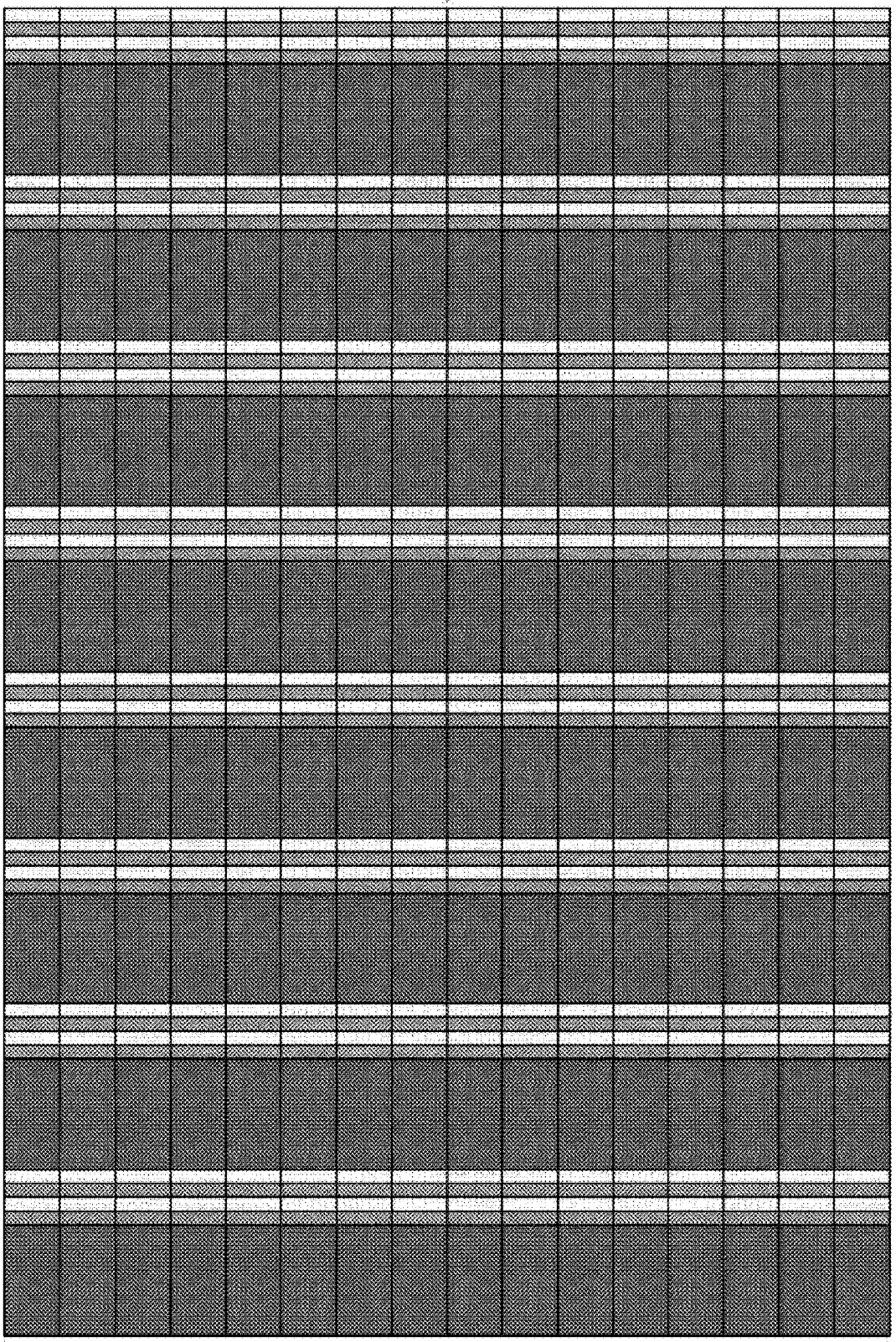
FIG. 20 is an enlarged schematic plan view illustrating a bright-dark pattern with a low to intermediate tone when the liquid crystal panel is obliquely viewed from the direction indicated by the yet another arrow.
Figure 21:
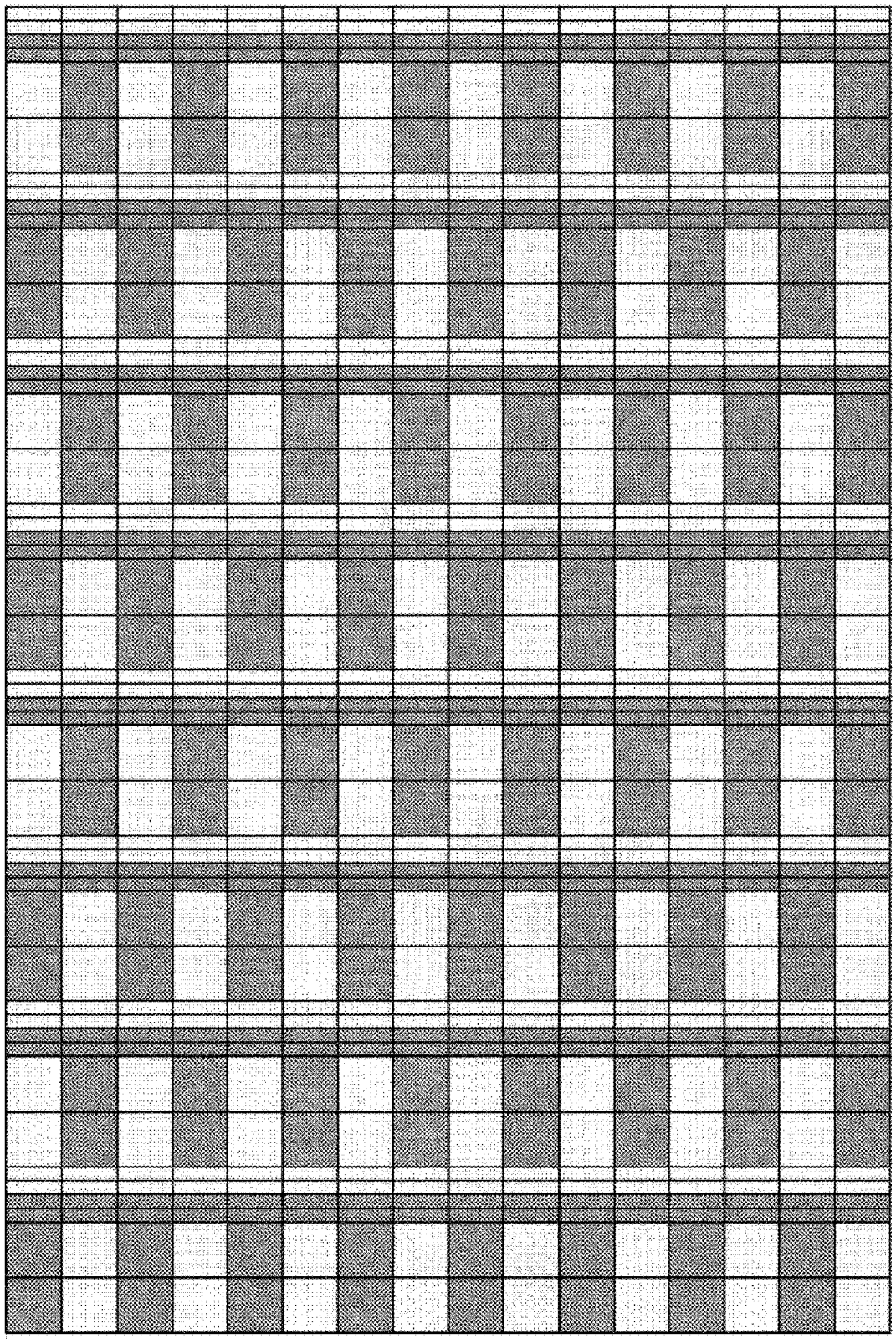
FIG. 21 is a schematic plan view illustrating a bright-dark pattern with an intermediate to high tone when the liquid crystal panel is obliquely viewed from the direction indicated by the arrow.
Figure 22:
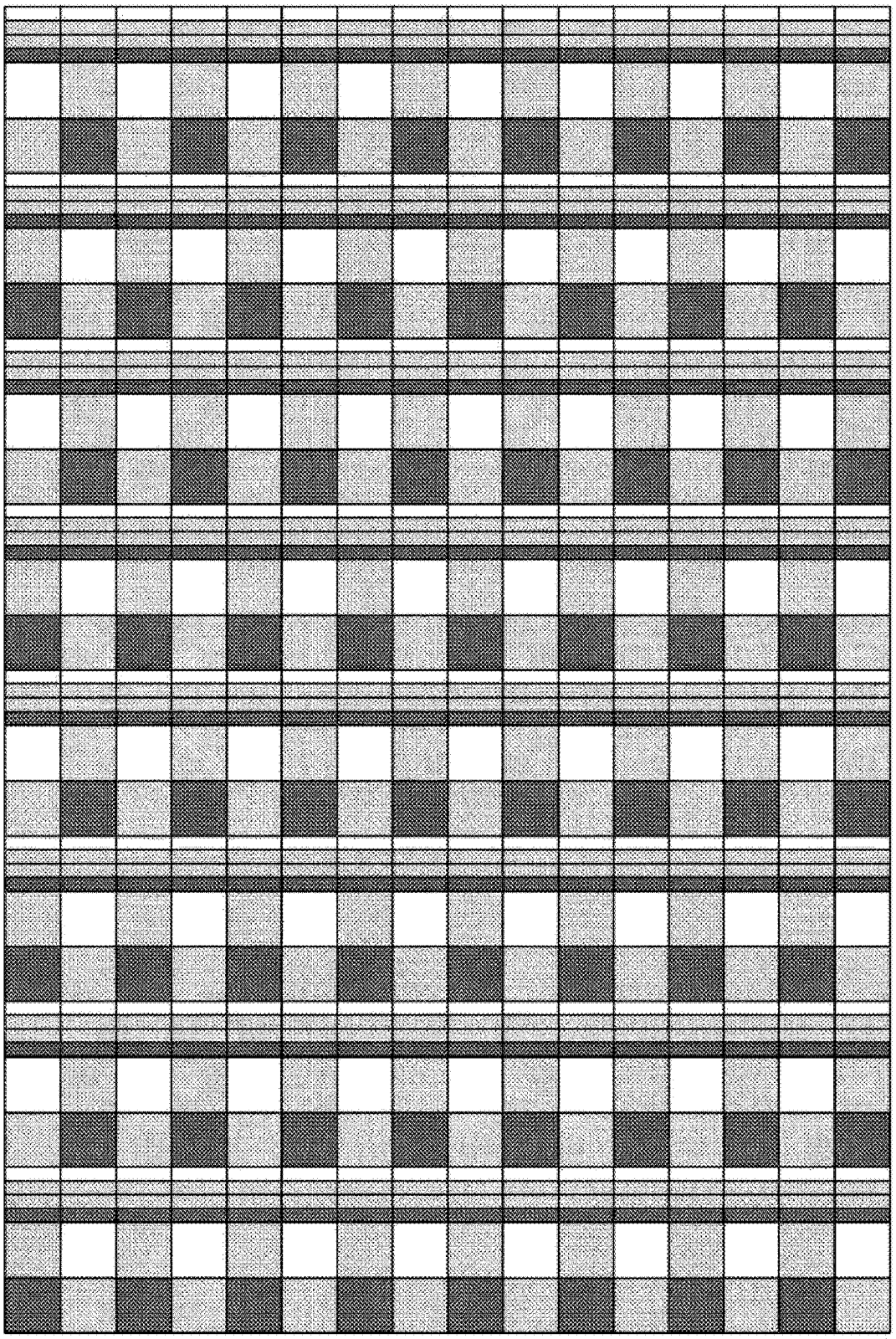
FIG. 22 is an enlarged schematic plan view illustrating a bright-dark pattern with an intermediate to high tone when the liquid crystal panel is obliquely viewed from the direction indicated by the other arrow.
Figure 23:
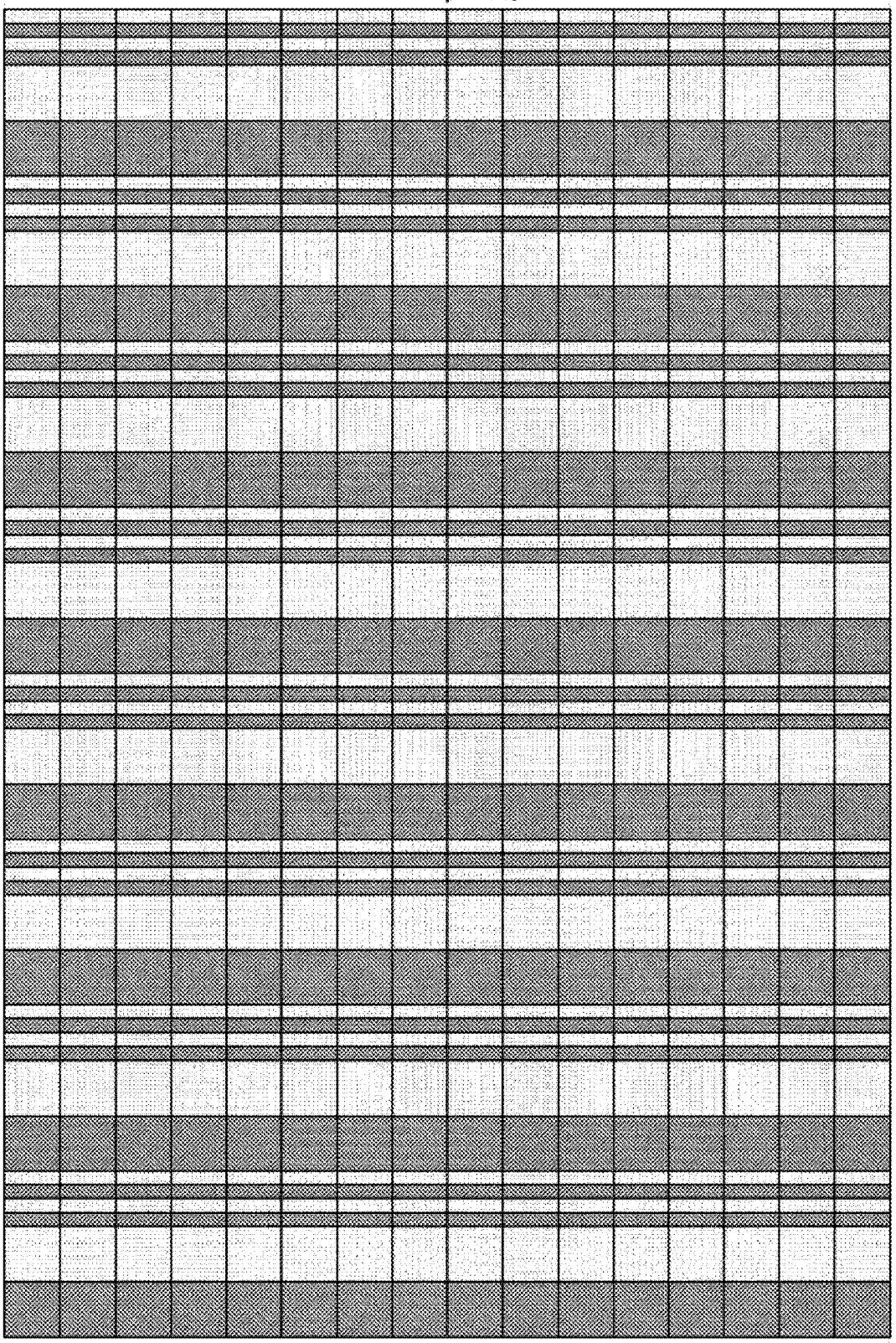
FIG. 23 is an enlarged schematic plan view illustrating a bright-dark pattern with an intermediate to high tone when the liquid crystal panel is obliquely viewed from the direction indicated by the yet another arrow.

FIG. 18 is an enlarged schematic plan view illustrating a bright-dark pattern with a low to intermediate tone when the liquid crystal panel in the comparative example is obliquely viewed from the direction indicated by the arrow A1. FIG. 19 is an enlarged schematic plan view illustrating a bright-dark pattern with a low to intermediate tone when the liquid crystal panel in the comparative example is obliquely viewed from the direction indicated by the arrow A2. FIG. 20 is an enlarged schematic plan view illustrating a bright-dark pattern with a low to intermediate tone when the liquid crystal panel in the comparative example is obliquely viewed from the direction indicated by the arrow A3. FIG. 21 is a schematic plan view illustrating a bright-dark pattern with an intermediate to high tone when the liquid crystal panel in the comparative example is obliquely viewed from the direction indicated by the arrow A1. FIG. 22 is an enlarged schematic plan view illustrating a bright-dark pattern with an intermediate to high tone when the liquid crystal panel in the comparative example is obliquely viewed from the direction indicated by the arrow A2. FIG. 23 is an enlarged schematic plan view illustrating a bright-dark pattern with an intermediate to high tone when the liquid crystal panel in the comparative example is obliquely viewed from the direction indicated by the arrow A3.

As in the first example described above, a bright-dark pattern is repeated at intervals of two rows as illustrated in FIGS. 21 and 22 when the liquid crystal panel is obliquely viewed from the directions indicated by the arrows A1 and A2 in the case of intermediate to high tone display. Whereas the bright-dark pattern when the liquid crystal panel 100 is obliquely viewed from the directions indicated by the arrows A1 and A2 is a stripe in the first example, however, the bright-dark pattern is a checked mesh image as illustrated in FIGS. 21 and 22 since alignment directions of liquid crystal molecules 41 in the L-th (1≤L≤2) dark domains DD among every two dark domains DD of the pixels P arranged in the row direction are different from one another.

As a result, changes and a sense of incongruity are caused in display quality between front view and oblique view. In the case of solid display, for example, graininess is caused when the liquid crystal panel is obliquely viewed. When a horizontal stripe or a horizontal line is displayed, the horizontal stripe or the horizontal line looks like a straight line when viewed from the front but looks like a zigzag when viewed obliquely.

Alignment directions of two dark domains DD are preferably the same so that the bright-dark pattern becomes not a checked pattern but a stripe pattern as in the first and second examples.

(Third Example of Tilt Directions of Liquid Crystal Molecules)

Figure 24:
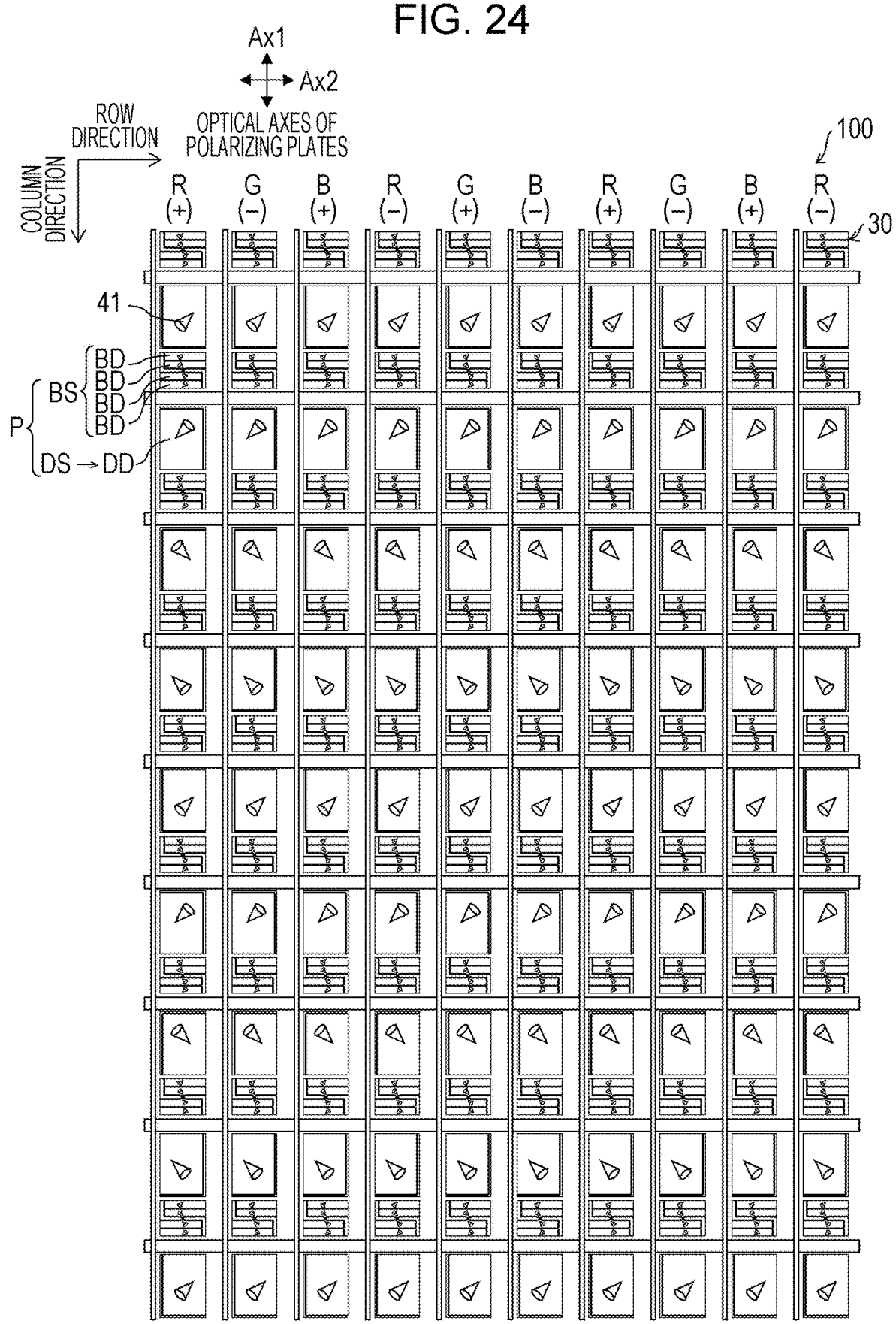
FIG. 24 is a schematic plan view illustrating yet other tilt directions of the liquid crystal molecules of the liquid crystal panel according to the embodiment.

FIG. 24 is a schematic plan view illustrating yet other tilt directions of the liquid crystal molecules of the liquid crystal panel according to the embodiment. The same components as those described above are given the same reference numerals, and detailed description thereof is not repeated.

A difference from the first example described with reference to FIG. 2 is that whereas each dark subpixel DS includes two dark domains DD in the example illustrated in FIG. 2, each dark subpixel DS includes one dark domain DD in a third example illustrated in FIG. 24. A pattern of alignment directions of liquid crystal molecules 41 corresponding to each dark domain DD is repeated in every fourth pixel in the column direction of the pixels P arranged in a matrix. In the example illustrated in FIG. 24, for example, an alignment direction of liquid crystal molecules 41 in the dark domain DD is repeated in every fourth pixel in a direction indicated by an arrow F, a direction indicated by an arrow B, a direction indicated by an arrow H, and a direction indicated by an arrow D in FIG. 59.

Since each dark subpixel DS includes one domain, dark lines at boundaries between domains are reduced and transparency improves while the bright subpixel BS secures viewing angle performance with four domains.

Although the number of horizontal dark lines caused in each dark subpixel DS is one as in the first and second examples, in which each dark subpixel DS includes two domains, a position at which a horizontal dark line is caused is at an edge of the dark subpixel DS unlike in the first and second examples, in which a horizontal dark line is caused at the center of the dark subpixel DS. In addition, the area of each dark domain DD is larger than in the first and second examples. A loss in transparency in the third example, in which each dark subpixel DS includes one domain, therefore, can be smaller than in the first and second examples, in which each dark subpixel DS includes two domains. An advantage of reducing a loss in transparency is significant especially when resolution is high.

Figure 25:
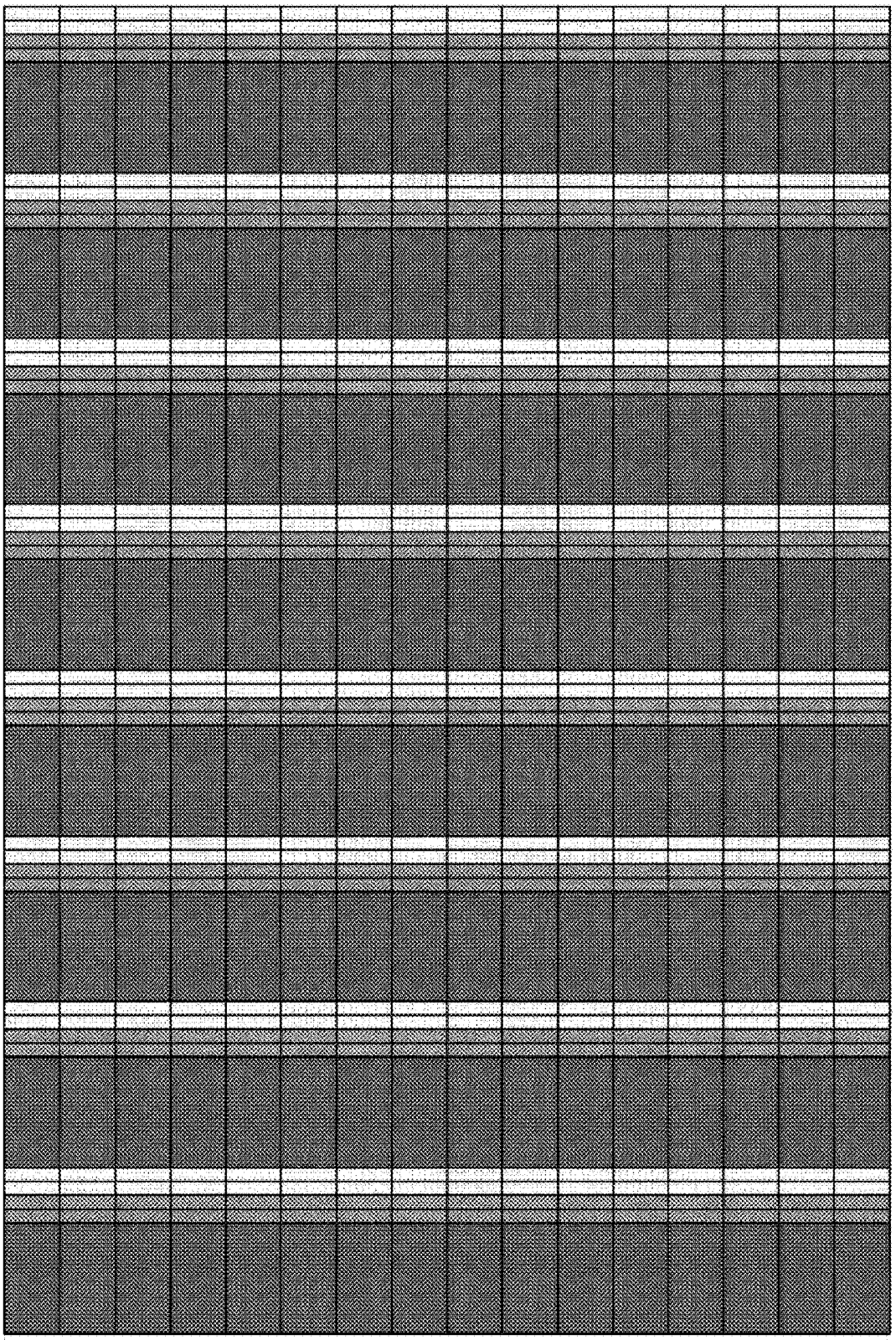
FIG. 25 is an enlarged schematic plan view illustrating a bright-dark pattern with a low to intermediate tone when the liquid crystal panel is obliquely viewed from the direction indicated by the arrow.
Figure 27:
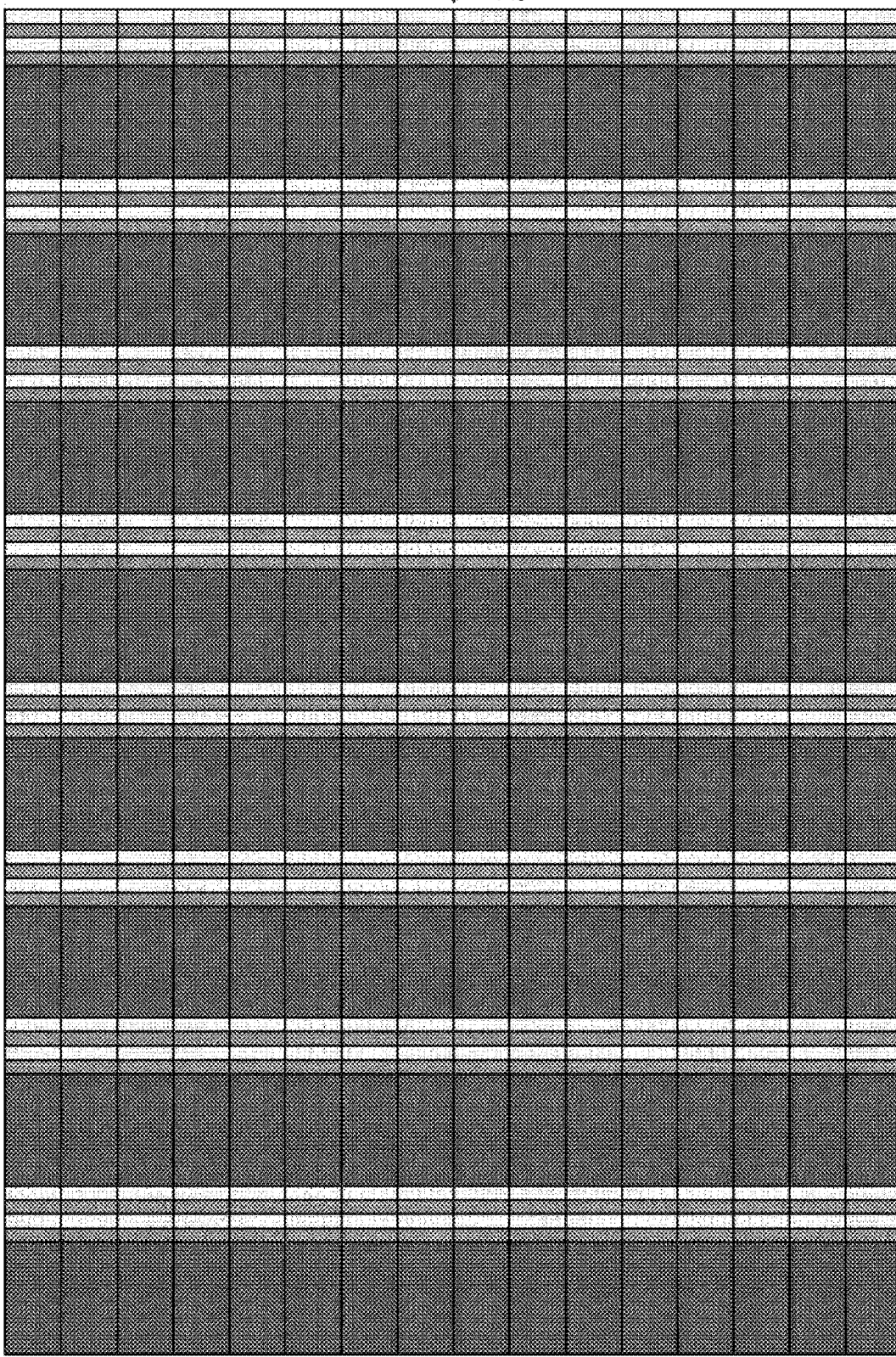
FIG. 27 is an enlarged schematic plan view illustrating a bright-dark pattern with a low to intermediate tone when the liquid crystal panel is obliquely viewed from the direction indicated by the yet another arrow.
Figure 28:
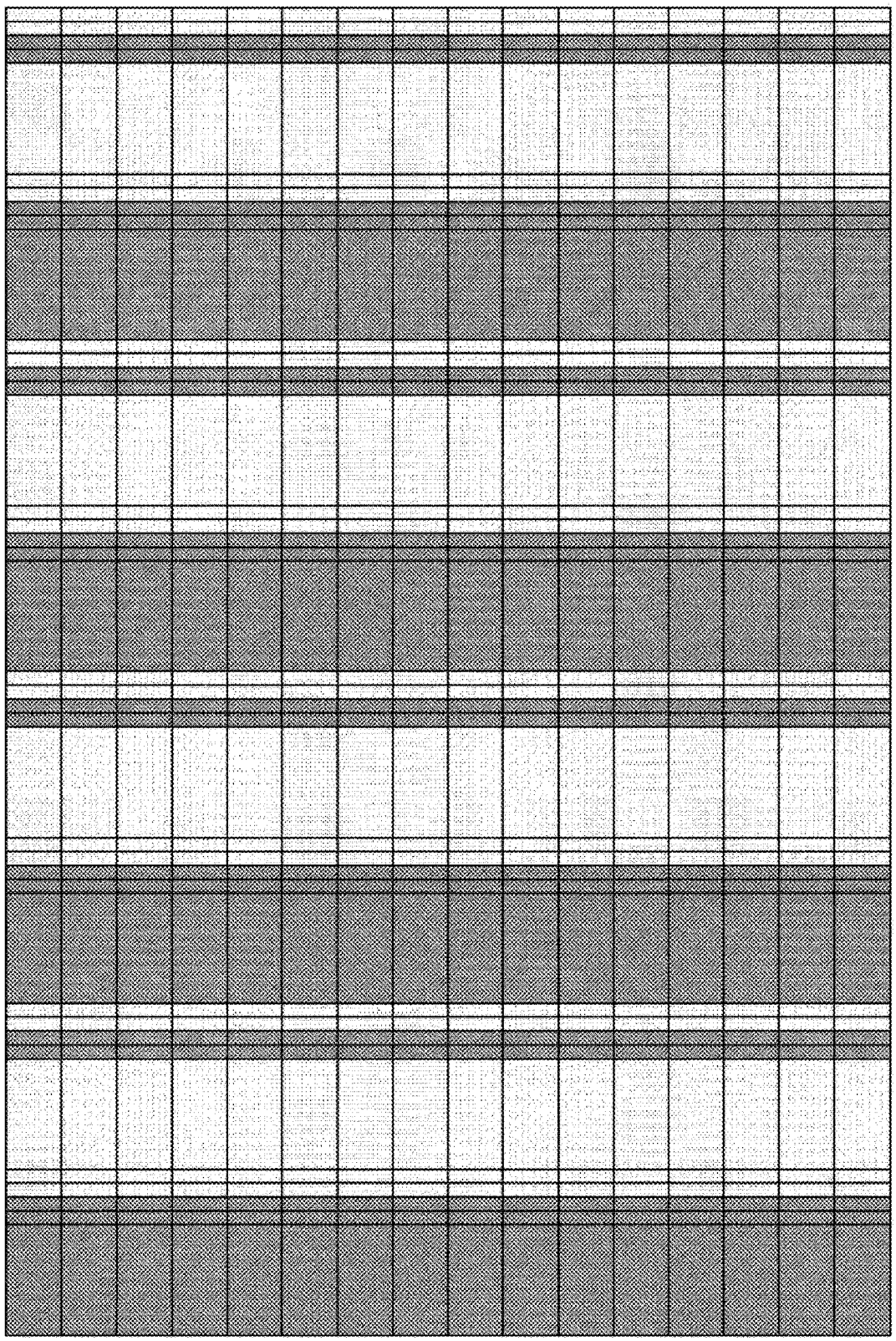
FIG. 28 is a schematic plan view illustrating a bright-dark pattern with an intermediate to high tone when the liquid crystal panel is obliquely viewed from the direction indicated by the arrow.
Figure 29:
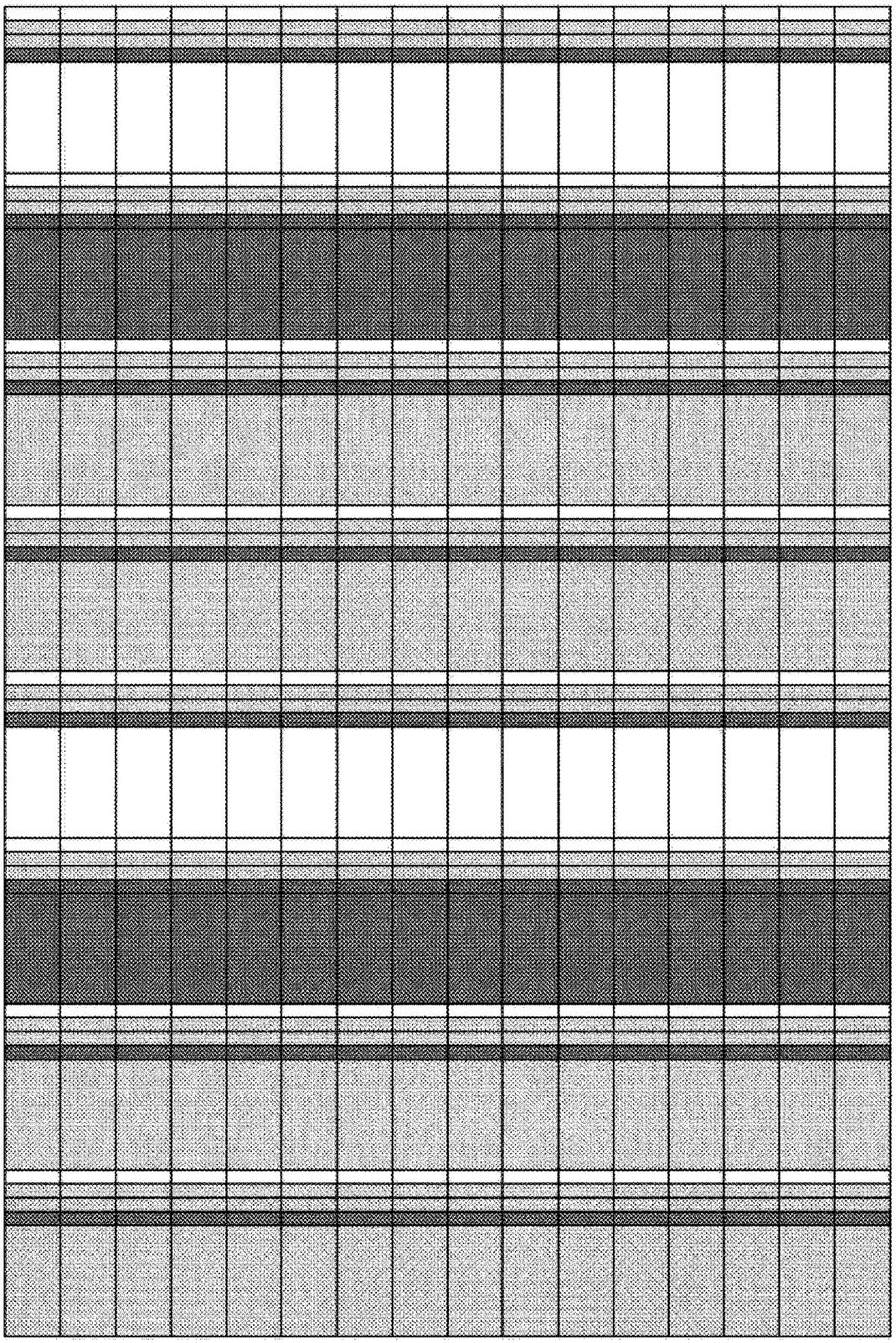
FIG. 29 is an enlarged schematic plan view illustrating a bright-dark pattern with an intermediate to high tone when the liquid crystal panel is obliquely viewed from the direction indicated by the other arrow.
Figure 30:
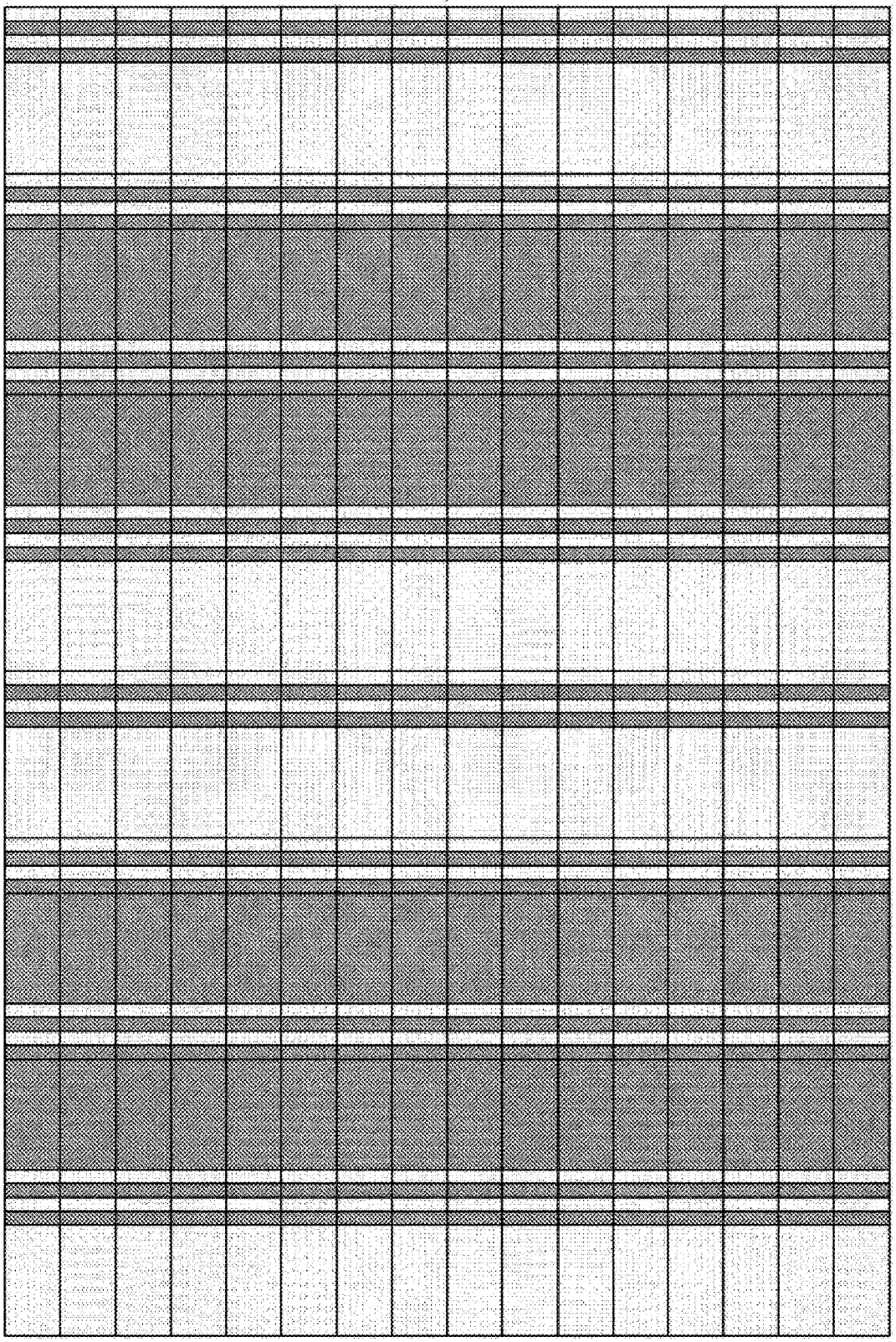
FIG. 30 is an enlarged schematic plan view illustrating a bright-dark pattern with an intermediate to high tone when the liquid crystal panel is obliquely viewed from the direction indicated by the yet another arrow.

FIG. 25 is an enlarged schematic plan view illustrating a bright-dark pattern with a low to intermediate tone at a time when the liquid crystal panel 100 is obliquely viewed in the direction indicated by the arrow A1. FIG. 26 is an enlarged schematic plan view illustrating a bright-dark pattern with a low to intermediate tone at a time when the liquid crystal panel 100 is obliquely viewed in the direction indicated by the arrow A2. FIG. 27 is an enlarged schematic plan view illustrating a bright-dark pattern with a low to intermediate tone at a time when the liquid crystal panel 100 is obliquely viewed in the direction indicated by the arrow A3. FIG. 28 is a schematic plan view illustrating a bright-dark pattern with an intermediate to high tone at a time when the liquid crystal panel 100 is obliquely viewed in the direction indicated by the arrow A1. FIG. 29 is an enlarged schematic plan view illustrating a bright-dark pattern with an intermediate to high tone at a time when the liquid crystal panel 100 is obliquely viewed in the direction indicated by the arrow A2. FIG. 30 is an enlarged schematic plan view illustrating a bright-dark pattern with an intermediate to high tone at a time when the liquid crystal panel 100 is obliquely viewed in the direction indicated by the arrow A3.

Since the luminance of the dark subpixel DS is low with a low to intermediate tone, display quality depends on the bright subpixel BS. Since each bright subpixel BS includes four bright domains BD and a pattern of alignment directions of liquid crystal molecules 41 in two bright domains BD is repeated in every pixel in the column direction of the pixels P arranged in a matrix, high-resolution display is achieved regardless of a viewing direction.

The luminance of the dark subpixel DS increases with an intermediate to high tone, and an effect of the dark subpixel DS is added to that of the bright subpixel BS in terms of display quality.

Since a pattern of alignment directions of liquid crystal molecules 41 in each dark domain DD is repeated in every fourth pixel in the column direction of the pixels P, a bright-dark pattern is repeated at intervals of four rows as illustrated in FIGS. 29 and 30 when the liquid crystal panel 100 is obliquely viewed from the directions indicated by the arrows A2 and A3 with an intermediate to high tone. That is, in the case of intermediate to high tone display, an 8K panel exhibits a resolution equivalent to that of FHD when viewed in the A2 and A3 directions. That is, practically sufficient display quality is achieved.

In the case of front view, resolution does not decrease with any tone. With a low to intermediate tone, resolution does not decrease regardless of a direction from which the liquid crystal panel 100 is obliquely viewed.

Display quality that does not pose any practical problem is thus maintained while achieving both excellent transparency performance and viewing angle performance. Display quality in left and right directions and the A1 direction, which is practically important, is equivalent to that in the first example, in which each dark subpixel DS includes two domains.

(Fourth Example of Tilt Directions of Liquid Crystal Molecules)

Figure 31:
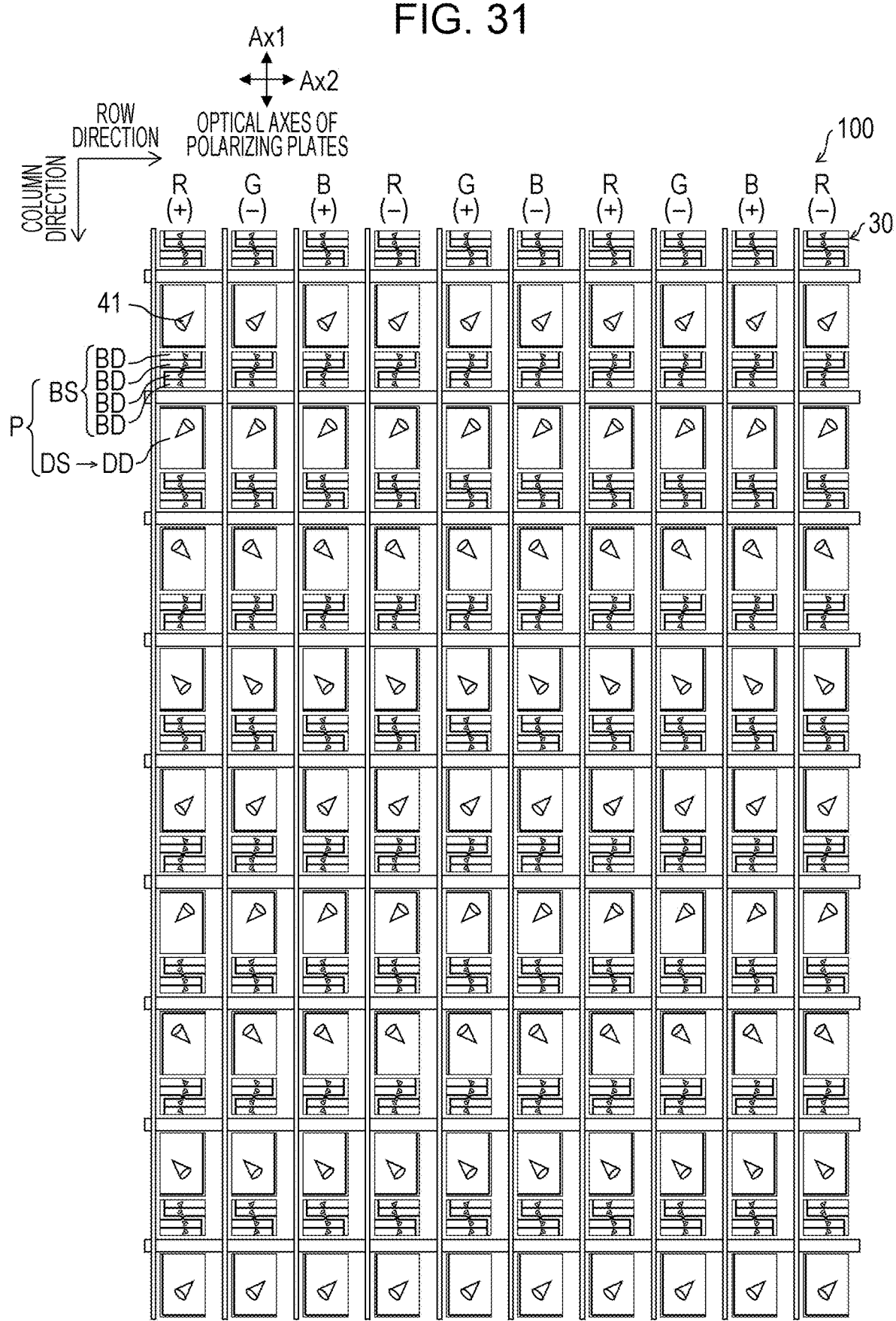
FIG. 31 is a schematic plan view illustrating yet other tilt directions of the liquid crystal molecules of the liquid crystal panel according to the embodiment.

FIG. 31 is a schematic plan view illustrating yet other tilt directions of the liquid crystal molecules of the liquid crystal panel according to the embodiment. The same components as those described above are given the same reference numerals, and detailed description thereof is not repeated.

A difference from the third example described with reference to FIG. 24 is that whereas a pattern of alignment directions of liquid crystal molecules 41 in four bright domains BD is the same in the column direction of the pixels P arranged in a matrix in the example illustrated in FIG. 24, a pattern of alignment directions of four bright domains BD is repeated in every second pixel in the column direction of the pixels P in the second example illustrated in FIG. 10.

Figure 32:
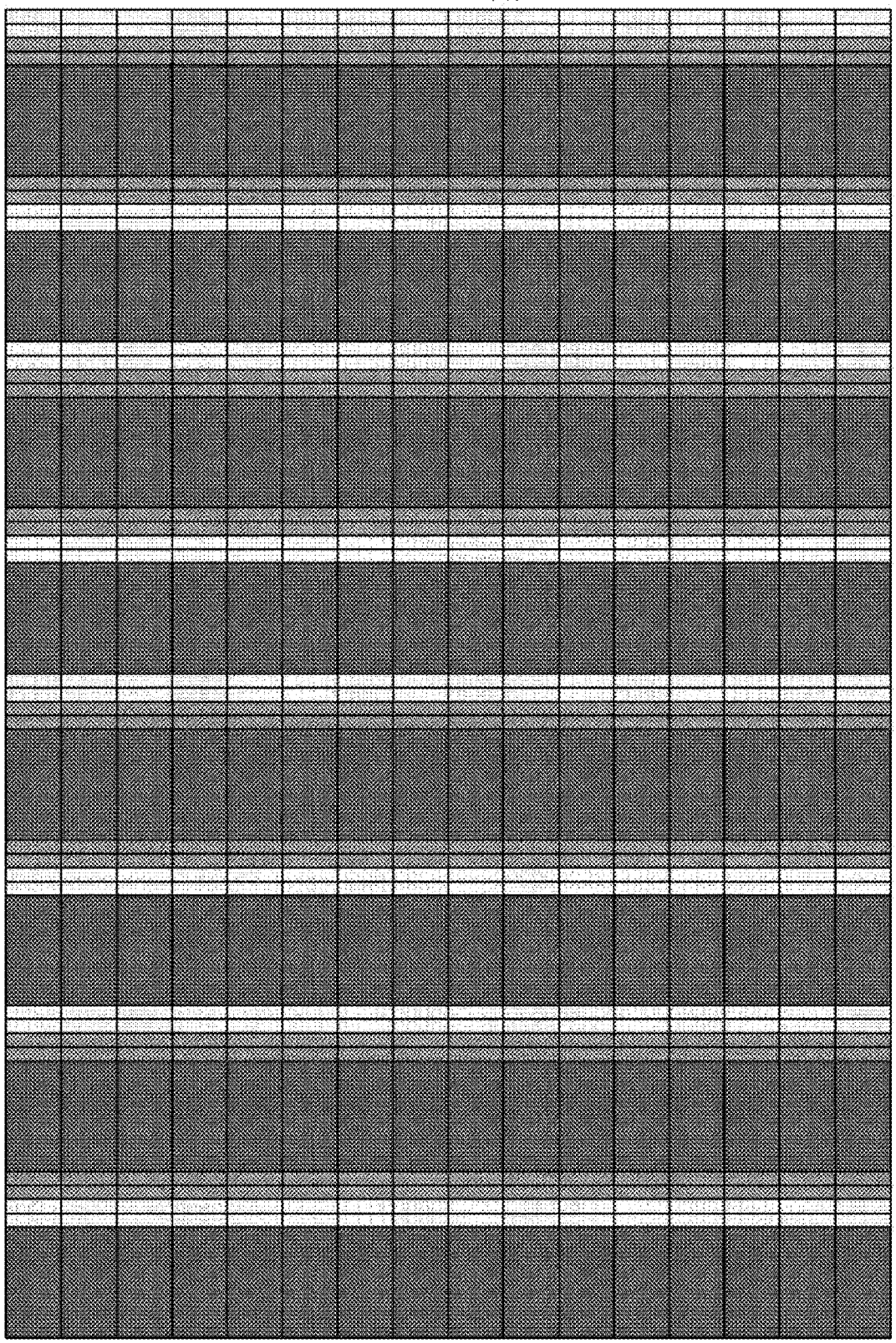
FIG. 32 is an enlarged schematic plan view illustrating a bright-dark pattern with a low to intermediate tone when the liquid crystal panel is obliquely viewed from the direction indicated by the arrow.
Figure 33:
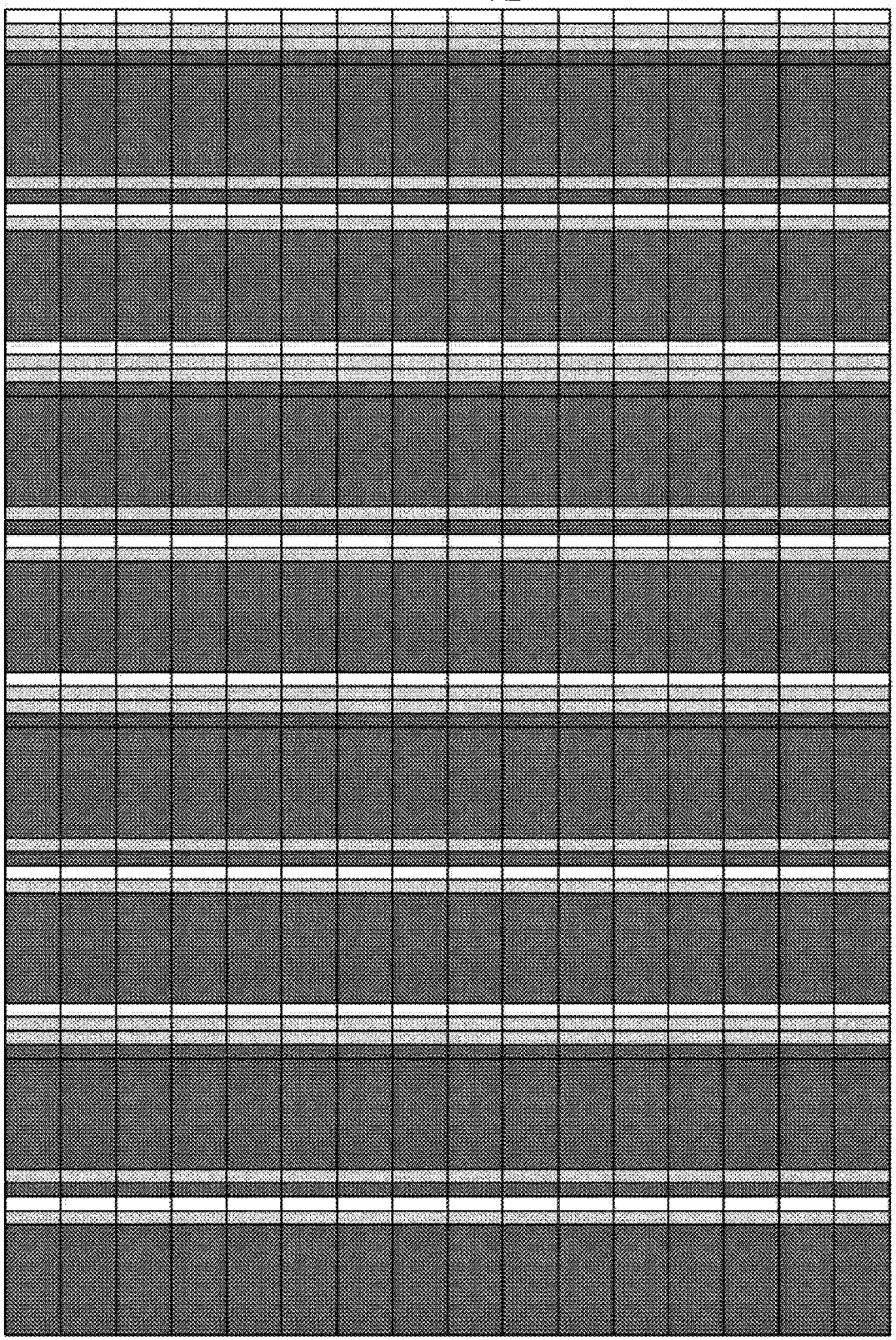
FIG. 33 is an enlarged schematic plan view illustrating a bright-dark pattern with a low to intermediate tone when the liquid crystal panel is obliquely viewed from the direction indicated by the other arrow.
Figure 34:
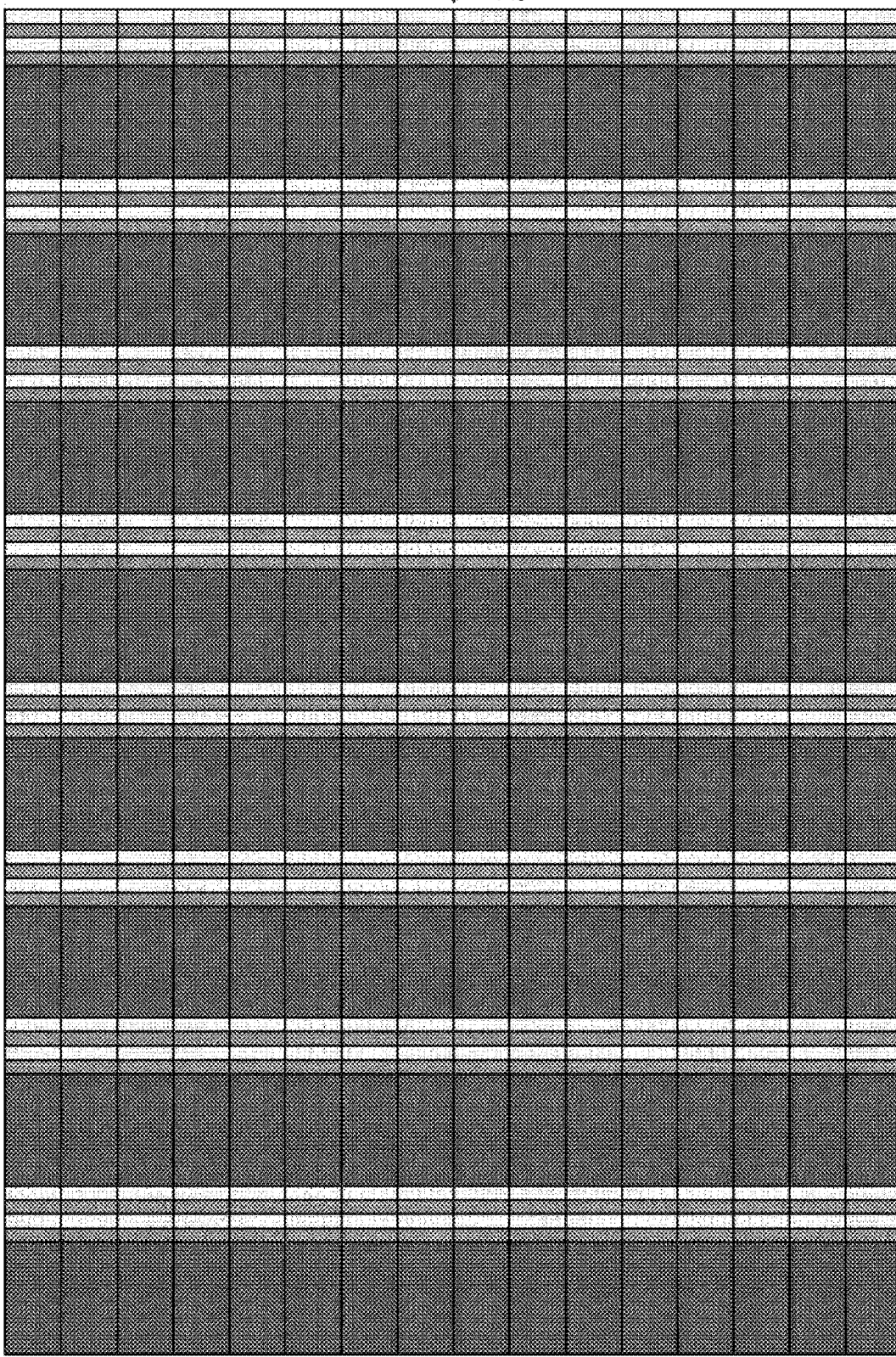
FIG. 34 is an enlarged schematic plan view illustrating a bright-dark pattern with a low to intermediate tone when the liquid crystal panel is obliquely viewed from the direction indicated by the yet another arrow.
Figure 35:
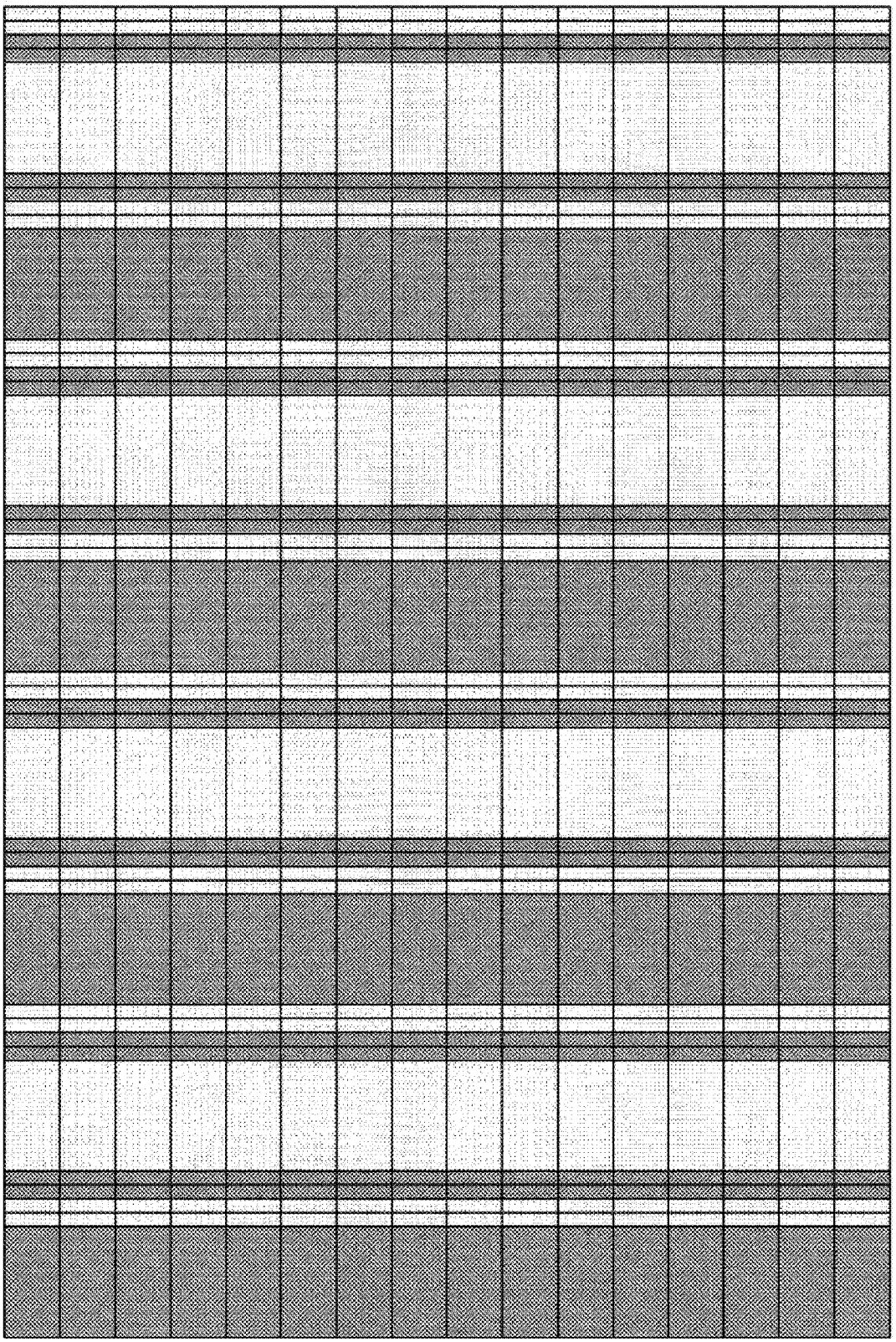
FIG. 35 is an enlarged schematic plan view illustrating a bright-dark pattern with an intermediate to high tone when the liquid crystal panel is obliquely viewed from the direction indicated by the arrow.
Figure 37:
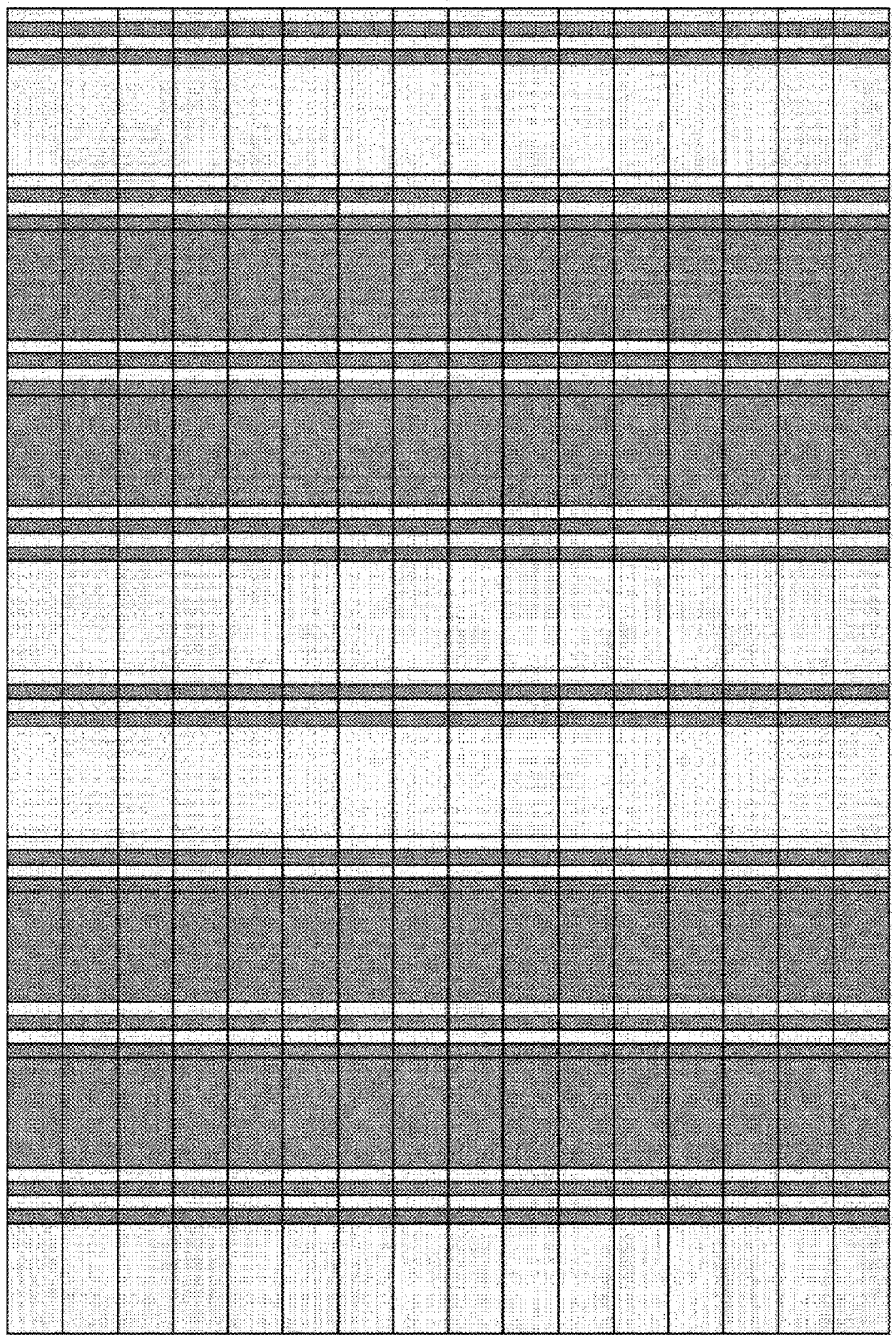
FIG. 37 is an enlarged schematic plan view illustrating a bright-dark pattern with an intermediate to high tone when the liquid crystal panel is obliquely viewed from the direction indicated by the yet another arrow.

FIG. 32 is an enlarged schematic plan view illustrating a bright-dark pattern with a low to intermediate tone at a time when the liquid crystal panel 100 is obliquely viewed from the direction indicated by the arrow A1. FIG. 33 is an enlarged schematic plan view illustrating a bright-dark pattern with a low to intermediate tone at a time when the liquid crystal panel 100 is obliquely viewed from the direction indicated by the arrow A2. FIG. 34 is an enlarged schematic plan view illustrating a bright-dark pattern with a low to intermediate tone at a time when the liquid crystal panel 100 is obliquely viewed from the direction indicated by the arrow A3. FIG. 35 is a schematic plan view illustrating a bright-dark pattern with an intermediate to high tone at a time when the liquid crystal panel 100 is obliquely viewed from the direction indicated by the arrow A1. FIG. 36 is an enlarged schematic plan view illustrating a bright-dark pattern with an intermediate to high tone at a time when the liquid crystal panel 100 is obliquely viewed from the direction indicated by the arrow A2. FIG. 37 is an enlarged schematic plan view illustrating a bright-dark pattern with an intermediate to high tone at a time when the liquid crystal panel 100 is obliquely viewed from the direction indicated by the arrow A3.

As in the third example, since each dark subpixel DS includes one domain, dark lines are reduced and transparency improves while the bright subpixel BS secures viewing angle performance with four domains.

Since a pattern of alignment directions of liquid crystal molecules 41 in four bright domains BD of each bright subpixel BS is repeated in every second pixel in the column direction of the pixels P arranged in a matrix, a bright-dark pattern is repeated at intervals of two rows as illustrated in FIG. 35 when the liquid crystal panel 100 is obliquely viewed from the direction indicated by the arrow A1 in the case of intermediate to high tone display.

By repeating a pattern of alignment directions of four bright domains BD in every second pixel in the column direction of the pixels P, stable display quality is achieved even if domain size is reduced. This is because variation in domain area caused during a manufacturing process is compensated by vertically adjacent pixels P.

(Fifth Example of Tilt Directions of Liquid Crystal Molecules)

Figure 38:
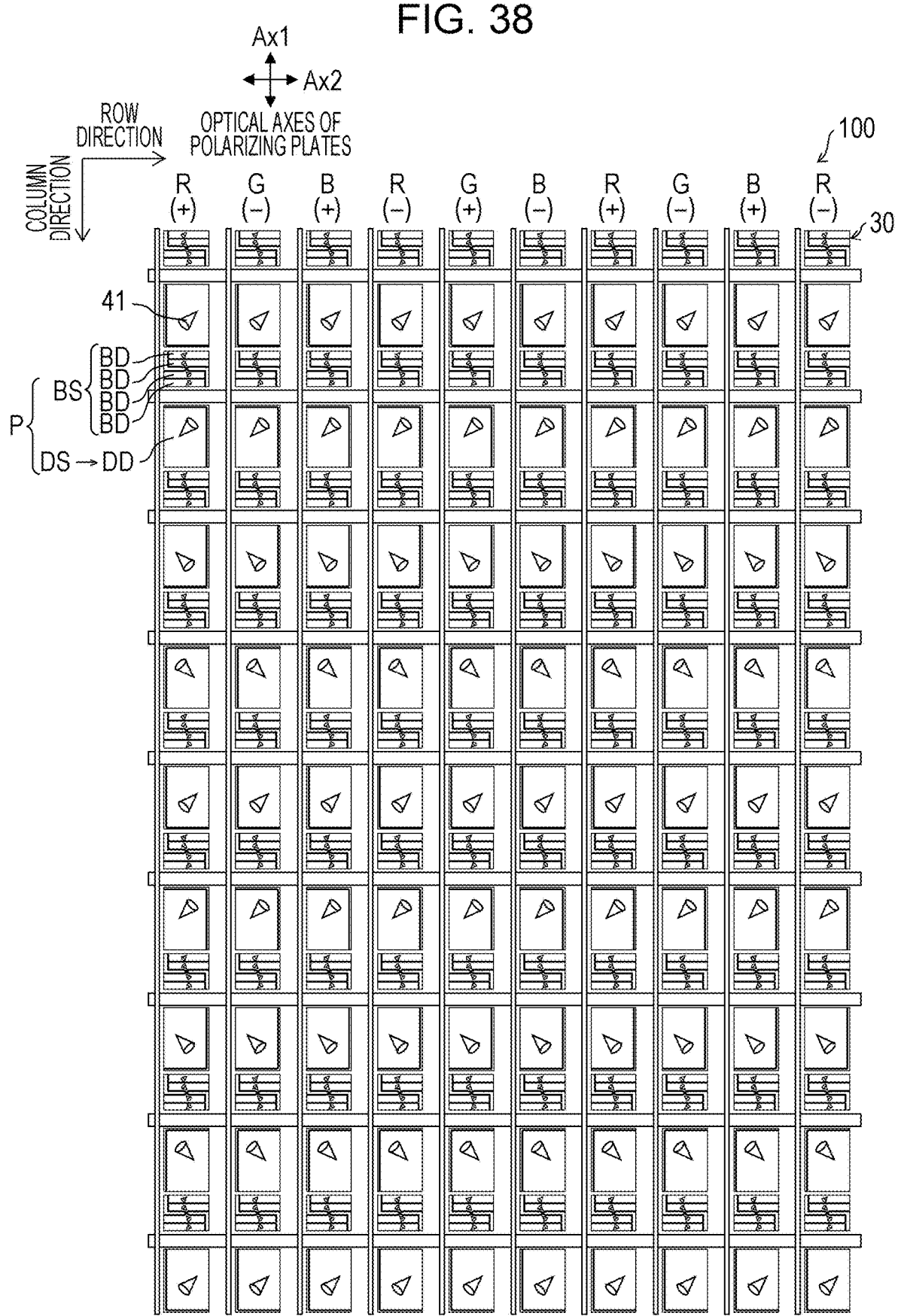
FIG. 38 is a schematic plan view illustrating yet other tilt directions of the liquid crystal molecules of the liquid crystal panel according to the embodiment.

FIG. 38 is a schematic plan view illustrating yet other tilt directions of the liquid crystal molecules of the liquid crystal panel according to the embodiment. The same components as those described above are given the same reference numerals, and detailed description thereof is not repeated.

A difference from the third example described with reference to FIG. 24 is that whereas alignment directions of liquid crystal molecules 41 in dark domains DD are repeated in every fourth pixel in the direction indicated by the arrow F, the direction indicated by the arrow B, the direction indicated by the arrow H, and the direction indicated by the arrow D in FIG. 59 in the example illustrated in FIG. 24, the alignment directions are repeated in every fourth pixel in the direction indicated by the arrow F, the direction indicated by the arrow B, the direction indicated by the arrow D, and the direction indicated by the arrow H in the fifth example illustrated in FIG. 38.

Figure 39:
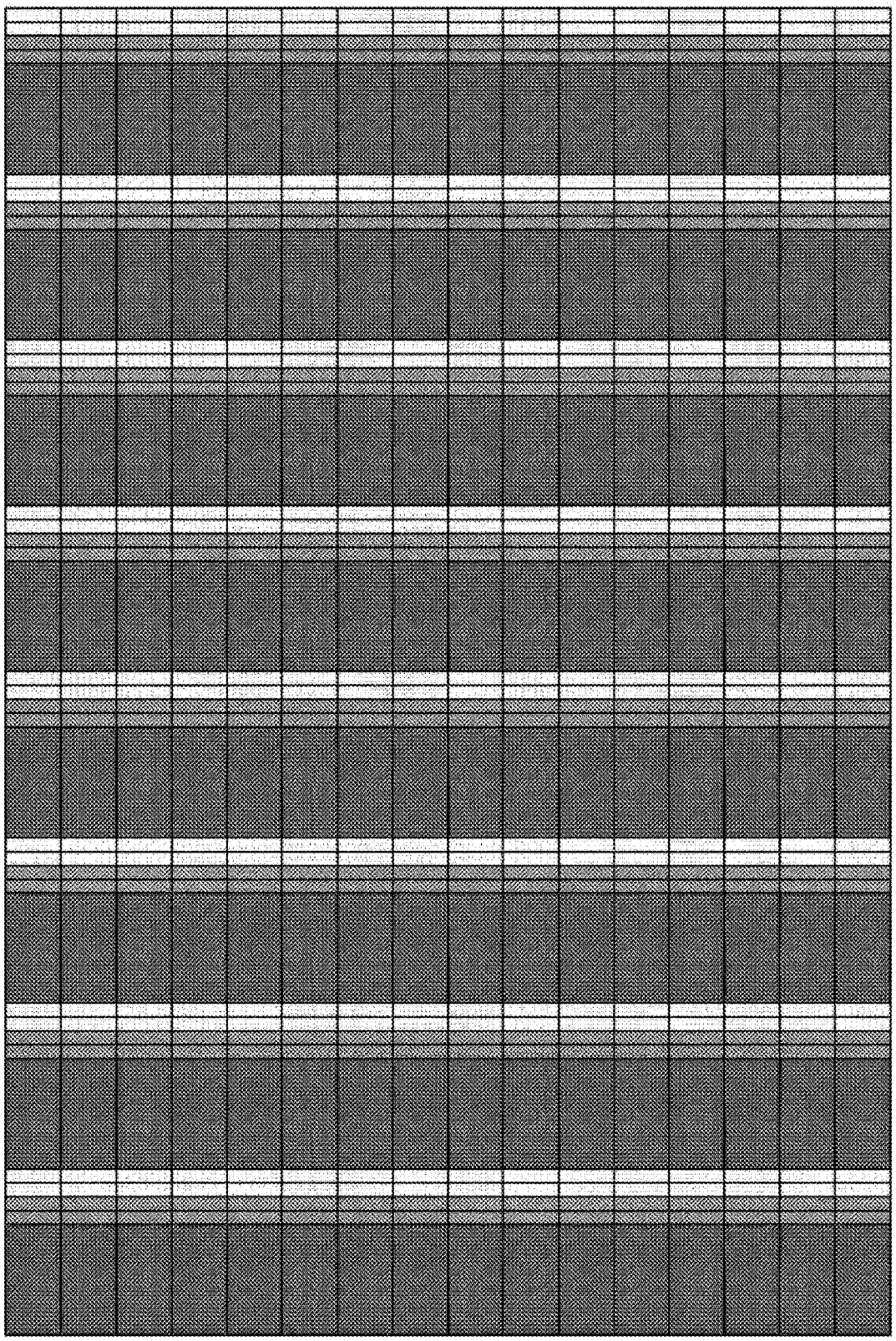
FIG. 39 is an enlarged schematic plan view illustrating a bright-dark pattern with a low to intermediate tone when the liquid crystal panel is obliquely viewed from the direction indicated by the arrow.
Figure 40:
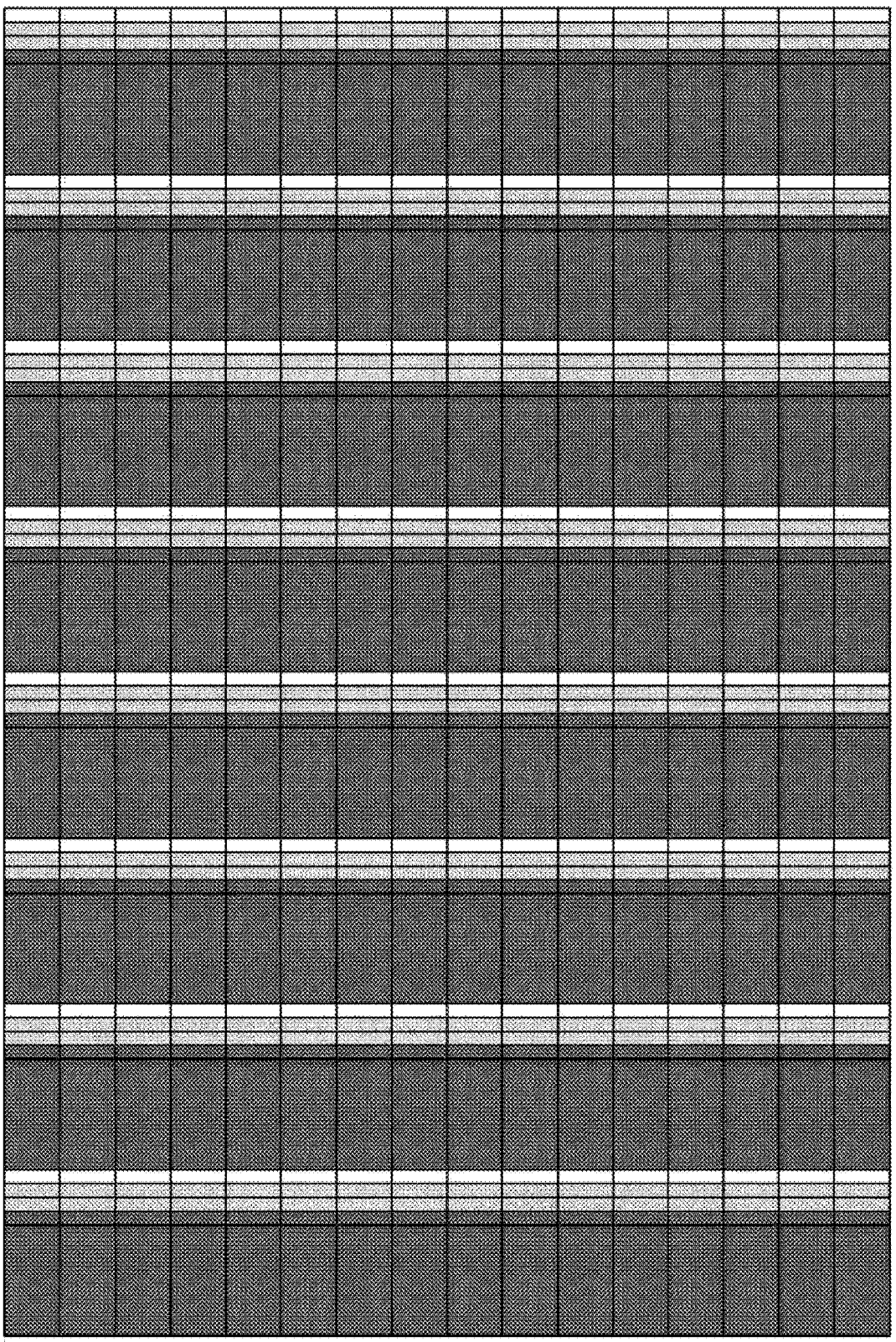
FIG. 40 is an enlarged schematic plan view illustrating a bright-dark pattern with a low to intermediate tone when the liquid crystal panel is obliquely viewed from the direction indicated by the other arrow.
Figure 41:
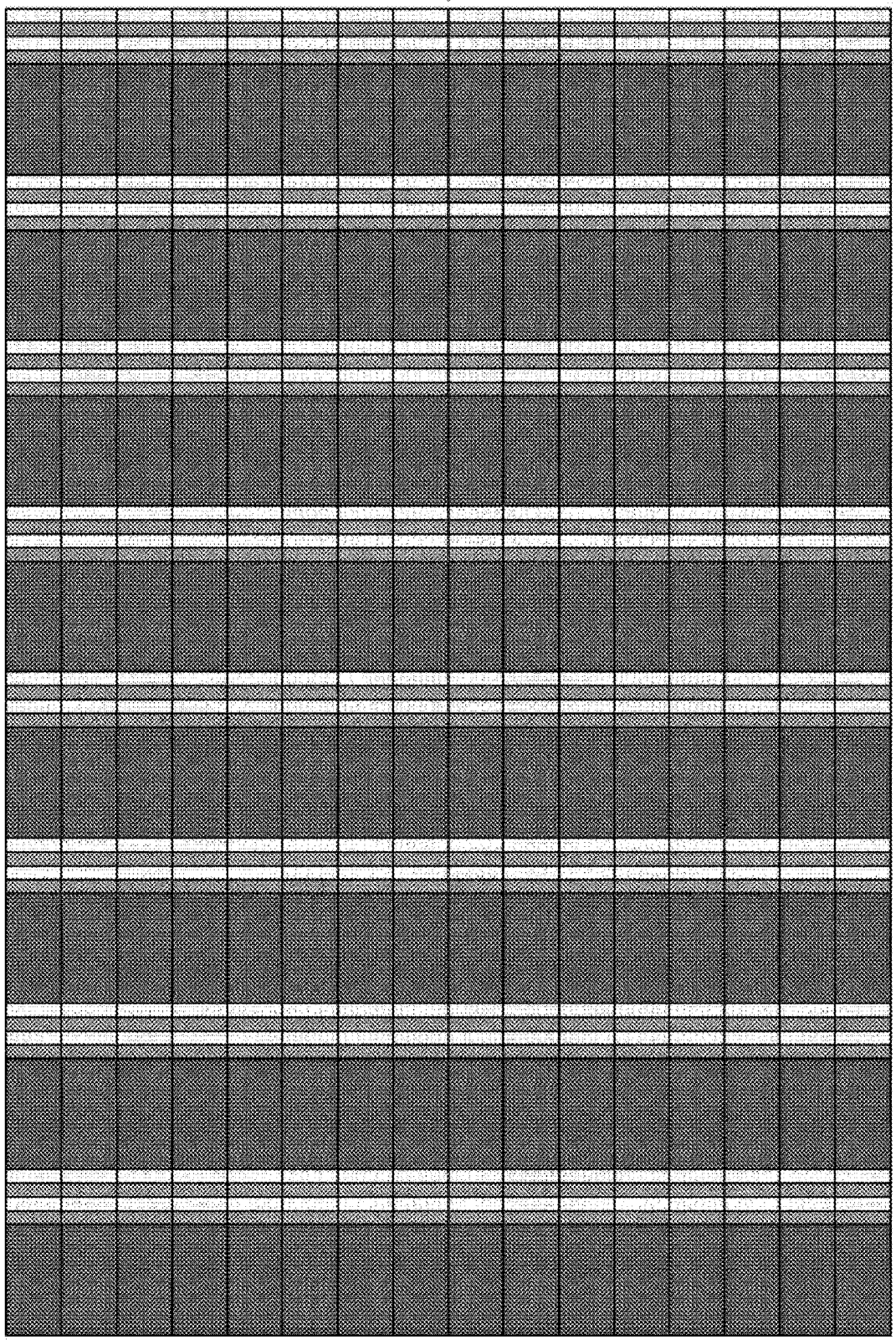
FIG. 41 is an enlarged schematic plan view illustrating a bright-dark pattern with a low to intermediate tone when the liquid crystal panel is obliquely viewed from the direction indicated by the yet another arrow.
Figure 42:
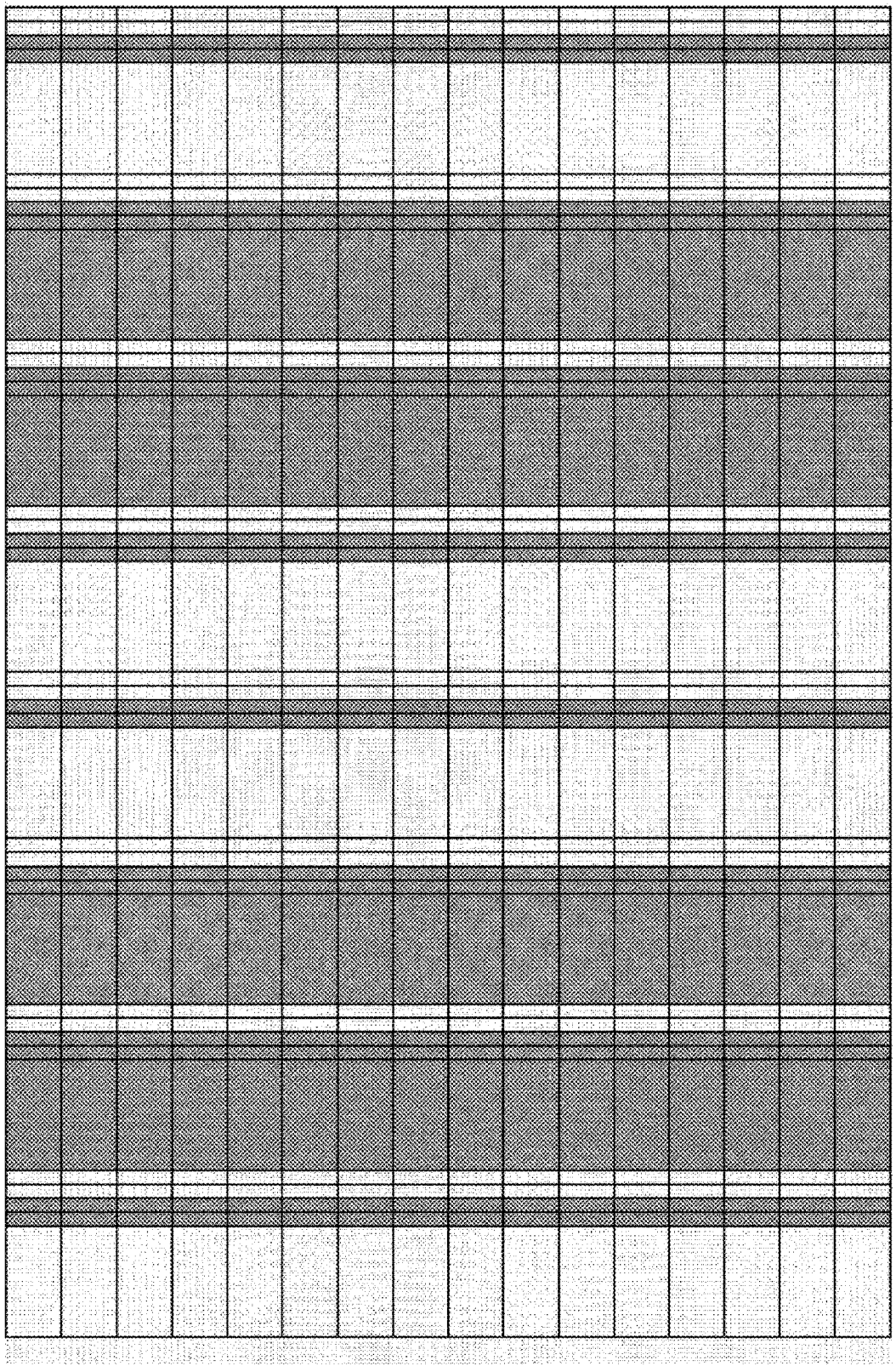
FIG. 42 is a schematic plan view illustrating a bright-dark pattern with an intermediate to high tone when the liquid crystal panel is obliquely viewed from the direction indicated by the arrow.
Figure 43:
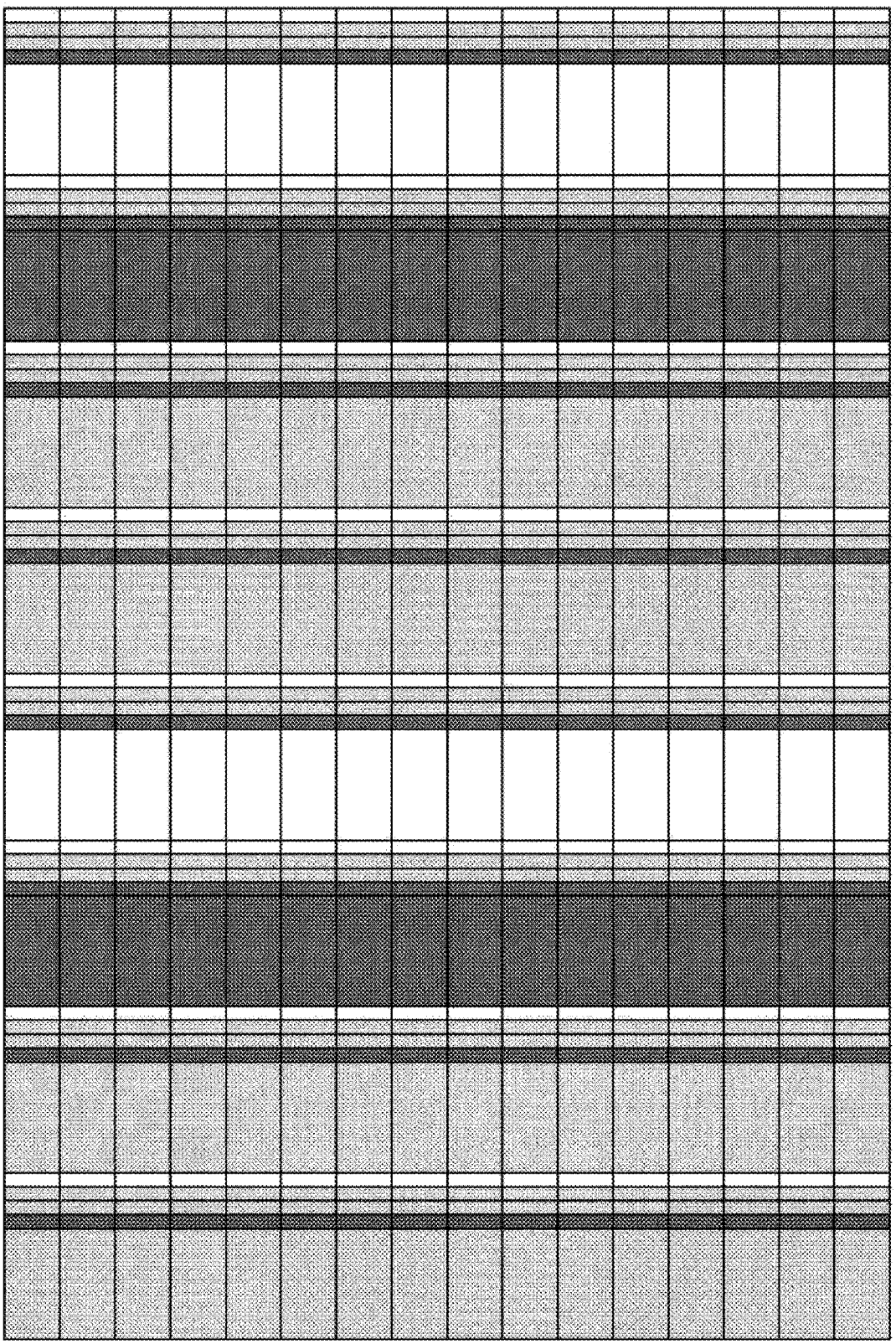
FIG. 43 is an enlarged schematic plan view illustrating a bright-dark pattern with an intermediate to high tone when the liquid crystal panel is obliquely viewed from the direction indicated by the other arrow.
Figure 44:
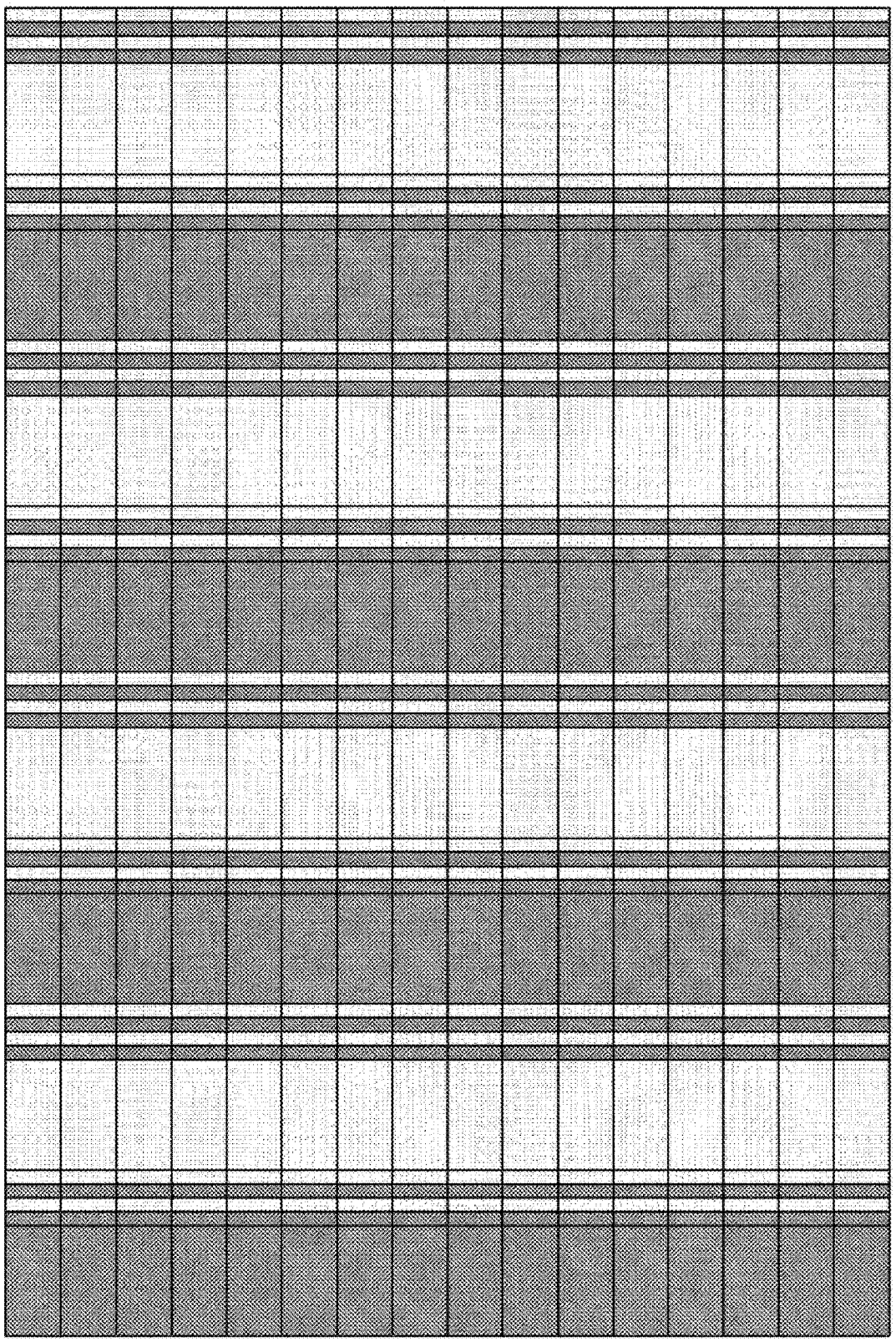
FIG. 44 is an enlarged schematic plan view illustrating a bright-dark pattern with an intermediate to high tone when the liquid crystal panel is obliquely viewed from the direction indicated by the yet another arrow.

FIG. 39 is an enlarged schematic plan view illustrating a bright-dark pattern with a low to intermediate tone at a time when the liquid crystal panel 100 is obliquely viewed from the direction indicated by the arrow A1. FIG. 40 is an enlarged schematic plan view illustrating a bright-dark pattern with a low to intermediate tone at a time when the liquid crystal panel 100 is obliquely viewed from the direction indicated by the arrow A2. FIG. 41 is an enlarged schematic plan view illustrating a bright-dark pattern with a low to intermediate tone at a time when the liquid crystal panel 100 is obliquely viewed from the direction indicated by the arrow A3. FIG. 42 is a schematic plan view illustrating a bright-dark pattern with an intermediate to high tone at a time when the liquid crystal panel 100 is obliquely viewed from the direction indicated by the arrow A1. FIG. 43 is a schematic plan view illustrating a bright-dark pattern with an intermediate to high tone at a time when the liquid crystal panel 100 is obliquely viewed from the direction indicated by the arrow A2. FIG. 44 is a schematic plan view illustrating a bright-dark pattern with an intermediate to high tone at a time when the liquid crystal panel 100 is obliquely viewed from the direction indicated by the arrow A3.

Since alignment directions of liquid crystal molecules 41 in dark domains DD are repeated in every fourth pixel in the direction indicated by the arrow B, the direction indicated by the arrow F, the direction indicated by the arrow H, and the direction indicated by the arrow D, a bright-dark pattern is repeated at intervals of four rows as illustrated in FIGS. 42 and 43 when the liquid crystal panel 100 is obliquely viewed from the directions indicated by the arrows A1 and A2 in the case of intermediate to high tone display.

When the liquid crystal panel 100 is obliquely viewed from the direction indicated by the arrow A3, a bright-dark pattern is repeated at intervals of two rows as illustrated in FIG. 44. When a liquid crystal display is rotated by 90 degrees and used, that is, when the direction indicated by the arrow A3 is a left or right direction, therefore, the present embodiment, which achieves excellent display quality in the direction indicated by the arrow A3, is desirable.

(Another Comparative Example)

Figure 45:
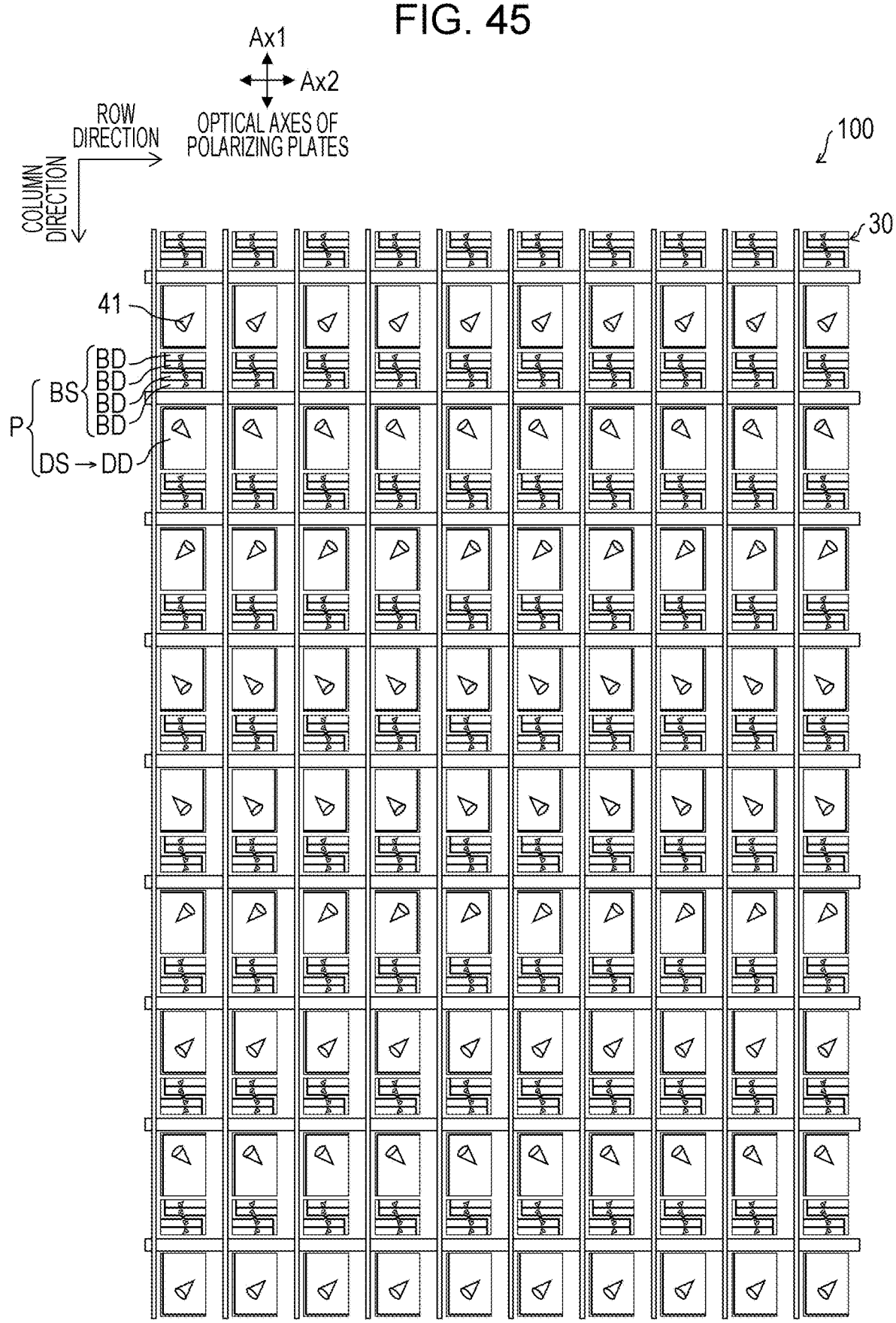
FIG. 45 is a schematic plan view illustrating tilt directions of liquid crystal molecules of a liquid crystal panel in another comparative example.

FIG. 45 is a schematic plan view illustrating tilt directions of liquid crystal molecules of a liquid crystal panel in another comparative example. The same components as those described above are given the same reference numerals, and detailed description thereof is not repeated.

A difference from the third example described with reference to FIG. 24 is that whereas a pattern of an alignment direction of a dark domain DD is repeated in every fourth pixel in the column direction of the pixels P in the example illustrated in FIG. 24, the pattern is repeated more than every fourth pixel in the other comparative example illustrated in FIG. 45. In the example illustrated in FIG. 45, for example, an alignment direction of liquid crystal molecules 41 in a dark domain DD is repeated in every eighth pixel in the direction indicated by the arrow F, the direction indicated by the arrow H, the direction indicated by the arrow B, the direction indicated by the arrow D, the direction indicated by the arrow D, the direction indicated by the arrow B, the direction indicated by the arrow F, and the direction indicated by the arrow H in FIG. 59.

Figure 46:
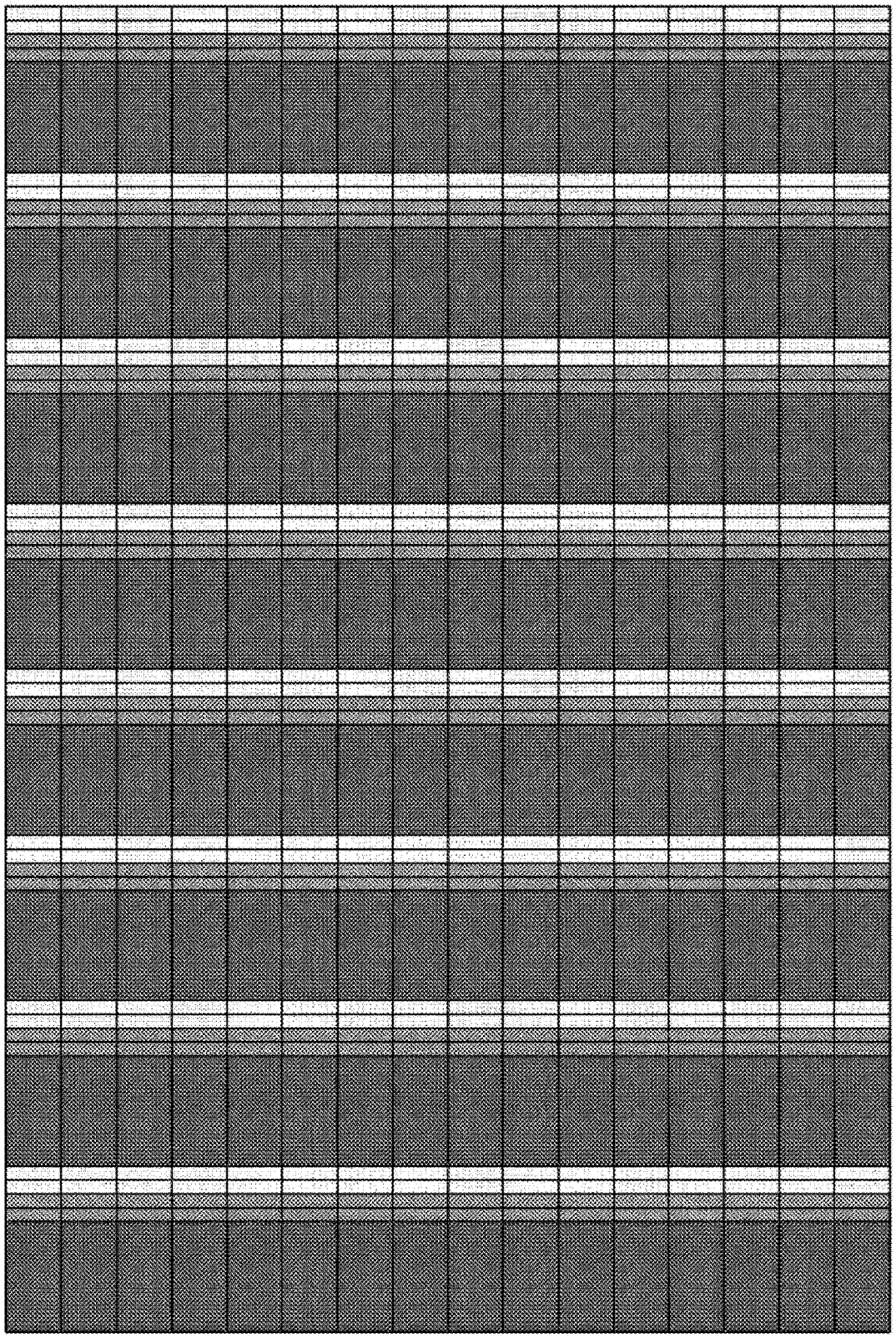
FIG. 46 is an enlarged schematic plan view illustrating a bright-dark pattern with a low to intermediate tone when the liquid crystal panel is obliquely viewed from the direction indicated by the arrow.
Figure 47:
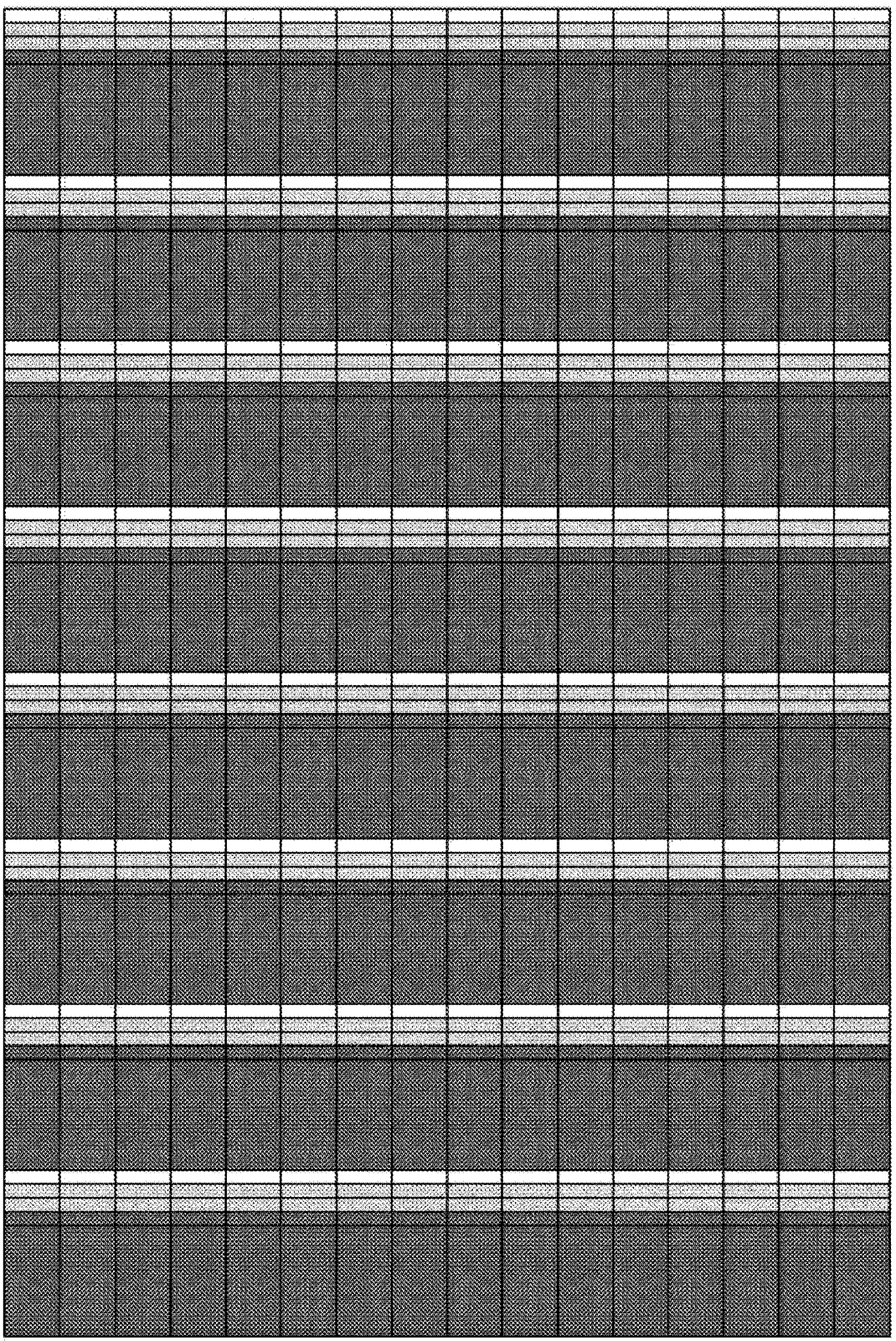
FIG. 47 is an enlarged schematic plan view illustrating a bright-dark pattern with a low to intermediate tone when the liquid crystal panel is obliquely viewed from the direction indicated by the other arrow.
Figure 48:
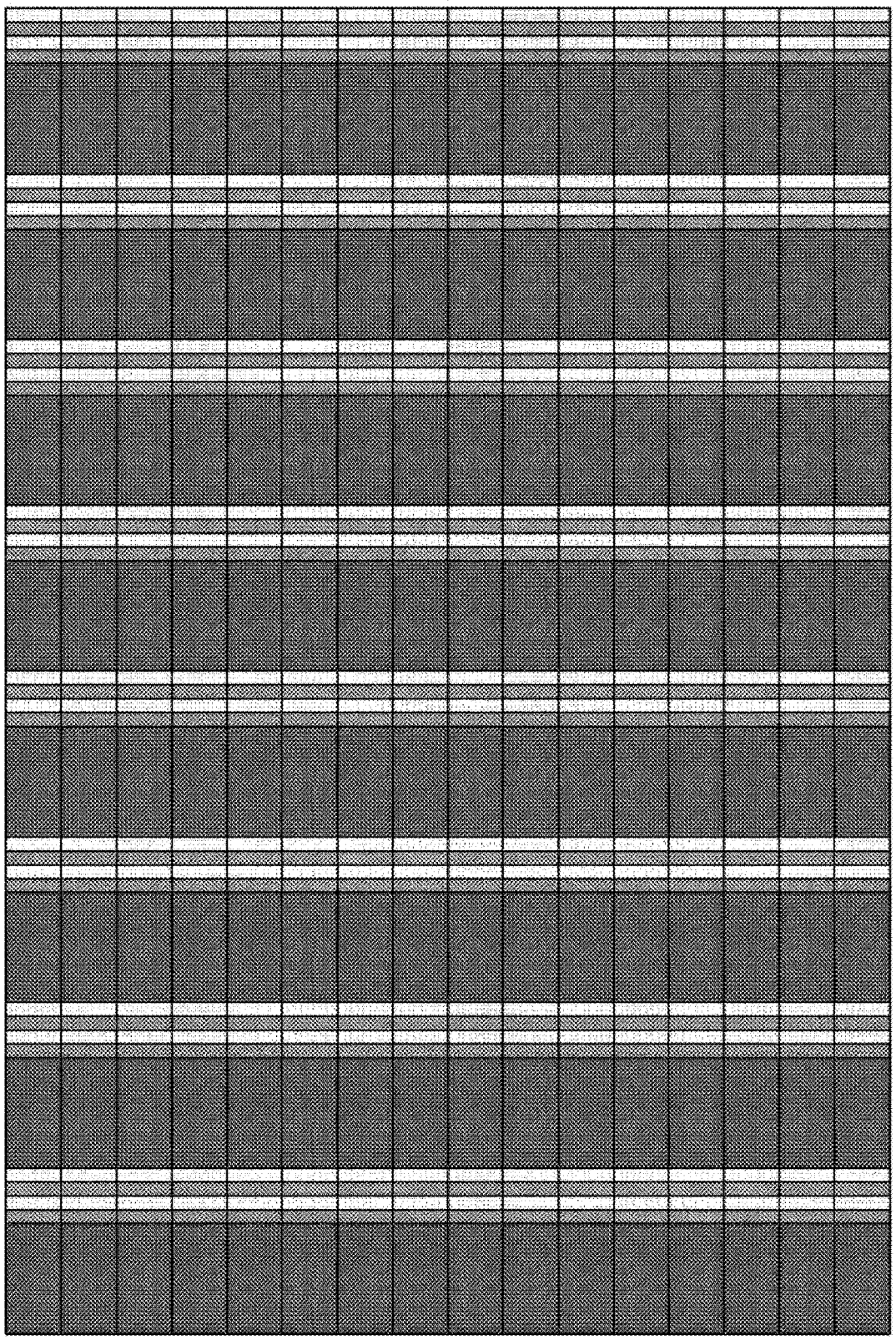
FIG. 48 is an enlarged schematic plan view illustrating a bright-dark pattern with a low to intermediate tone when the liquid crystal panel is obliquely viewed from the direction indicated by the yet another arrow.
Figure 49:
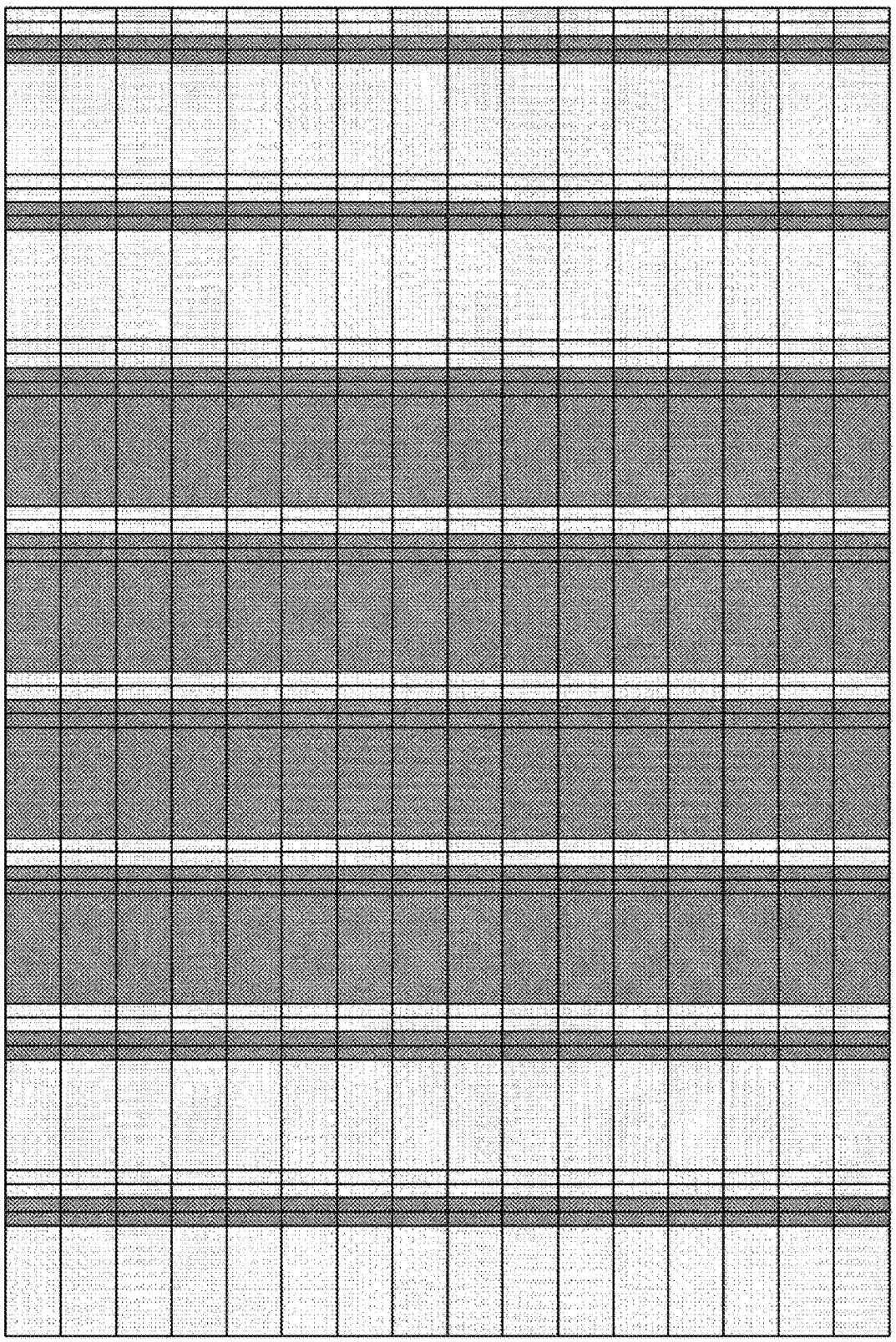
FIG. 49 is an enlarged schematic plan view illustrating a bright-dark pattern with an intermediate to high tone when the liquid crystal panel is obliquely viewed from the direction indicated by the arrow.
Figure 50:
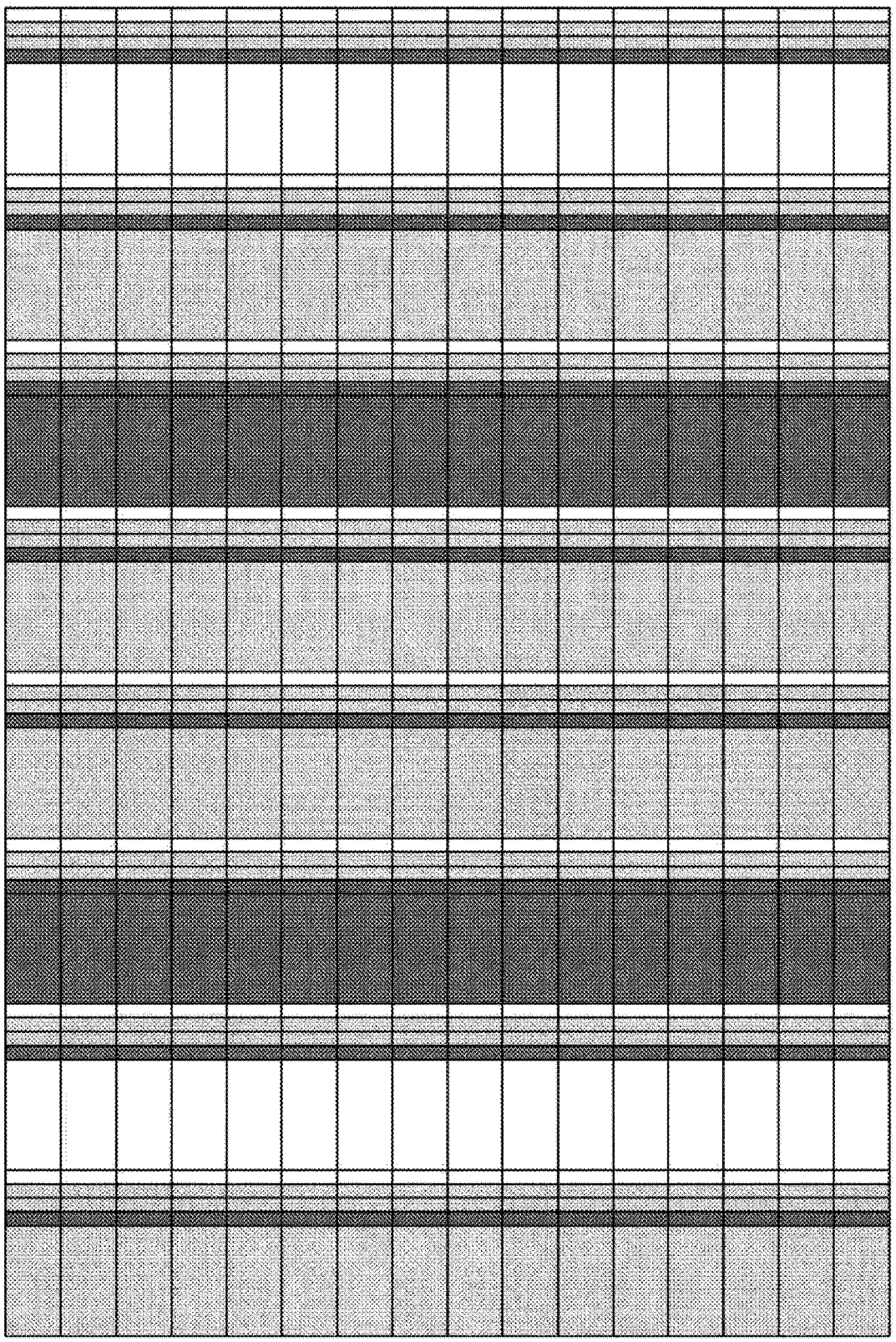
FIG. 50 is an enlarged schematic plan view illustrating a bright-dark pattern with an intermediate to high tone when the liquid crystal panel is obliquely viewed from the direction indicated by the other arrow.
Figure 51:
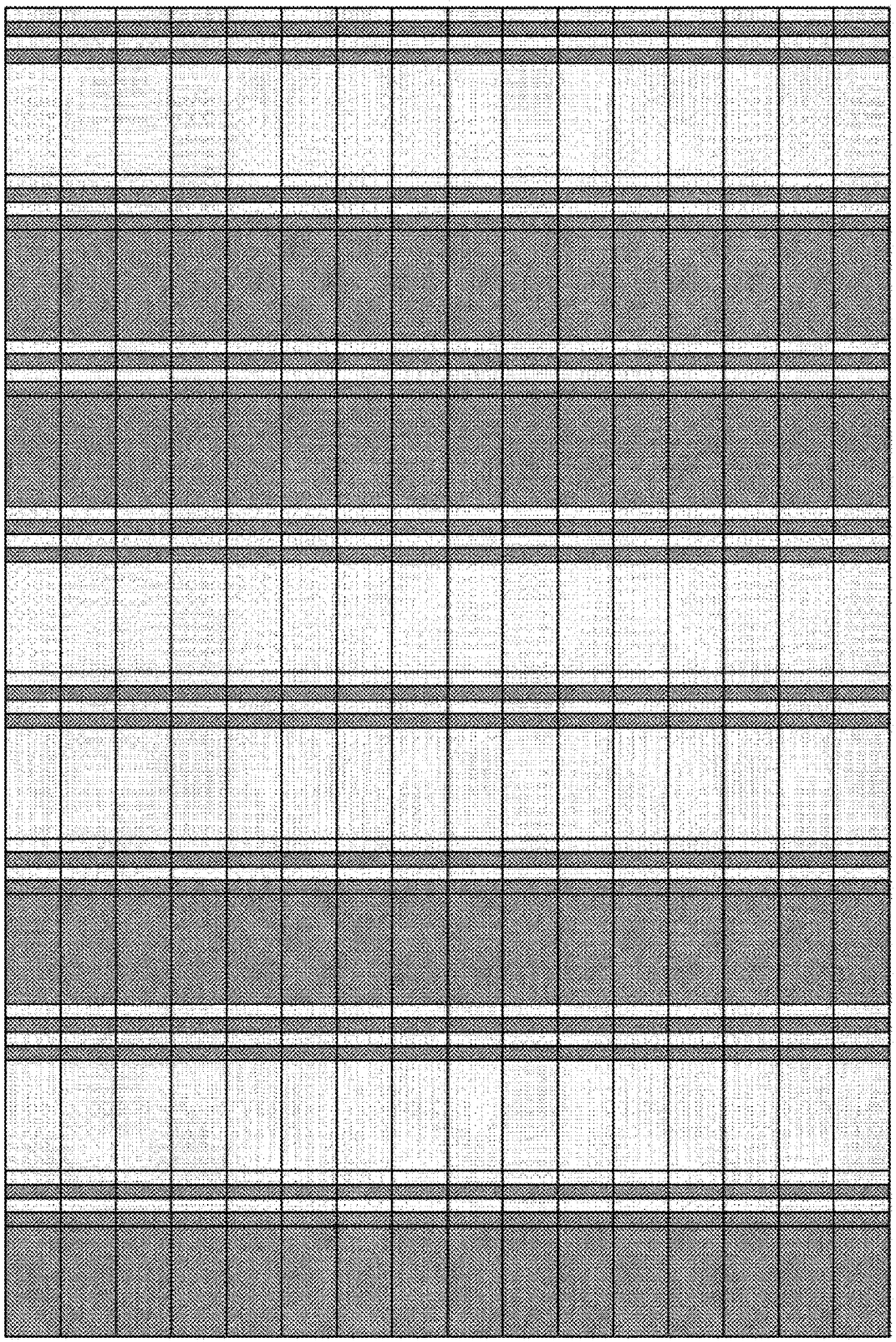
FIG. 51 is an enlarged schematic plan view illustrating a bright-dark pattern with an intermediate to high tone when the liquid crystal panel is obliquely viewed from the direction indicated by the yet another arrow.

FIG. 46 is an enlarged schematic plan view illustrating a bright-dark pattern with a low to intermediate tone at a time when the liquid crystal panel in the other comparative example is obliquely viewed from the direction indicated by the arrow A1. FIG. 47 is an enlarged schematic plan view illustrating a bright-dark pattern with a low to intermediate tone at a time when the liquid crystal panel in the other comparative example is obliquely viewed from the direction indicated by the arrow A2. FIG. 48 is an enlarged schematic plan view illustrating a bright-dark pattern with a low to intermediate tone at a time when the liquid crystal panel in the other comparative example is obliquely viewed from the direction indicated by the arrow A3. FIG. 49 is a schematic plan view illustrating a bright-dark pattern with an intermediate to high tone at a time when the liquid crystal panel in the other comparative example is obliquely viewed from the direction indicated by the arrow A1. FIG. 50 is an enlarged schematic plan view illustrating a bright-dark pattern with an intermediate to high tone at a time when the liquid crystal panel in the other comparative example is obliquely viewed from the direction indicated by the arrow A2. FIG. 51 is an enlarged schematic plan view illustrating a bright-dark pattern with an intermediate to high tone at a time when the liquid crystal panel in the other comparative example is obliquely viewed from the direction indicated by the arrow A3.

Since a pattern of an alignment direction of one dark domain DD is repeated in every eighth pixel, a bright-dark pattern is repeated at intervals of eight rows as illustrated in FIGS. 49 to 51 when the liquid crystal panel is obliquely viewed from the directions indicated by the arrows A1, A2, and A3 in the case of intermediate to high tone display. A cycle of domain arrangement of dark subpixels DS is long, and display quality with an intermediate to high tone is not desirable.

(Yet Another Comparative Example)

Figure 52:
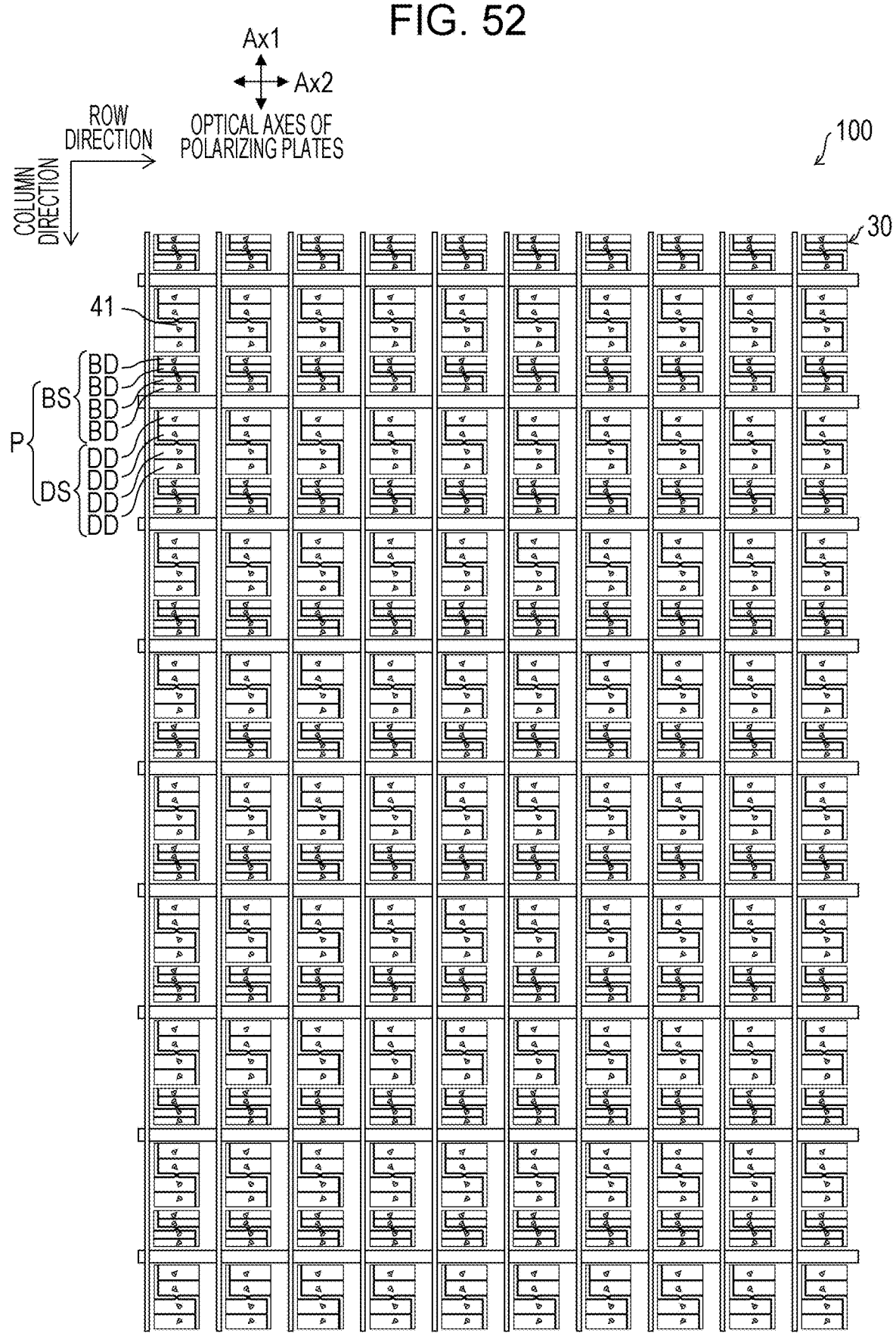
FIG. 52 is a schematic plan view illustrating tilt directions of liquid crystal molecules of a liquid crystal panel in yet another comparative example.

FIG. 52 is a schematic plan view illustrating tilt directions of liquid crystal molecules of a liquid crystal panel in yet another comparative example. The same components as those described above are given the same reference numerals, and detailed description thereof is not repeated.

A difference from the first example described with reference to FIG. 2 is that whereas each dark subpixel DS includes two dark domains DD in which alignment directions of liquid crystal molecules 41 are different from each other in the example described with reference to FIG. 2, each dark subpixel DS includes four dark domains DD in which alignment directions of liquid crystal molecules 41 are different from one another in the yet another comparative example illustrated in FIG. 52.

Figure 53:
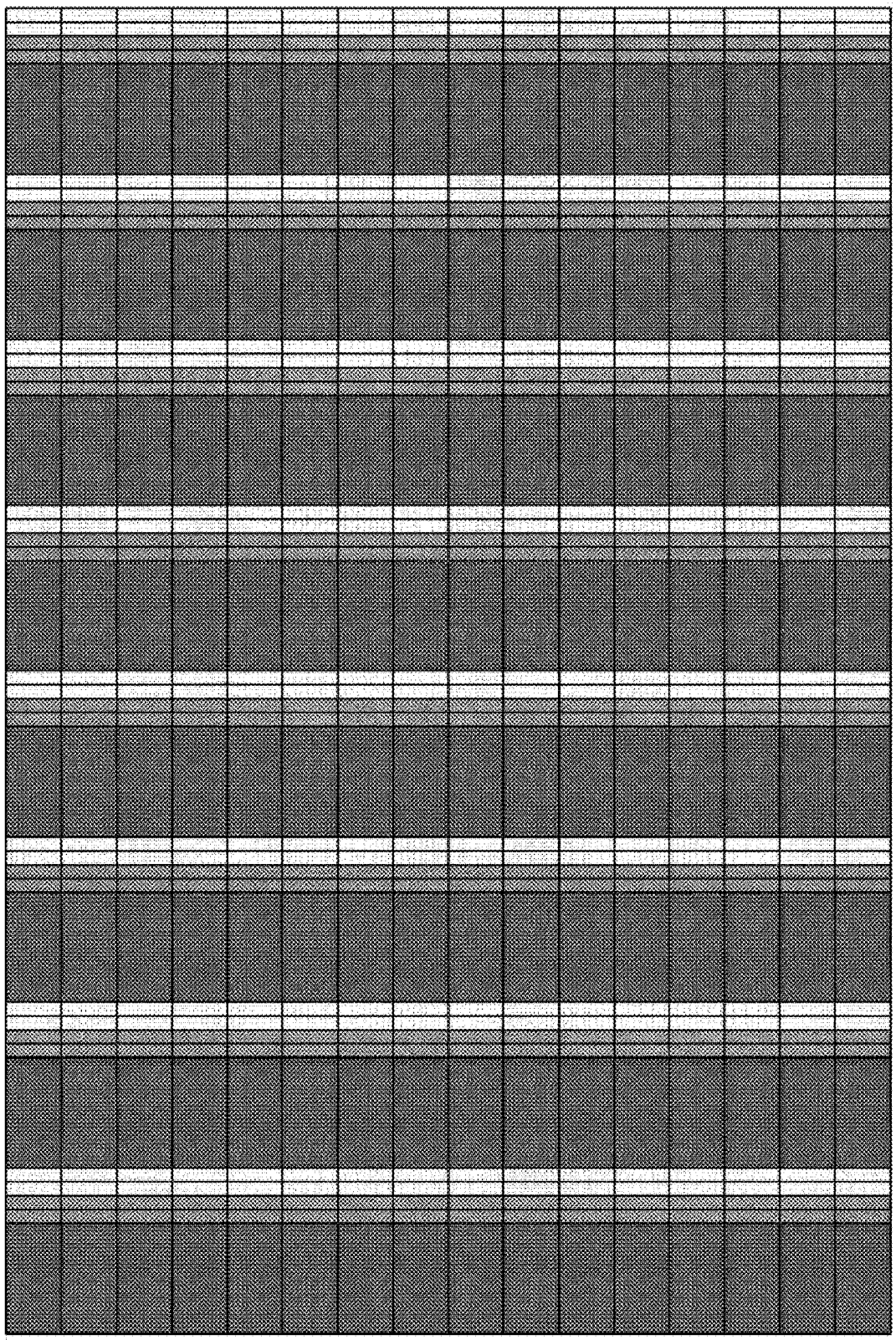
FIG. 53 is an enlarged schematic plan view illustrating a bright-dark pattern with a low to intermediate tone when the liquid crystal panel is obliquely viewed from the direction indicated by the arrow.
Figure 54:
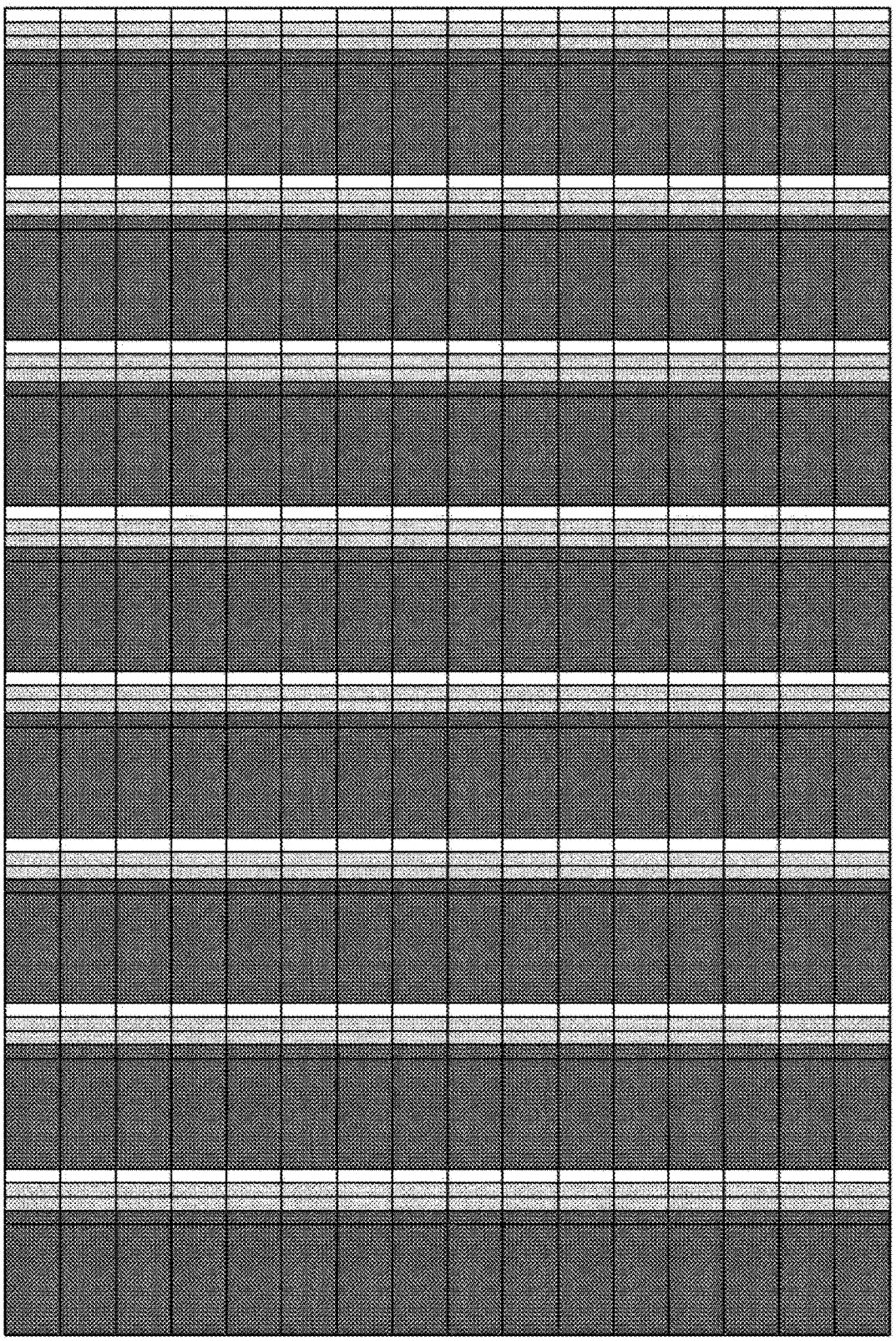
FIG. 54 is an enlarged schematic plan view illustrating a bright-dark pattern with a low to intermediate tone when the liquid crystal panel is obliquely viewed from the direction indicated by the other arrow.
Figure 55:
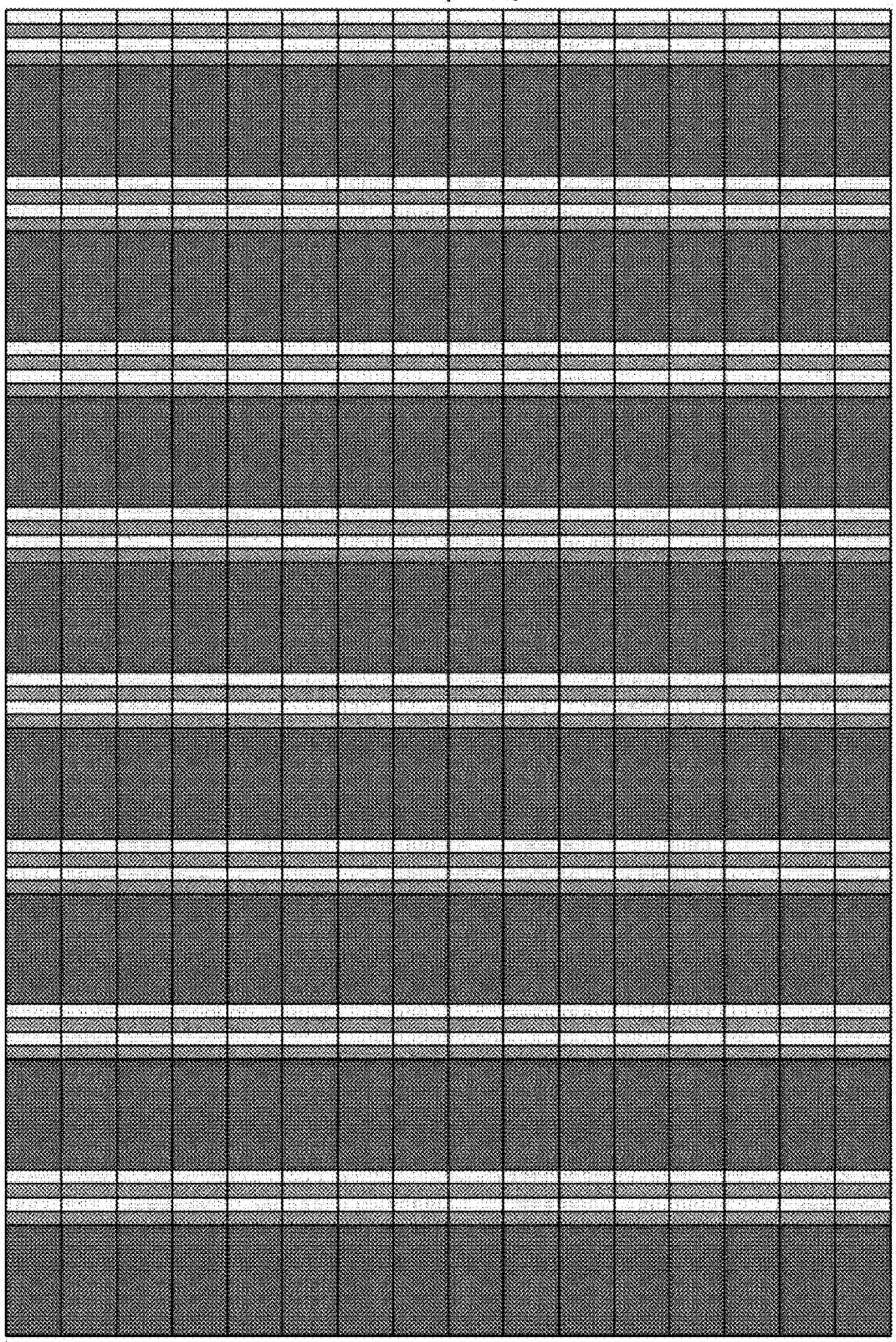
FIG. 55 is an enlarged schematic plan view illustrating a bright-dark pattern with a low to intermediate tone when the liquid crystal panel is obliquely viewed from the direction indicated by the yet another arrow.
Figure 56:
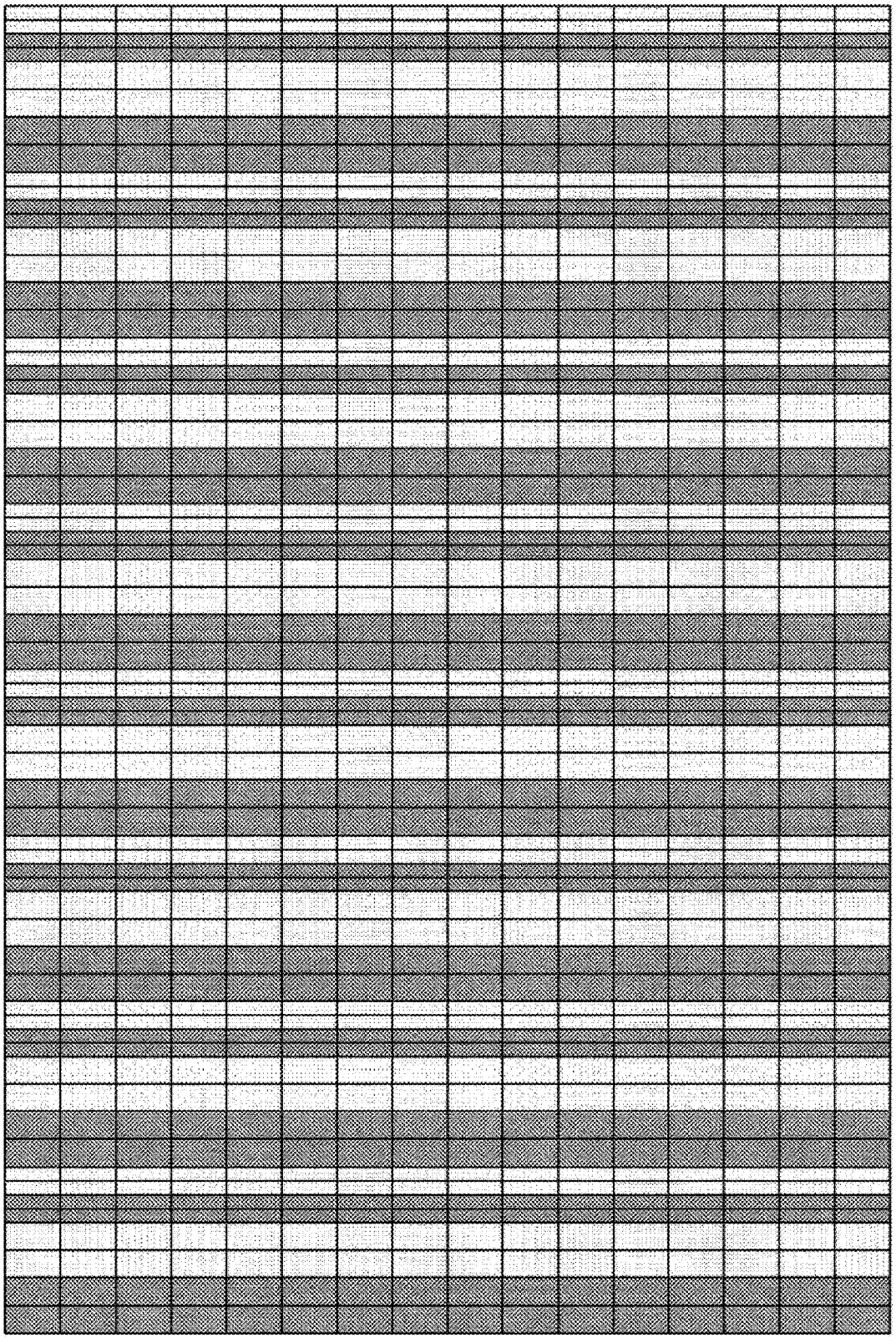
FIG. 56 is an enlarged schematic plan view illustrating a bright-dark pattern with an intermediate to high tone when the liquid crystal panel is obliquely viewed from the direction indicated by the arrow.
Figure 57:
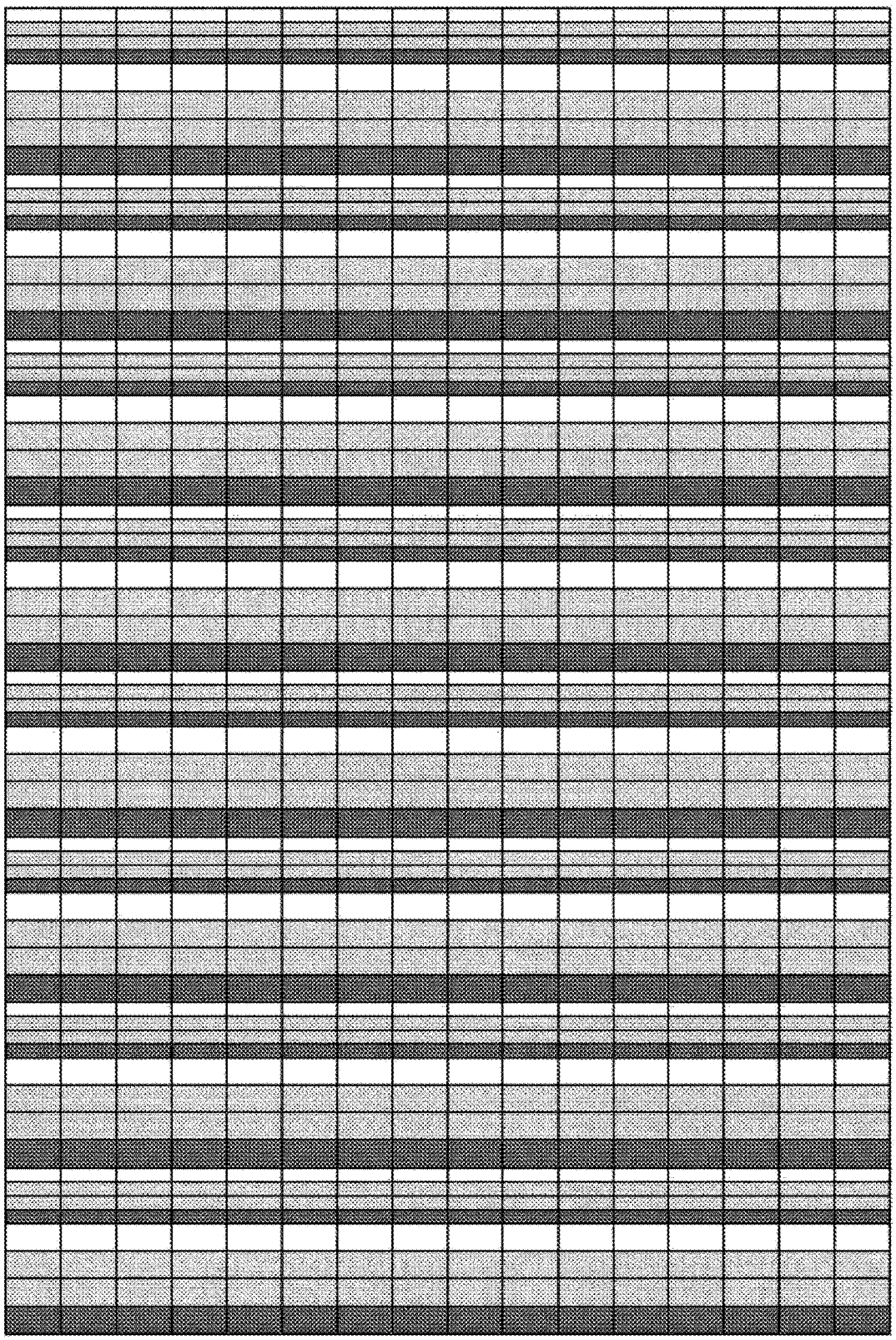
FIG. 57 is an enlarged schematic plan view illustrating a bright-dark pattern with an intermediate to high tone when the liquid crystal panel is obliquely viewed from the direction indicated by the other arrow.
Figure 58:
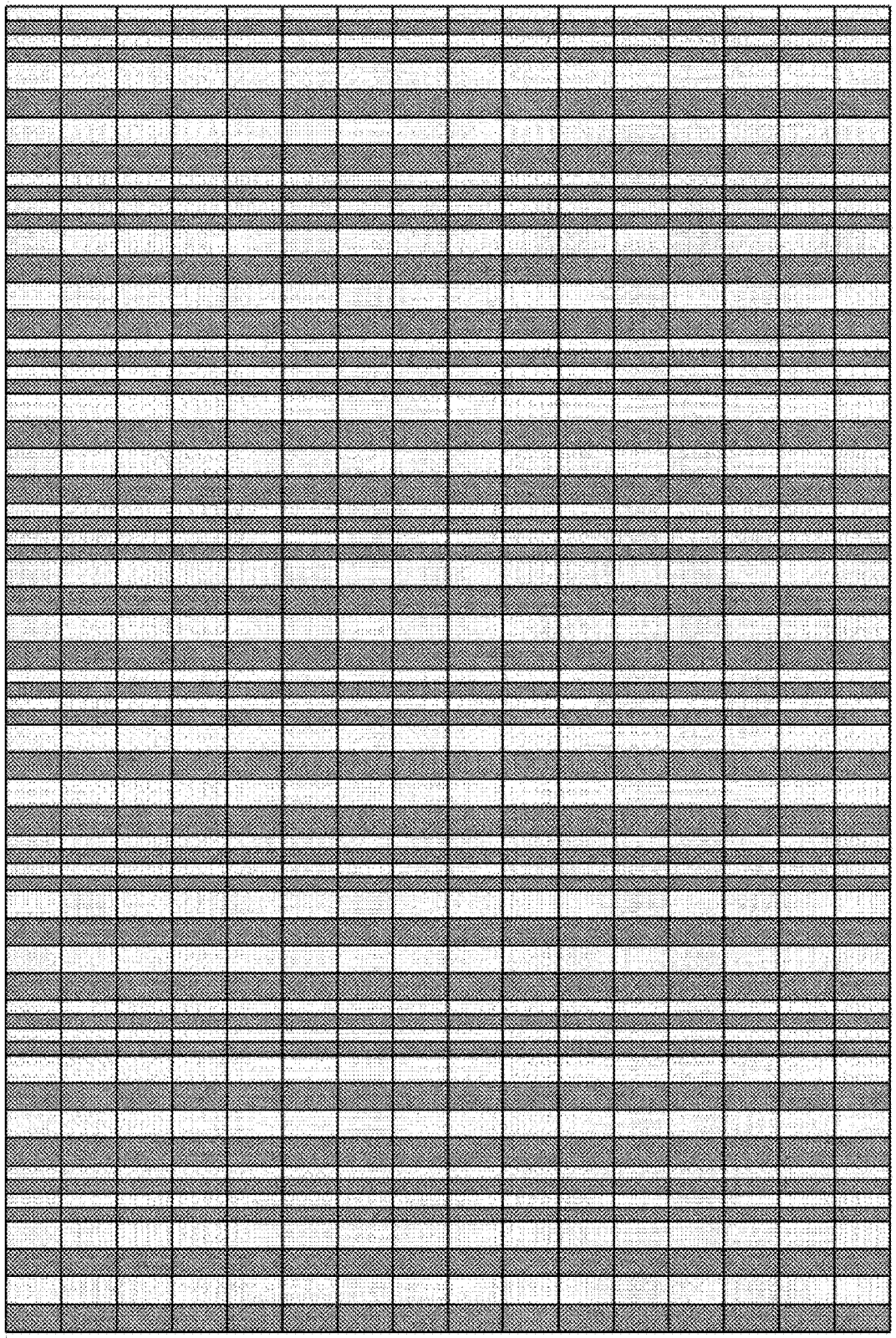
FIG. 58 is an enlarged schematic plan view illustrating a bright-dark pattern with an intermediate to high tone when the liquid crystal panel is obliquely viewed from the direction indicated by the yet another arrow.

FIG. 53 is an enlarged schematic plan view illustrating a bright-dark pattern with a low to intermediate tone at a time when the liquid crystal panel in the yet another comparative example is obliquely viewed from the direction indicated by the arrow A1. FIG. 54 is an enlarged schematic plan view illustrating a bright-dark pattern with a low to intermediate tone at a time when the liquid crystal panel in the yet another comparative example is obliquely viewed from the direction indicated by the arrow A2. FIG. 55 is an enlarged schematic plan view illustrating a bright-dark pattern with a low to intermediate tone at a time when the liquid crystal panel in the yet another comparative example is obliquely viewed from the direction indicated by the arrow A3. FIG. 56 is a schematic plan view illustrating a bright-dark pattern with an intermediate to high tone at a time when the liquid crystal panel in the yet another comparative example is obliquely viewed from the direction indicated by the arrow A1. FIG. 57 is an enlarged schematic plan view illustrating a bright-dark pattern with an intermediate to high tone at a time when the liquid crystal panel in the yet another comparative example is obliquely viewed from the direction indicated by the arrow A2. FIG. 58 is an enlarged schematic plan view illustrating a bright-dark pattern with an intermediate to high tone at a time when the liquid crystal panel in the yet another comparative example is obliquely viewed from the direction indicated by the arrow A3.

Although the liquid crystal panel in the yet another comparative example offers excellent viewing angle performance and display quality, transparency significantly decreases as the resolution of the liquid crystal panel increases. A problem is therefore posed that practical transparency cannot be achieved especially in 8K.

(Domain Arrangement of Two-Domain Dark Subpixel)

Figure 60:
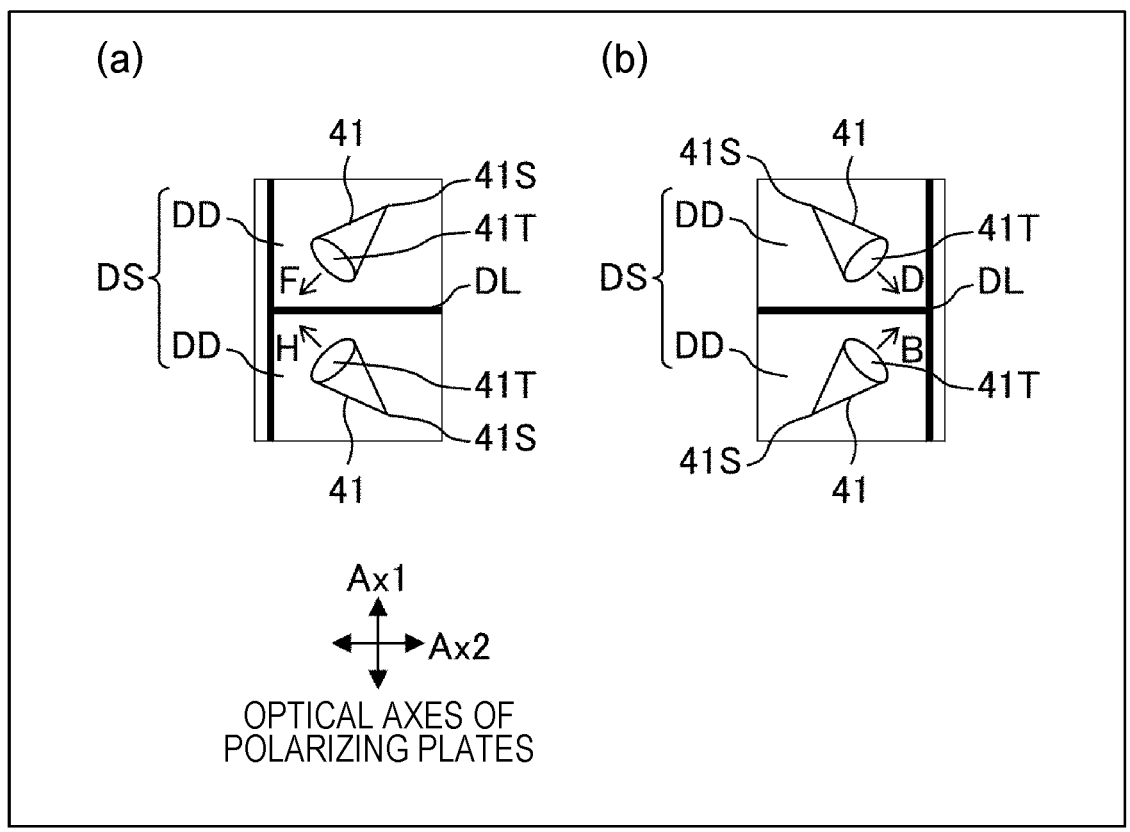
FIGS. 60(a) and (b) are diagrams illustrating the domain arrangement of two-domain dark subpixels according to the embodiment.

FIG. 59 is a diagram illustrating a relationship between the domain arrangement of a two-domain dark subpixel DS and an occurrence condition of dark lines DL according to the embodiment. FIGS. 60(*a*) and (*b*) are diagrams illustrating the domain arrangement of the two-domain dark subpixel DS according to the embodiment.

When two alignment directions of liquid crystal molecules 41 in the two dark domains DD arranged side-by-side in the column direction of the dark subpixel DS are selected from four alignment directions, namely the arrow F, the arrow H, the arrow B, and the arrow D, there are 12 degrees of freedom in selection as illustrated in FIG. 59. The present inventor has found that, after checking occurrence conditions of dark lines DL for 12 combinations of alignment directions illustrated in FIG. 59, two combinations of alignment directions illustrated in FIGS. 60(*a*) and (*b*) minimize occurrence of dark lines DL and accordingly maximizes the transparency of the liquid crystal panel.

In an upper one of the two dark domains DD of the dark subpixel DS illustrated in FIG. 60(*a*), an alignment direction of liquid crystal molecules 41 is the direction indicated by the arrow F, and a final point 41T of the liquid crystal molecules is directed to a boundary between the two dark domains DD. An alignment direction of liquid crystal molecules 41 in a lower dark domain DD is the direction indicated by the arrow H, and a final point 41T of the liquid crystal molecules is directed to the boundary between the two dark domains DD.

The present inventor has found that in the combinations of alignment directions that minimize occurrence of dark lines DL, final points 41T of two liquid crystal molecules 41 are both directed to a boundary between dark domains DD, and an angle between the alignment direction of the one of the liquid crystal molecules 41 and the alignment direction of the other liquid crystal molecule 41 is equal to or smaller than 135 degrees.

At a boundary between two dark domains DD in which alignment directions of liquid crystal molecules 41 significantly change or at edges of a pixel electrode (dark subpixel DS), the alignment directions represented by directions connecting initial points 41S of the liquid crystal molecules 41 to final points 41T continuously change. Areas in which the alignment directions become parallel or orthogonal to an optical axis Ax1 or Ax2 of the polarizing plates during the change are dark lines.

Figure 61:
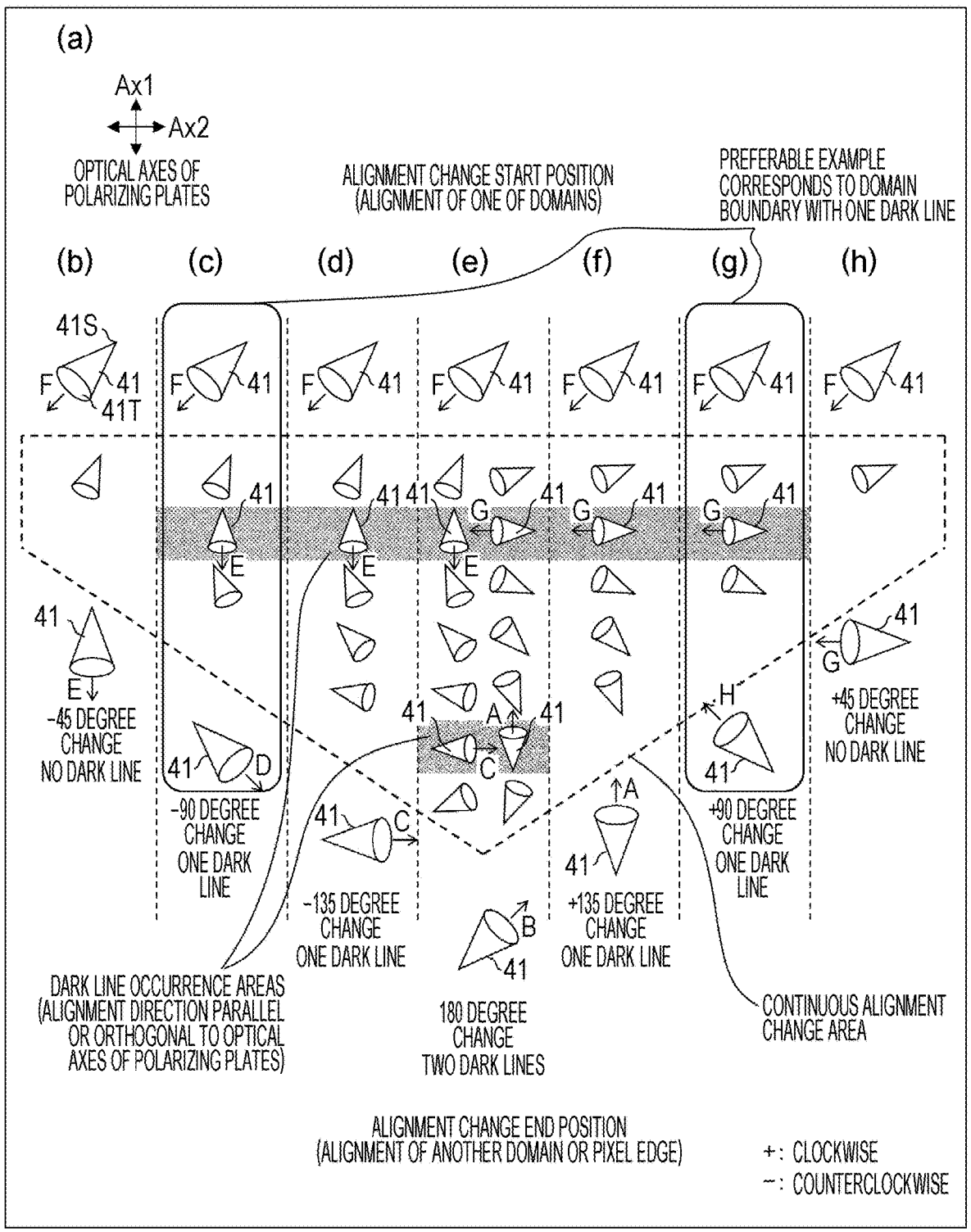
FIG. 61(a) is a diagram illustrating optical axes of polarizing plates of the liquid crystal panel according to the embodiment, and (b) to (h) are diagrams illustrating a mechanism of occurrence of dark lines based on changes in alignment directions of the liquid crystal molecules of the liquid crystal panel.

FIG. 61(*a*) is a diagram illustrating the optical axes Ax1 and Ax2 of the polarizing plates of the liquid crystal panel according to the embodiment. (*b*) to (*h*) are diagrams illustrating a mechanism of occurrence of dark lines DL based on changes in the alignment directions of the liquid crystal molecules 41 of the liquid crystal panel.

In FIG. 61(*b*), liquid crystal molecules 41 in a dark domain DD in which an alignment direction begins to change are aligned in the direction indicated by the arrow F. Liquid crystal molecules 41 in the other dark domain DD in which the alignment direction stops changing are aligned in the direction indicated by an arrow E, which is achieved by rotating the arrow F by 45 degrees counterclockwise.

In FIG. 61(*c*), the liquid crystal molecules 41 in the dark domain DD in which the alignment direction begins to change are aligned in the direction indicated by the arrow F. The liquid crystal molecules 41 in the other dark domain DD in which the alignment direction stops changing are aligned in the direction indicated by the arrow D, which is achieved by rotating the arrow F by 90 degrees counterclockwise. The liquid crystal molecules 41 are aligned in the direction indicated by the arrow E, which is achieved by rotating the arrow F by 45 degrees counterclockwise, halfway at the boundary between the two dark domains DD. The alignment direction indicated by the arrow E overlaps the optical axis Ax1 of the polarizing plates. A dark line DL is caused in an area in which the alignment direction of the liquid crystal molecules 41 overlaps the optical axis Ax1 of the polarizing plates.

In FIG. 61(*d*), the liquid crystal molecules 41 in one dark domain DD are aligned in the direction indicated by the arrow F. The liquid crystal molecules 41 in the other dark domain DD in which the alignment direction stops changing are aligned in the direction indicated by an arrow C, which is achieved by rotating the arrow F by 135 degrees counterclockwise. The liquid crystal molecules 41 are aligned in the direction indicated by the arrow E, which is achieved by rotating the arrow F by 45 degrees counterclockwise, halfway at the boundary between the two dark domains DD. The alignment direction indicated by the arrow E overlaps the optical axis Ax1 of the polarizing plates. A dark line DL is caused in an area in which the alignment direction of the liquid crystal molecules 41 overlaps the optical axis Ax1 of the polarizing plates.

In FIG. 61(e), the liquid crystal molecules 41 in one dark domain DD are aligned in the direction indicated by the arrow F. The liquid crystal molecules 41 in the other dark domain DD in which the alignment direction stops changing are aligned in the direction indicated by the arrow B, which is achieved by rotating the arrow F by 180 degrees counterclockwise or clockwise. The liquid crystal molecules 41 are aligned in the direction indicated by an arrow E or G, which is achieved by rotating the arrow F by 45 degrees counterclockwise or clockwise, halfway at the boundary between the two dark domains DD. The alignment direction indicated by an arrow C or A overlaps the optical axis Ax2 or Ax1 of the polarizing plates. A dark line DL is caused in an area in which the alignment direction of the liquid crystal molecules 41 overlaps the optical axis Ax2 or Ax1 of the polarizing plates.

The liquid crystal molecules 41 are also aligned in the direction indicated by the arrow C or A, which is achieved by rotating the arrow F by 135 degrees counterclockwise or clockwise, halfway at the boundary. The alignment direction indicated by the arrow C or A overlaps the optical axis Ax2 or Ax1 of the polarizing plates. A second dark line DL is therefore caused in an area in which the alignment direction of the liquid crystal molecules 41 overlaps the optical axis Ax2 or Ax1 of the polarizing plates.

In FIG. 61(f), the liquid crystal molecules 41 in one dark domain DD are aligned in the direction indicated by the arrow F. The liquid crystal molecules 41 in the other dark domain DD in which the alignment direction stops changing are aligned in the direction indicated by the arrow A, which is achieved by rotating the arrow F by 135 degrees clockwise. The liquid crystal molecules 41 are aligned in the direction indicated by the arrow G, which is achieved by rotating the arrow F by 45 degrees counterclockwise, halfway at the boundary between the two dark domains DD. The alignment direction of the arrow G overlaps the optical axis Ax2 of the polarizing plates. A dark line DL is caused in an area in which the alignment direction of the liquid crystal molecules 41 overlaps the optical axis Ax2 of the polarizing plates.

In FIG. 61(g), the liquid crystal molecules 41 in the dark domain DD in which the alignment direction begins to change are aligned in the direction indicated by the arrow F. The liquid crystal molecules 41 in the other dark domain DD in which the alignment direction stops changing are aligned in the direction indicated by the arrow H, which is achieved by rotating the arrow F by 90 degrees clockwise. The liquid crystal molecules 41 are aligned in the direction indicated by the arrow G, which is achieved by rotating the arrow F by 45 degrees counterclockwise, halfway at the boundary between the two dark domains. The alignment direction indicated by the arrow G overlaps the optical axis Ax2 of the polarizing plates. A dark line DL is caused in an area in which the alignment direction of the liquid crystal molecules 41 overlaps the optical axis Ax2 of the polarizing plates.

In FIG. 61(h), the liquid crystal molecules 41 in the dark domain DD in which the alignment direction begins to change are aligned in the direction indicated by the arrow F. The liquid crystal molecules 41 in the other dark domain DD in which the alignment direction stops changing are aligned in the direction indicated by the arrow G, which is achieved by rotating the arrow F by 45 degrees clockwise.

Although the number of dark lines DL in FIGS. 61(c), (d), (f), and (g) is the same, namely one, the area of the dark line DL is larger and transparency is lower in FIGS. 61(d) and (f), in which an alignment change angle is larger, namely 135 degrees, than in FIGS. 61(c) and (g), in which an alignment change angle is smaller, namely 90 degrees. This is because transparency becomes highest when the liquid crystal molecules 41 are aligned in the direction indicated by the arrow F, D, or H and decreases as the amount of deviation from the direction indicated by the arrow F, D, or H becomes larger and an area deviated from the direction indicated from the arrow F, D, or H becomes larger.

Figure 62:
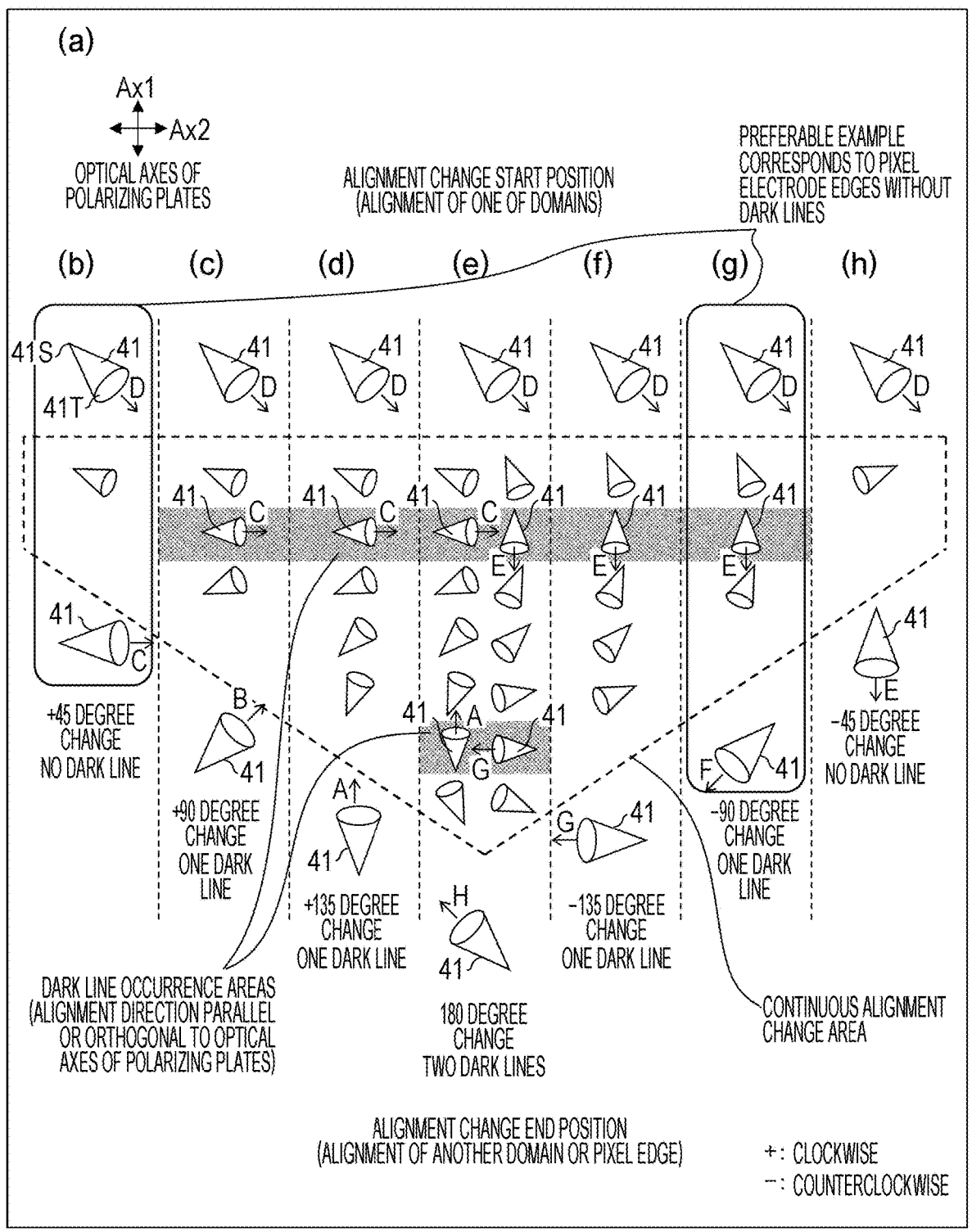
FIG. 62(a) is a diagram illustrating the optical axes of the polarizing plates of the liquid crystal panel according to the embodiment, and (b) to (h) are diagrams illustrating a mechanism of occurrence of dark lines based on changes in the alignment directions of the liquid crystal molecules of the liquid crystal panel.

FIG. 62(a) is a diagram illustrating the optical axes Ax1 and Ax1 of the polarizing plates of the liquid crystal panel according to the embodiment. (b) to (h) are diagrams illustrating a mechanism of occurrence of dark lines DL based on changes in the alignment directions of the liquid crystal molecules 41 of the liquid crystal panel.

In FIG. 62(b), the liquid crystal molecules 41 in the dark domain DD in which the alignment direction begins to change are aligned in the direction indicated by the arrow D. The liquid crystal molecules 41 in the other dark domain DD in which the alignment direction stops changing are aligned in the direction indicated by an arrow C, which is achieved by rotating the arrow D by 45 degrees counterclockwise.

In FIG. 62(c), the liquid crystal molecules 41 in the dark domain DD in which the alignment direction begins to change are aligned in the direction indicated by the arrow D. The liquid crystal molecules 41 in the other dark domain DD in which the alignment direction stops changing are aligned in the direction indicated by the arrow B, which is achieved by rotating the arrow D by 90 degrees counterclockwise. The liquid crystal molecules 41 are aligned in the direction indicated by the arrow C, which is achieved by rotating the arrow D by 45 degrees counterclockwise, halfway at the boundary between the two dark domains DD. The alignment direction indicated by the arrow C overlaps the optical axis Ax2 of the polarizing plates. A dark line DL is caused in an area in which the alignment direction of the liquid crystal molecules 41 overlaps the optical axis Ax2 of the polarizing plates.

In FIG. 62(d), the liquid crystal molecules 41 in one dark domain DD are aligned in the direction indicated by the arrow D. The liquid crystal molecules 41 in the other dark domain DD in which the alignment direction stops changing are aligned in the direction indicated by an arrow A, which is achieved by rotating the arrow D by 135 degrees clockwise. The liquid crystal molecules 41 are aligned in the direction indicated by the arrow C, which is achieved by rotating the arrow D by 45 degrees counterclockwise, halfway at the boundary between the two dark domains DD. The alignment direction indicated by the arrow C overlaps the optical axis Ax2 of the polarizing plates. A dark line DL is caused in an area in which the alignment direction of the liquid crystal molecules 41 overlaps the optical axis Ax2 of the polarizing plates.

In FIG. 62(e), the liquid crystal molecules 41 in one dark domain DD are aligned in the direction indicated by the arrow D. The liquid crystal molecules 41 in the other dark domain DD in which the alignment direction stops changing are aligned in the direction indicated by the arrow H, which is achieved by rotating the arrow D by 180 degrees counterclockwise or clockwise. The liquid crystal molecules 41 are aligned in the direction indicated by an arrow C or E, which is achieved by rotating the arrow D by 45 degrees counterclockwise or clockwise, halfway at the boundary between the two dark domains DD. A dark line DL is therefore caused for the same reason as described above. The liquid crystal molecules 41 are also aligned in the direction indicated by the arrow A or G, which is achieved by rotating the arrow D by 135 degrees counterclockwise or clockwise, halfway at the boundary. The alignment direction indicated by the arrow A or G overlaps the optical axis Ax1 or Ax2 of the polarizing plates. A second dark line DL is therefore caused in an area in which the alignment direction of the liquid crystal molecules 41 overlaps the optical axis Ax1 or Ax2 of the polarizing plates.

In FIG. 62(f), the liquid crystal molecules 41 in one dark domain DD are aligned in the direction indicated by the arrow D. The liquid crystal molecules 41 in the other dark domain DD in which the alignment direction stops changing are aligned in the direction indicated by the arrow G, which is achieved by rotating the arrow D by 135 degrees clockwise. The liquid crystal molecules 41 are aligned in the direction indicated by the arrow E, which is achieved by rotating the arrow D by 45 degrees counterclockwise, halfway at the boundary between the two dark domains DD. The alignment direction indicated by the arrow E overlaps the optical axis Ax1 of the polarizing plates. A dark line DL is caused in an area in which the alignment direction of the liquid crystal molecules 41 overlaps the optical axis Ax1 of the polarizing plates.

In FIG. 62(g), the liquid crystal molecules 41 in the dark domain DD in which the alignment direction begins to change are aligned in the direction indicated by the arrow D. The liquid crystal molecules 41 in the other dark domain DD in which the alignment direction stops changing are aligned in the direction indicated by the arrow F, which is achieved by rotating the arrow D by 90 degrees clockwise. The liquid crystal molecules 41 are aligned in the direction indicated by the arrow E, which is achieved by rotating the arrow D by 45 degrees counterclockwise, halfway at the boundary between the two dark domains. The alignment direction indicated by the arrow E overlaps the optical axis Ax1 of the polarizing plates. A dark line DL is caused in an area in which the alignment direction of the liquid crystal molecules 41 overlaps the optical axis Ax1 of the polarizing plates.

In FIG. 62(h), the liquid crystal molecules 41 in the dark domain DD in which the alignment direction begins to change are aligned in the direction indicated by the arrow D. The liquid crystal molecules 41 in the other dark domain DD in which the alignment direction stops changing are aligned in the direction indicated by the arrow E, which is achieved by rotating the arrow D by 45 degrees clockwise.

Although the number of dark lines DL in FIGS. 62(c), (d), (f), and (g) is the same, namely one, the area of the dark line DL is larger and transparency is lower in FIGS. 62(d) and (f), in which an alignment change angle is larger, namely 135 degrees, than in FIGS. 62(c) and (g), in which an alignment change angle is smaller, namely 90 degrees. This is because transparency becomes highest when the liquid crystal molecules 41 are aligned in the direction indicated by the arrow F, D, or H and decreases as the amount of deviation from the direction indicated by the arrow F, D, or H becomes larger and an area deviated from the direction indicated from the arrow F, D, or H becomes larger.

As described above, when an angle between the alignment direction, which is indicated by the arrow F or D, of the liquid crystal molecules 41 in the dark domain DD in which the alignment direction begins to change and the optical axis Ax1 or Ax1 of the polarizing plates is 45 degrees and a change in the alignment direction of the liquid crystal molecules 41 between the two dark domains DD is equal to or larger than 0 degree but smaller than 45 degrees, no dark lines DL are caused. When the change in the alignment direction of the liquid crystal molecules 41 is equal to or larger than 45 degrees but smaller than 135 degrees, one dark line DL is caused. When the change in the alignment direction of the liquid crystal molecules 41 is equal to or larger than 135 degrees but smaller than 180 degrees, two dark lines DL are caused.

A decrease in the transparency of a dark line area becomes smaller as the change in the alignment direction of the liquid crystal molecules 41 between the two dark domains DD becomes smaller.

Figure 63:
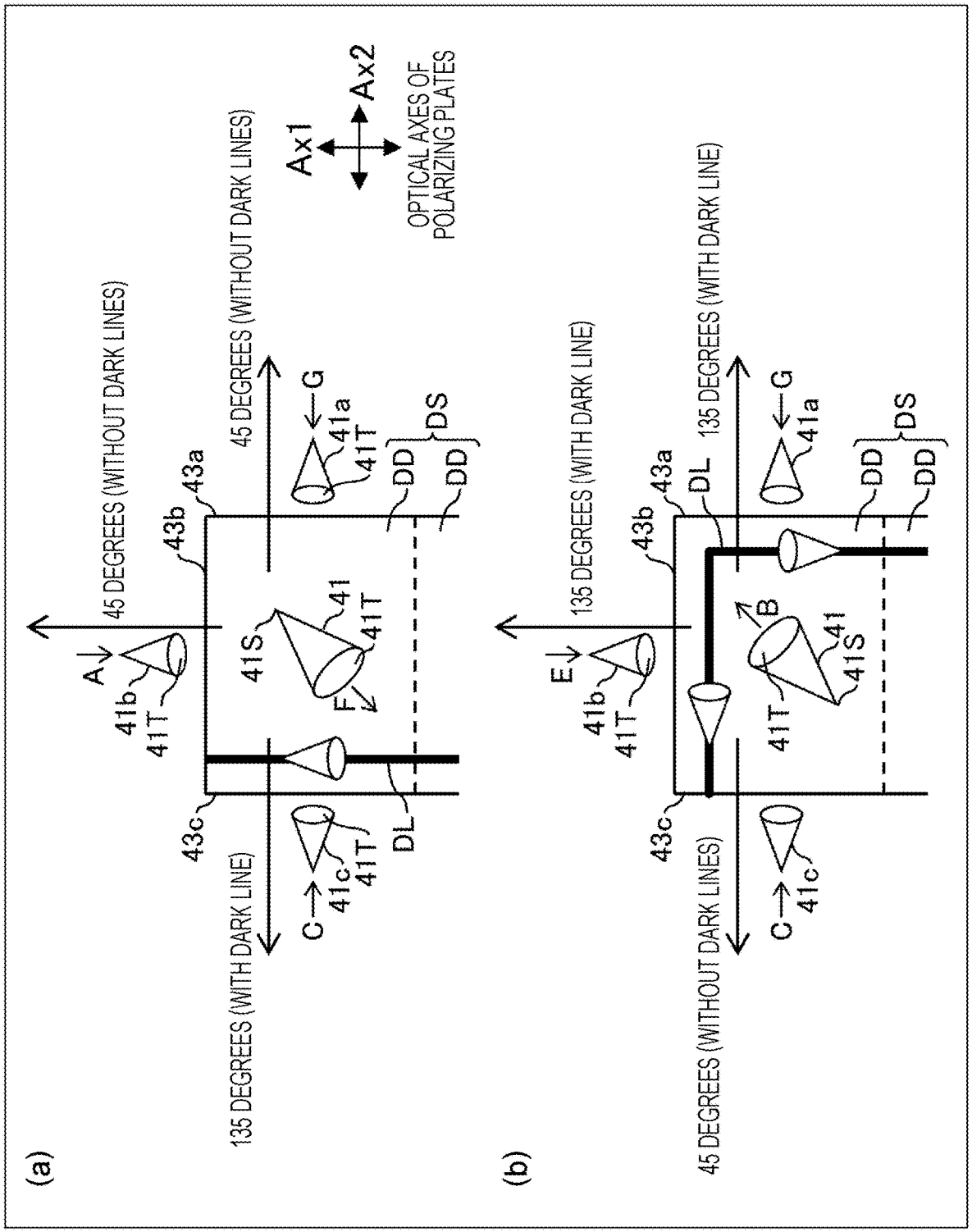
FIGS. 63(a) and (b) are diagrams illustrating relationships between the alignment directions of the liquid crystal molecules and pixel electrode edges of two-domain dark subpixels.

FIGS. 63(a) and (b) are diagrams illustrating a relationship between the alignment direction of the liquid crystal molecules 41 and the domain boundary of the two-domain dark subpixel DS including two domains.

Alignment directions of liquid crystal molecules 41a, 41b, and 41c provided at positions corresponding to edges of a pixel electrode (dark subpixel DS) are, due to an effect of electric fields, perpendicular to the corresponding edges of the pixel electrode with final points 41T directed to the pixel electrode.

As illustrated in FIG. 63(a), if the alignment direction of the liquid crystal molecules 41 in a bright domain DD is the direction indicated by the arrow F, that is, a final point 41T is directed to a boundary line 42 between the two dark domains DD, a change in the alignment direction from the liquid crystal molecules 41 to the liquid crystal molecules 41a through a side 43a is 45 degrees, and no dark lines DL are caused along the side 43a. A change in the alignment direction from the liquid crystal molecules 41 to the liquid crystal molecules 41b through a side 43b, too, is 45 degrees, and no dark lines DL are caused along the side 43b. A change in the alignment direction from the liquid crystal molecules 41 to the liquid crystal molecule 41c through a side 43c is 135 degrees, and a dark line DL is caused halfway along the side 43c.

As described above, when the final points 41T of the liquid crystal molecules 41 in the bright domain DD are directed to the boundary line 42 between the dark domains DD, occurrence of dark lines DL is avoided at the two sides 43a and 43b among the three sides 43a, 43b, and 43c of the pixel electrode, which is desirable.

As illustrated in FIG. 63(b), on the other hand, when the alignment direction of the liquid crystal molecules 41 in the bright domain DD is the direction indicated by the arrow B, that is, initial points 41S are directed to the boundary line 42 between the two dark domains DD, a change in the alignment direction of the liquid crystal molecules undesirably becomes 135 degrees at the two sides 43a and 43b among the three sides 43a, 43b, and 43c of the pixel electrode. As a result, a dark line DL is caused at the two sides 43a and 43b among the three sides 43a, 43b, and 43c.

When two bright domains DD are arranged in a line, it is impossible to set the change in an alignment direction of liquid crystal molecules to smaller than 45 degrees, with which no dark lines DL are caused, at all of the three sides 43a, 43b, and 43c. A configuration in which no dark lines DL are caused at the two sides 43a and 43b among the three sides 43a, 43b, and 43c is the best configuration.

(Effects of Embodiment)

Figure 64:
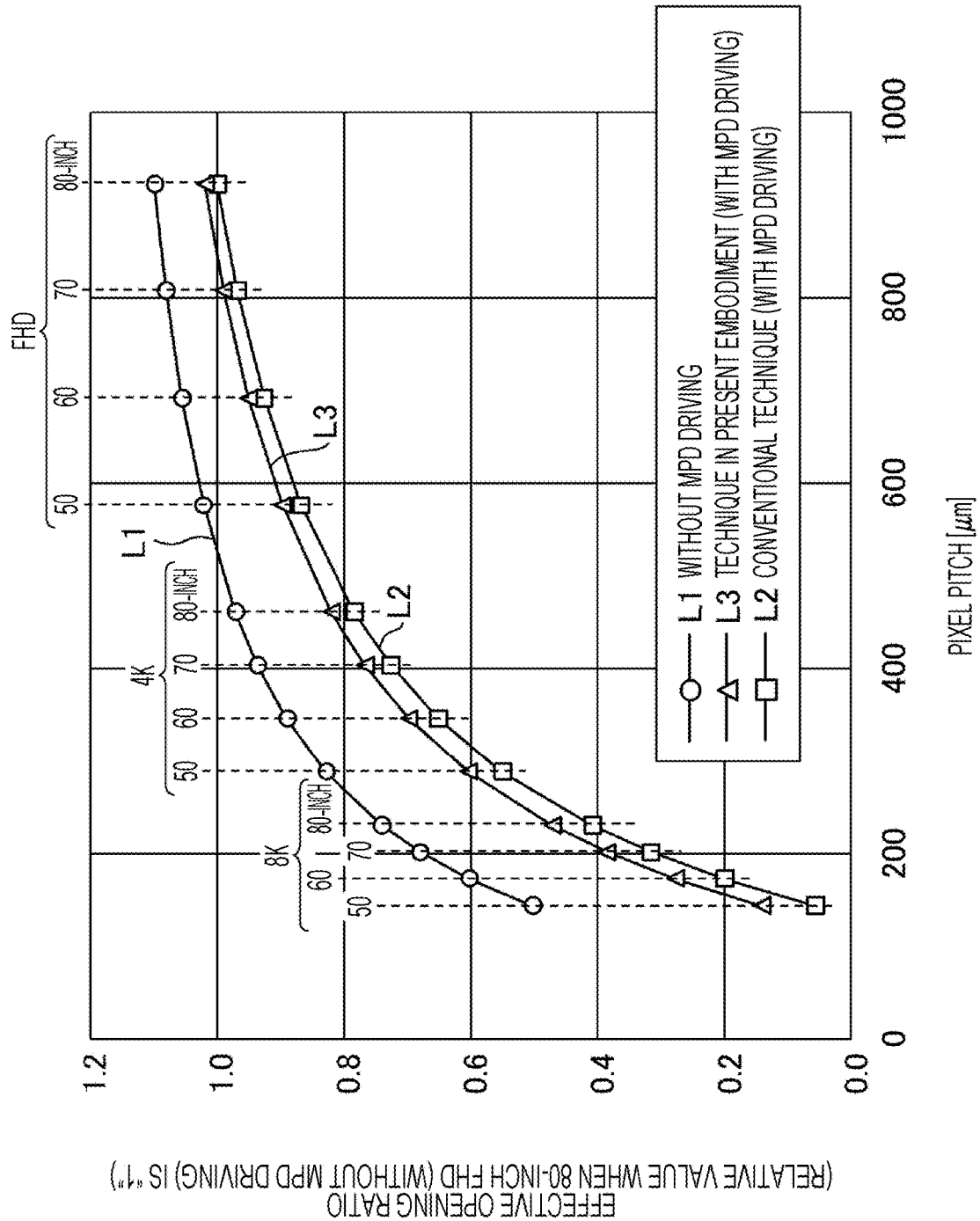
FIG. 64 is a graph illustrating a relationship between the pixel resolution and an effective opening ratio of the liquid crystal panel according to the embodiment.

FIG. 64 is a graph illustrating a relationship between the pixel resolution and an effective opening ratio of the liquid crystal panel according to the embodiment. A horizontal axis represents the pixel pitch of the liquid crystal panel, and a vertical axis represents the effective opening ratio of the liquid crystal panel at a time when the effective opening ratio of an 80-inch FHD without MPD driving is 1. FIG. 65 is a graph illustrating a relationship between the pixel resolution and an effect of improving the effective opening ratio according to the embodiment. A horizontal axis represents the pixel pitch of the liquid crystal panel, and the vertical axis represents an effective opening ratio improvement ratio at a time when the effective opening ratio of a liquid crystal panel (with MPD driving) according to a conventional technique at each pixel pitch is 1.

As illustrated in FIG. 64, when MPD driving is performed, the effective opening ratio decreases from a curve L1 to curve L2 as resolution improves, that is, as the pixel pitch becomes smaller. With the liquid crystal panel according to the embodiment, an effect of suppressing a decrease in the effective opening ratio is produced as indicated by a curve L3.

As illustrated in FIG. 65, with the liquid crystal panel according to the embodiment, the effective opening ratio is improved to a curve L5 in contrast to the effective opening ratio according to the conventional technique (with MPD driving) while still performing MPD driving. As resolution improves, the effect of improving the effective opening ratio of the liquid crystal panel improves. The effect of improving the effective opening ratio is significant especially in a field of 8K. Although a curve L4 indicates an even greater effect of improving the effective opening ratio, viewing angle performance is poor due to absence of MPD driving. It is therefore difficult to employ this method in the field of 8K, where high performance and a high added-value are required.

FIG. 66 is a diagram illustrating viewing angle characteristics and transparency of the liquid crystal panel according to the embodiment. One of important performance items of a liquid crystal panel is viewing angle performance. Because the viewing angle performance of a liquid crystal panel employing a VA method is problematic especially with a low to intermediate tone, it is important to improve the viewing angle performance with a low to intermediate tone.

Bright subpixels BS greatly affect the viewing angle characteristics of a liquid crystal panel with a low to intermediate tone, and dark subpixels DS hardly contribute to the viewing angle characteristics. By maintaining each of the bright subpixels BS at four bright domains BD (four domains), therefore, an effect of improving viewing angles based on introduction of an MVA method and an MPD technique can be maintained.

Another important performance item of a liquid crystal panel is optical transmission efficiency, more specifically transparency in a white display state. The transparency in the white display state is equally affected by bright subpixels DS and dark subpixels DS in white display, or more greatly affected by dark subpixels DS. The transparency may be maximized in white display, and dark lines of dark subpixels DS may be minimized. In the present embodiment, therefore, the number of dark lines is decreased by decreasing the number of dark domains DD of each dark subpixel DS, and accordingly a decrease in the transparency is suppressed.

Figure 67:
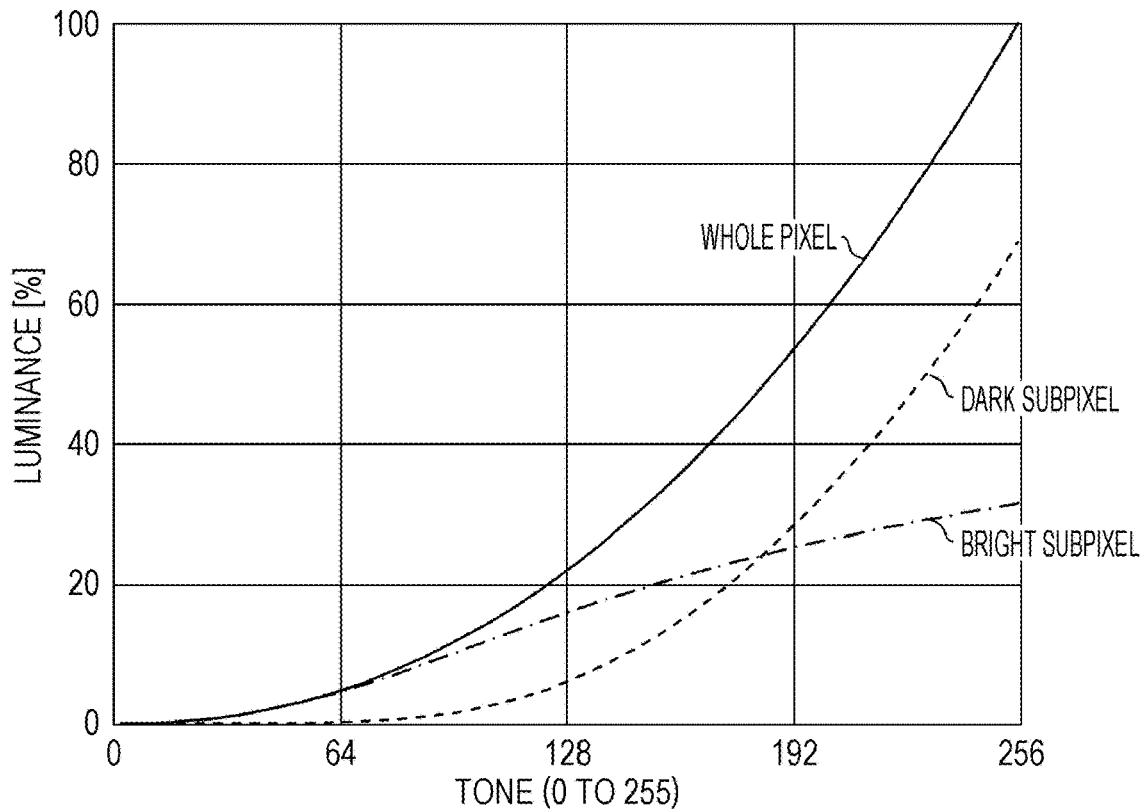
FIG. 67 is a graph illustrating an example of the luminance of a whole pixel, a bright subpixel, and a dark subpixel of the liquid crystal panel according to the embodiment.
Figure 68:
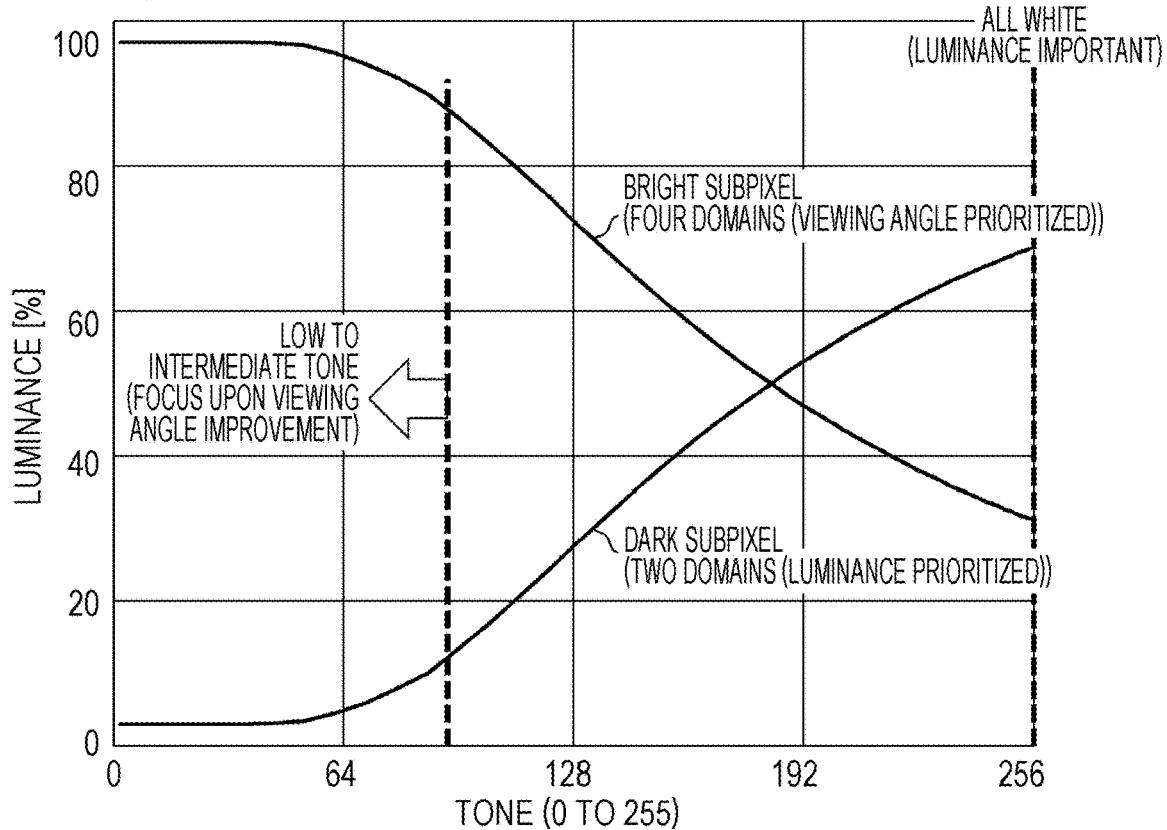
FIG. 68 is a graph illustrating an example of luminance distribution percentages of a bright subpixel and a dark subpixel at a time when the transparency of a whole pixel of the liquid crystal panel with each tone is 100% according to the embodiment.

FIG. 67 is a graph illustrating an example of the luminance of a whole pixel P, a bright subpixel BS, and a dark subpixel DS of the liquid crystal panel according to the embodiment. A horizontal axis represents a tone (0 to 255) of display data of the pixel P of the liquid crystal panel, and a vertical axis represents the luminance (%) at a time when the luminance of the whole pixel P with a tone of 255 (white display) is 100%. FIG. 68 is a graph illustrating an example of luminance distribution percentages of a bright subpixel BS and a dark subpixel DS at a time when the transparency of a whole pixel P of the liquid crystal panel with each tone is 100% according to the embodiment. A horizontal axis represents a tone (0 to 255) of display data of the pixel of the liquid crystal panel, and a vertical axis represents the luminance distribution percentage (%).

In the case of low to intermediate tone display, in which the effect of improving viewing angles is focused upon, the luminance of the bright subpixel BS, which is maintained at four bright domains BD (four domains), is dominant over that of the dark subpixel DS.

Because a percentage of the luminance of the dark subpixel DS increases in all white display, a decrease in transparency is suppressed by improving the luminance with the dark subpixel DS, in which the number of dark domains DD is decreased to two (two domains).

FIG. 69 is a diagram illustrating the resolution, viewing angles, and luminance of the liquid crystal panels according to the embodiment and in the comparative example. Nine graphs in which the liquid crystal panel according to the present embodiment, the liquid crystal panel according to the conventional technique, and a liquid crystal panel without MPD driving are rated in terms of resolution, viewing angle characteristics, and luminance for resolutions of 8K, 4K, and FHD are shown.

An effect of the liquid crystal panel according to the present embodiment upon the liquid crystal panel according to the conventional technique and the liquid crystal panel without MPD driving is observed with a resolution of 4K or higher, and an overwhelming effect is produced with a resolution of 8K.

Figure 70:
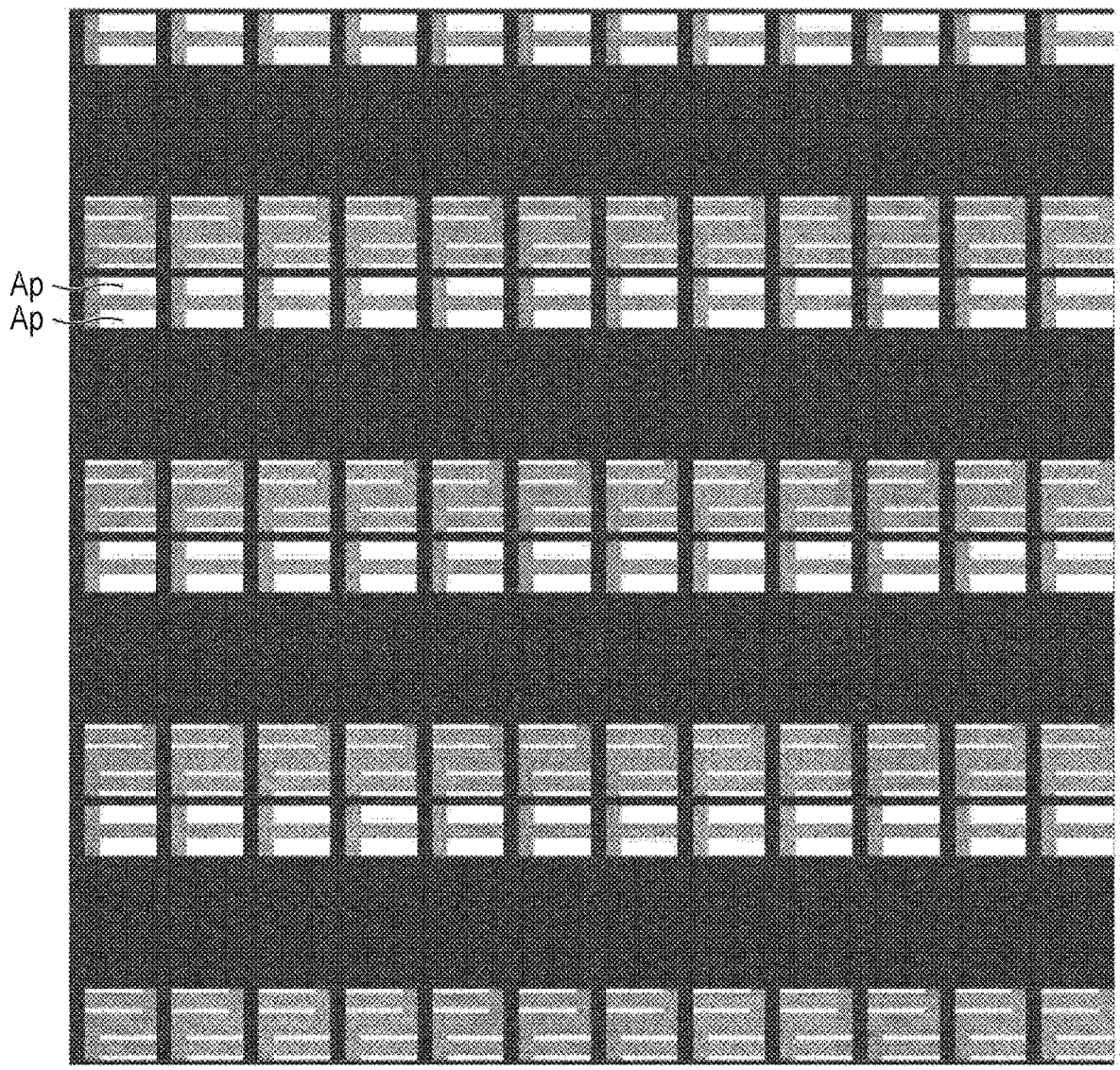
FIG. 70 is a diagram illustrating an image of openings of an 8K liquid crystal panel with MVA and MPD according to the embodiment.
Figure 71:
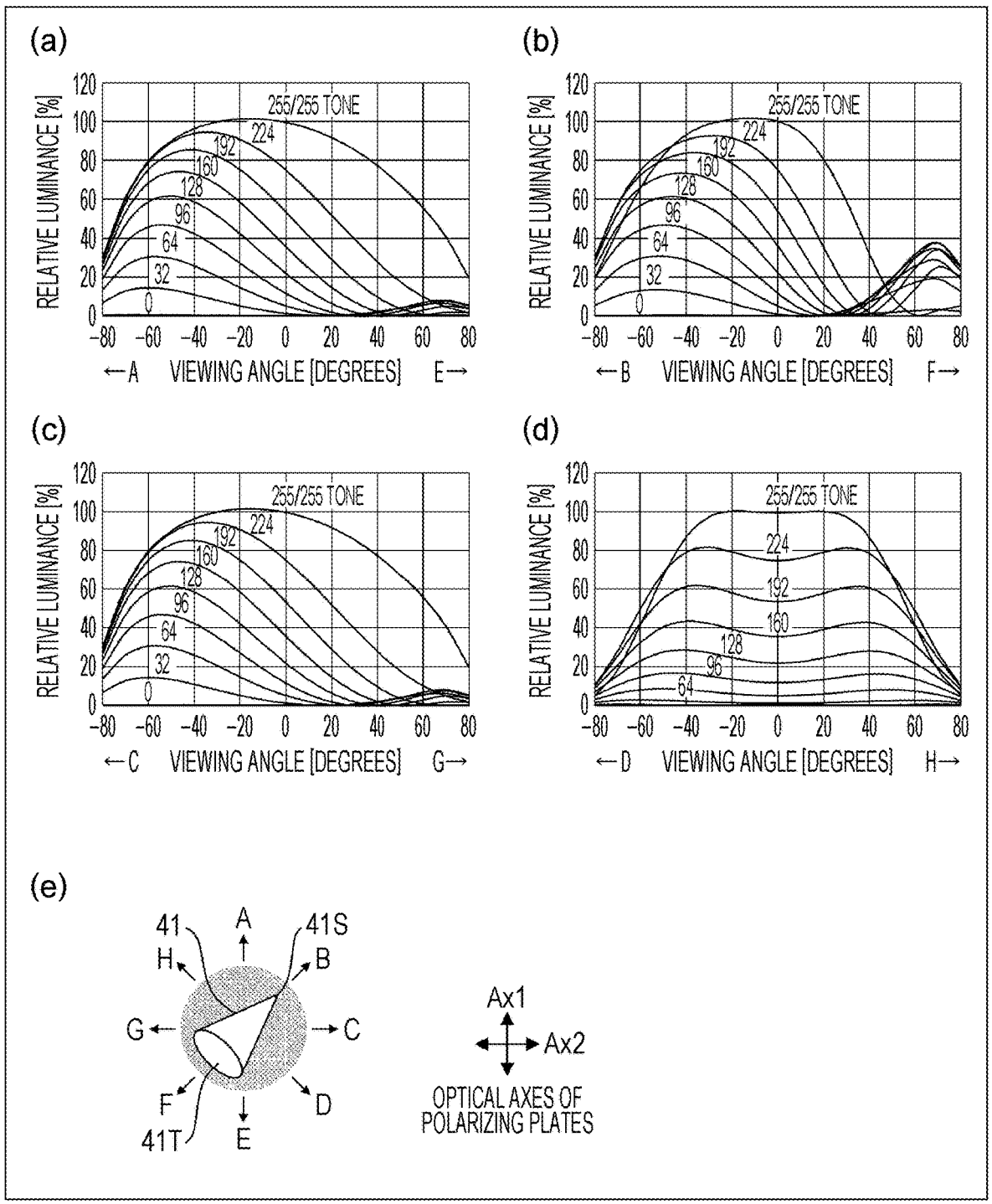
FIG. 71(a) to (d) are graphs illustrating relationships between viewing angles and relative luminance in a conventional single-domain VA method, and (e) is a diagram illustrating a tilt direction of a liquid crystal molecule in the single-domain VA method.
Figure 72:
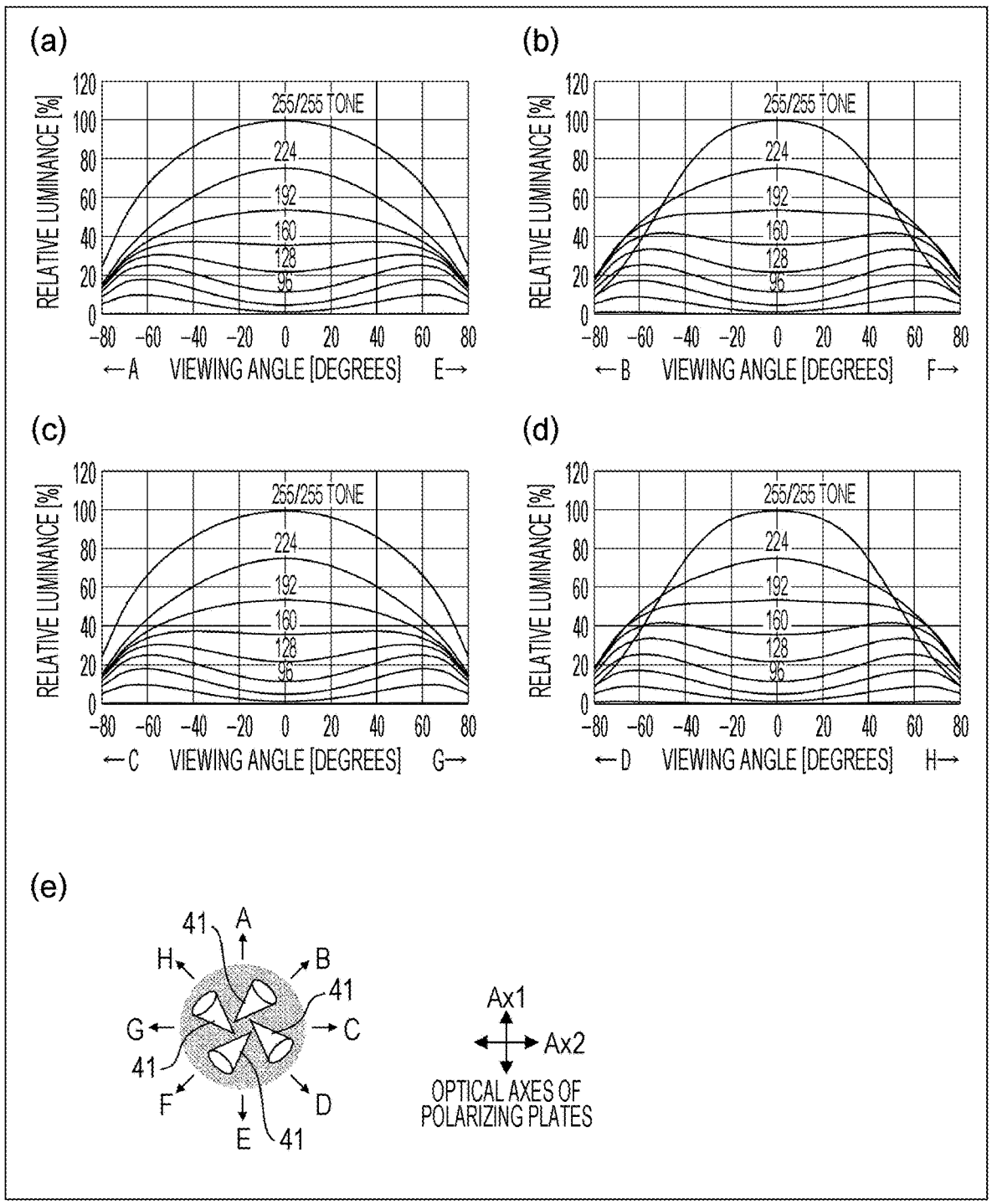
FIG. 72(a) to (d) are graphs illustrating relationships between viewing angles and relative luminance in a conventional MVA method, and (e) is a diagram illustrating a tilt direction of a liquid crystal molecule in the MVA method.
Figure 73:
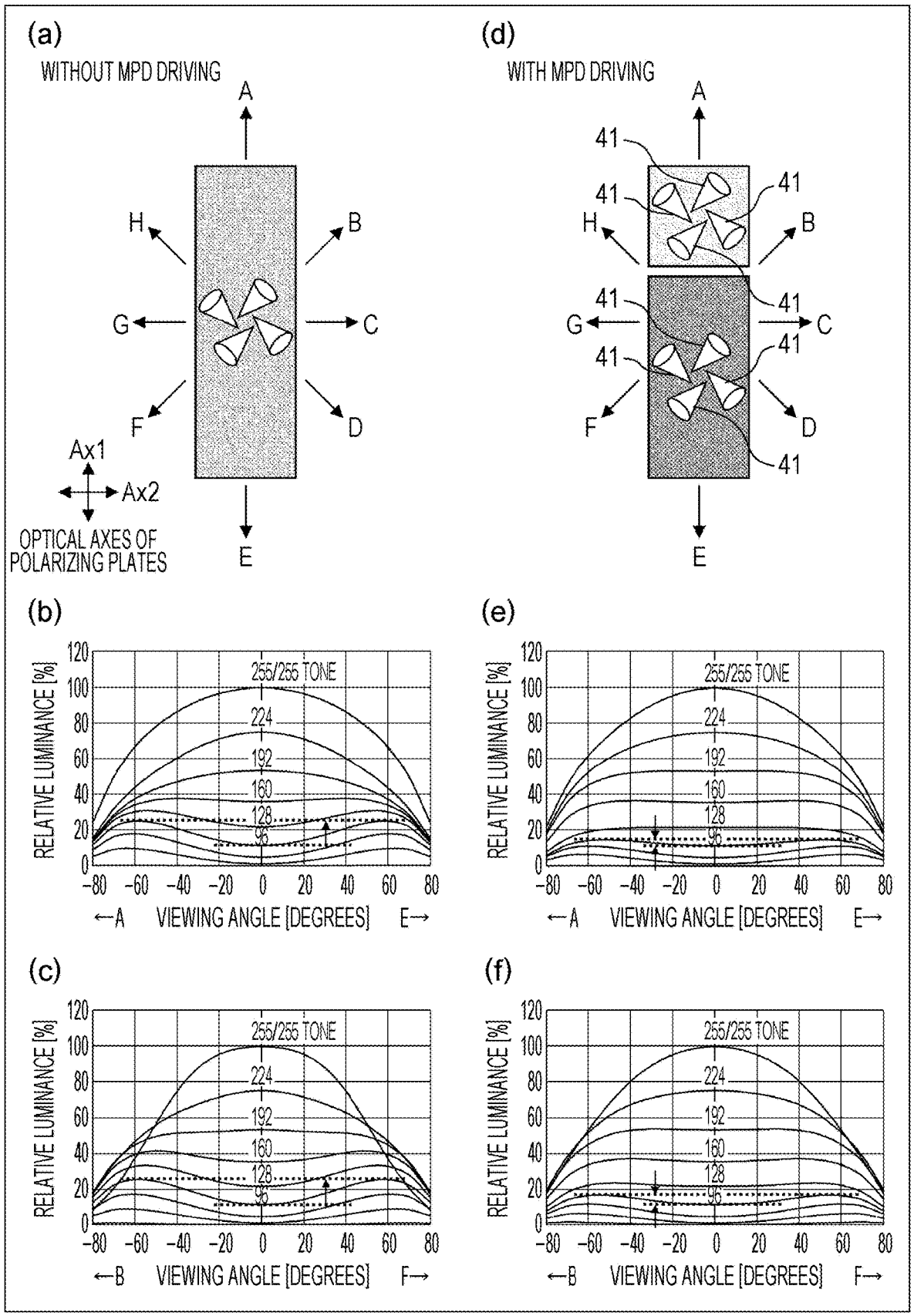
FIG. 73(a) is a diagram illustrating tilt directions of liquid crystal molecules without an MPD technique, (b) and (c) are graphs illustrating relationships between viewing angles and relative luminance without the MPD technique, (d) is a diagram illustrating tilt directions of liquid crystal molecules with the MPD technique, and (e) and (f) are graphs illustrating relationships between viewing angles and relative luminance with the MPD technique.
Figure 74:
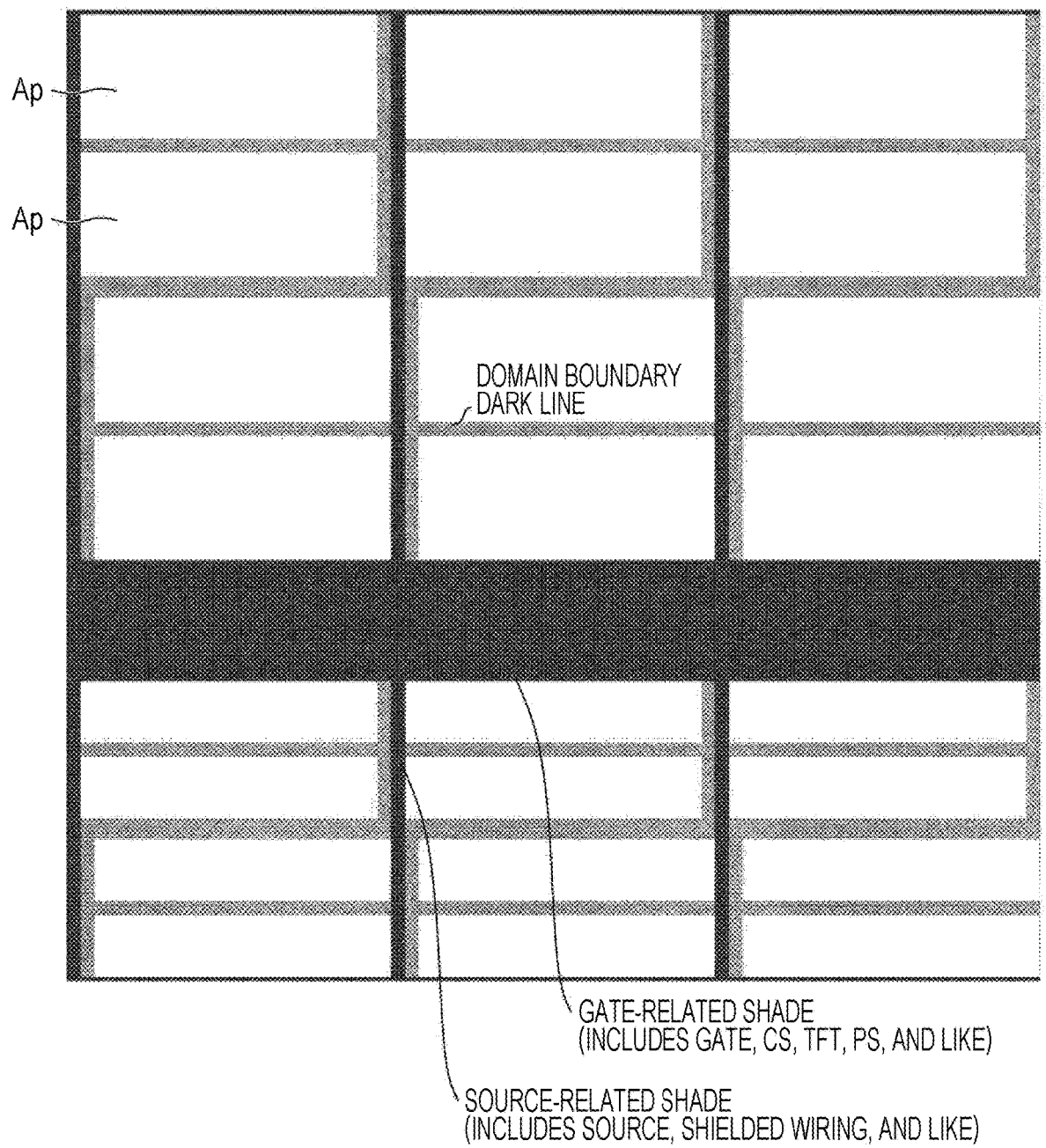
FIG. 74 is a diagram illustrating an image of openings in FHD with MVA and MPD after an increase in resolution.
Figure 75:
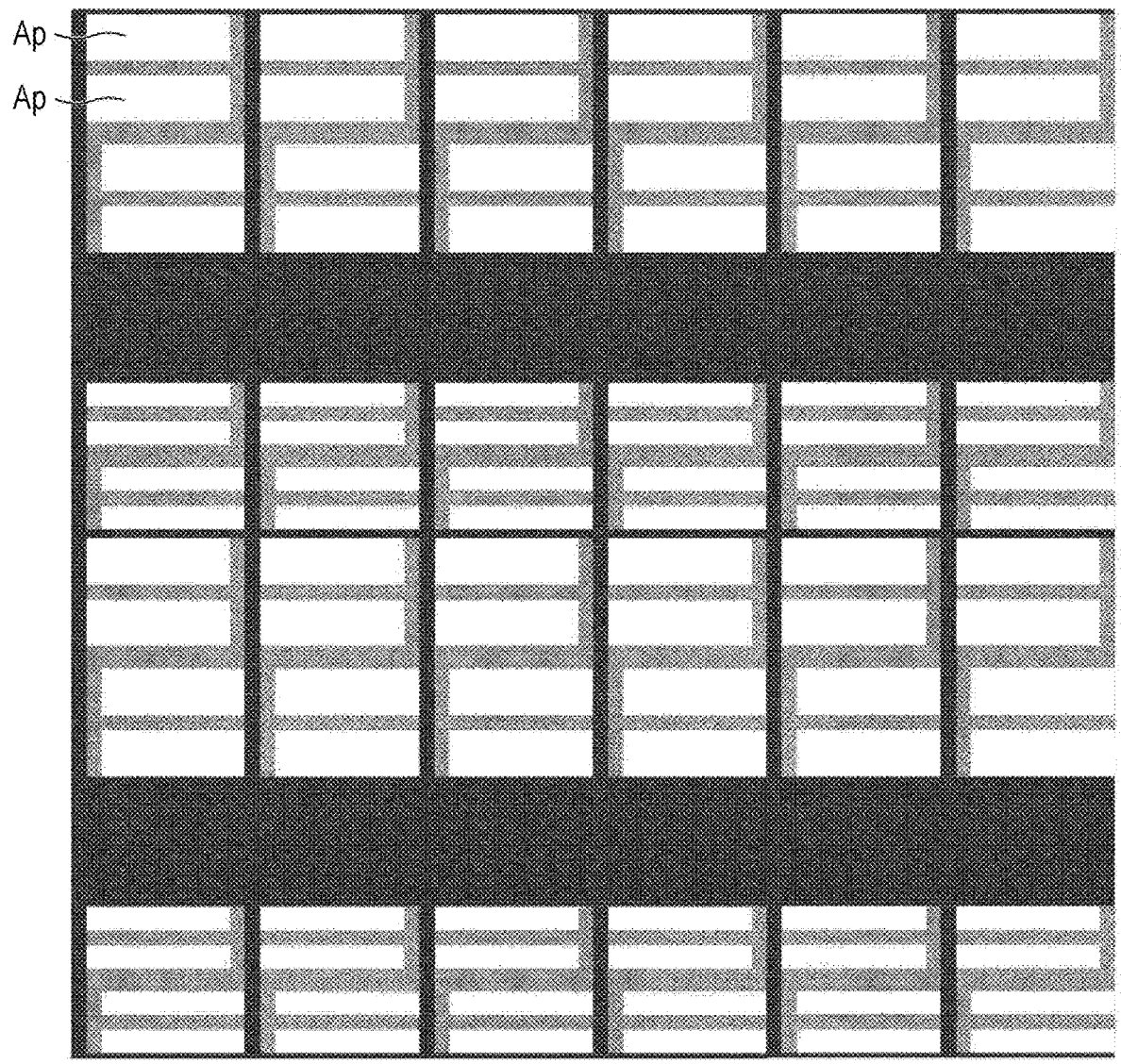
FIG. 75 is a diagram illustrating an image of openings in 4K with MVA and MPD after an increase in resolution.
Figure 76:
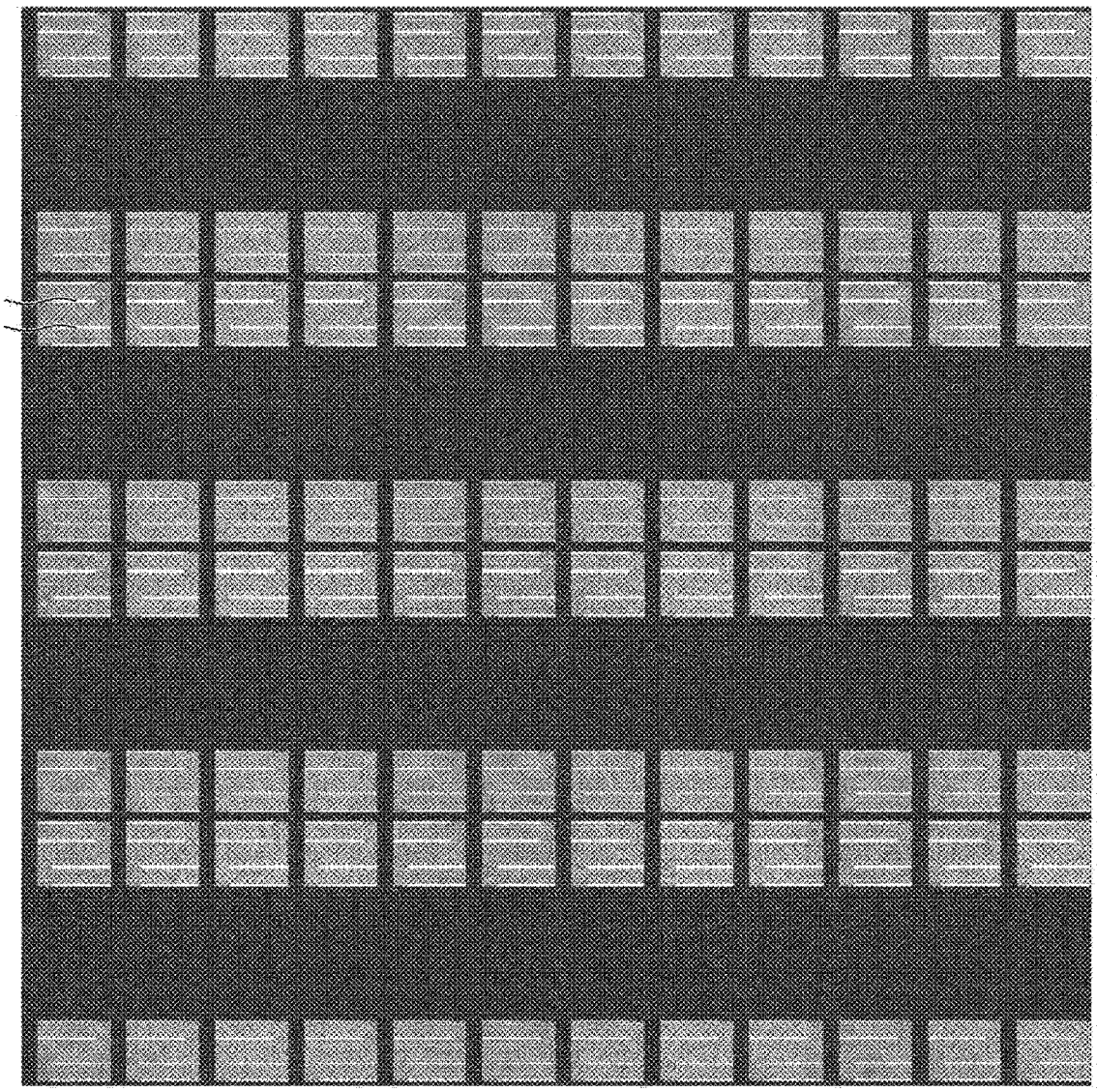
FIG. 76 is a diagram illustrating an image of openings in 8K with MVA and MPD after an increase in resolution.

FIG. 70 is a diagram illustrating an image of openings of an 8K liquid crystal panel with MVA and MPD according to the embodiment. FIG. 70 illustrates an image of openings Ap in 8K at a time when gate wiring-related shades, source wiring-related shades, and alignment domain dark lines have their respective constant widths. The area of the openings Ap is larger than that of the openings Ap reduced as a side effect of the introduction of the MVA method and the MPD technique described with reference to FIG. 76, and a decrease in the transparency is suppressed.

[Summary]

A liquid crystal panel 100 according to a first aspect of the present invention is a liquid crystal panel 100 of a vertical alignment type including a first substrate 30 including a plurality of pixels P arranged in a matrix, a liquid crystal layer 40 including liquid crystal molecules 41, and a second substrate 50 in this order. The plurality of pixels P each correspond to one of three primary colors of light. Each of the plurality of pixels P includes a bright subpixel BS and a dark subpixel DS, luminance of light passing through the dark subpixel DS being lower than luminance of light passing through the bright subpixel BS when the liquid crystal panel displays an intermediate tone. The bright subpixel BS includes M (M≥2) bright domains BD in which alignment directions of the liquid crystal molecules 41 are different from each other. The dark subpixel DS includes (M−1) or less dark domains DD in which alignment directions of the liquid crystal molecules 41 are different from each other.

With this configuration, the number of dark domains in each dark subpixel can be reduced from a conventional configuration while maintaining the number of bright domains in each bright subpixel. As a result, a decrease in transparency can be suppressed while maintaining an effect of improving viewing angles.

A liquid crystal panel 100 according to a second aspect of the present invention is the liquid crystal panel 100 according to the first aspect. The bright subpixel BS and the dark subpixel DS of each of the plurality of pixels P may be arranged side-by-side in a first direction, which is either a column direction or a row direction. The M bright domains BD of the bright subpixel BS of each of the plurality of pixels P may be arranged side-by-side in the first direction. The (M−1) or less dark domains DD of the dark subpixels DS of each of the plurality of pixels P may be arranged side-by-side in the first direction. Alignment directions of liquid crystal molecules 41 in K-th (1≤K≤M) bright domains BD among the M bright domains BD arranged side-by-side in the first direction of the plurality of pixels P arranged side-by-side in a second direction, which is another of the column direction and the row direction, may be the same. Alignment directions of liquid crystal molecules 41 in L-th (1≤L≤(M−1)) dark domains DD among the (M−1) or less dark domains DD arranged side-by-side in the first direction of the plurality of pixels P arranged side-by-side in the second direction may be the same.

With this configuration, graininess caused when the liquid crystal panel is obliquely viewed can be reduced. In addition, a horizontal edge does not look like a zigzag when a horizontal stripe or a horizontal line is viewed obliquely.

A liquid crystal panel 100 according to a third aspect of the present invention is the liquid crystal panel 100 according to the second aspect. The alignment directions of the liquid crystal molecules 41 in the bright domains BD and the alignment directions of the liquid crystal molecules 41 in the dark domains DD may be the same in 88 or more pixels P arranged side-by-side in the second direction.

With this configuration, graininess caused when the liquid crystal panel is obliquely viewed can be reduced over a wider range. In addition, a horizontal edge does not look like a zigzag over a wider range when a horizontal stripe or a horizontal line is viewed obliquely.

A liquid crystal panel 100 according to a fourth aspect of the present invention is the liquid crystal panel 100 according to the first aspect. The M bright domains BD of the bright subpixel BS of each of the plurality of pixels P may be arranged side-by-side in a first direction, which is either a column direction or a row direction. Alignment directions of liquid crystal molecules 41 in K-th (1≤K≤M) bright domains BD among the M bright domains BD arranged side-by-side in the first direction of the plurality of pixels P arranged side-by-side in the first direction may be the same.

With this configuration, repetition intervals of a stripe bright-dark pattern caused when the liquid crystal panel is obliquely viewed with a low to intermediate tone can be minimized, and desirable display quality is achieved.

A liquid crystal panel 100 according to a fifth aspect of the present invention is the liquid crystal panel 100 according to the first aspect. The dark subpixel DS may include two or more dark domains DD. The dark domains DD of the dark subpixel DS of each of the plurality of pixels P may be arranged side-by-side in a first direction, which is either a column direction or a row direction. An angle between alignment directions of liquid crystal molecules 41 in two adjacent dark domains DD may be equal to or smaller than 135 degrees.

With this configuration, occurrence of dark lines in the dark domains of the dark subpixel of each pixel can be suppressed.

A liquid crystal panel 100 according to a sixth aspect of the present invention is the liquid crystal panel 100 according to the fifth aspect. The alignment directions of the liquid crystal molecules in the two adjacent dark domains may be different from each other by 90 degrees.

With this configuration, occurrence of dark lines in the dark domains of the dark subpixel in each pixel can be suppressed. Furthermore, dark line areas can be made thinner, which further increases transparency.

A liquid crystal panel 100 according to a seventh aspect of the present invention is the liquid crystal panel 100 according to the first aspect. The dark subpixel DS may include two dark domains DD. The two dark domains DD of the dark subpixel DS of each of the plurality of pixels P may be arranged side-by-side in a first direction, which is either a column direction or a row direction. A pattern of the alignment directions of the liquid crystal molecules 41 in the two dark domains DD may be repeated in every second pixel P in the first direction of the plurality of pixels P arranged in a matrix.

With this configuration, repetition intervals of a stripe bright-dark pattern caused when the liquid crystal panel is obliquely viewed with an intermediate to high tone can be minimized, and desirable display quality is achieved.

A liquid crystal panel 100 according to an eighth aspect of the present invention is the liquid crystal panel 100 according to the seventh aspect. The pattern of the alignment directions of the liquid crystal molecules 41 in the two dark domains DD may be repeated eight times or more in every second pixel.

With this configuration, repetition intervals of a stripe bright-dark pattern caused when the liquid crystal panel is obliquely viewed with an intermediate to high tone can be minimized over a wider range, and more desirable display quality is achieved.

A liquid crystal panel 100 according to a ninth aspect of the present invention is the liquid crystal panel 100 according to the seventh aspect. Final points 41T of the alignment directions of the liquid crystal molecules 41 of the two dark domains DD may be directed to a boundary line 42 between the two dark domains DD. An angle between the alignment directions of the liquid crystal molecules 41 in the two dark domains DD may be equal to or smaller than 135 degrees.

With this configuration, occurrence of dark lines in the dark domains of the dark subpixel of each pixel can be significantly suppressed, and the transparency of the liquid crystal panel can be improved.

A liquid crystal panel 100 according to a tenth aspect of the present invention is the liquid crystal panel 100 according to the first aspect. The dark subpixel DS may include one dark domain DD. A pattern of the alignment direction of the liquid crystal molecule 41 corresponding to the dark domain DD may be repeated in every fourth pixel in a first direction, which is either a column direction or a row direction, of the plurality of pixels P arranged in a matrix.

With this configuration, repetition intervals of a stripe bright-dark pattern caused when the liquid crystal panel is obliquely viewed with an intermediate to high tone can be minimized while maximizing the transparency by decreasing the number of dark domains DD to one. As a result, desirable display quality is achieved.

A liquid crystal panel 100 according to an eleventh aspect of the present invention is the liquid crystal panel 100 according to the tenth aspect. The pattern of the alignment direction of the liquid crystal molecule 41 corresponding to the dark domain DD may be repeated eight times or more in every fourth pixel.

With this configuration, repetition intervals of a stripe bright-dark pattern caused when the liquid crystal panel is obliquely viewed with an intermediate to high tone can be minimized over a wider range while maximizing the transparency by decreasing the number of dark domains DD to one. As a result, more desirable display quality is achieved.

A liquid crystal panel 100 according to a twelfth aspect of the present invention is the liquid crystal panel 100 according to the first aspect. The dark subpixel DS may include N dark domains DD. When an integral multiple of 4 is denoted by A and a quotient obtained when A is divided by N and a remainder is zero is denoted by B, a pattern of the alignment directions of the liquid crystal molecules 41 in the N dark domains DD may be repeated eight times or more in every B-th pixel in a first direction, which is either a column direction or a row direction, of the plurality of pixels P arranged in a matrix.

With this configuration, repetition intervals of a stripe bright-dark pattern caused when the liquid crystal panel including an arbitrary number of dark domains DD is obliquely viewed with an intermediate to high tone can be minimized, and desirable display quality is achieved.

A liquid crystal panel 100 according to a thirteenth aspect of the present invention is the liquid crystal panel 100 according to the first aspect. The plurality of pixels may be driven by a line inversion driving method, in which polarities of driving of the liquid crystal layer are the same in a first direction, which is either a column direction or a row direction, and different in a second direction, which is another of the column direction and the row direction.

With this configuration, interference between a stipe bright-dark pattern and a polarity inversion pattern caused when the liquid crystal panel is obliquely viewed with an intermediate to high tone can be avoided, and desirable display quality is achieved.

The present invention is not limited to the embodiments described above. The present invention may be modified in various ways within the scope defined by the claims, and the technical scope of the present invention includes embodiments obtained by appropriately combining together technical means disclosed in different embodiments. Furthermore, new technical features can be obtained by combining together technical means disclosed in different embodiments.

REFERENCE SIGNS LIST 30 first substrate
40 liquid crystal layer
41 liquid crystal molecule
41S initial point
41T final point
42 boundary line
50 second substrate
100 liquid crystal panel
P pixel
BS bright subpixel
BD bright domain
DS dark subpixel
DD dark domain

The invention claimed is:

1. A liquid crystal panel of a vertical alignment type comprising:
   a first substrate including a plurality of pixels arranged in a matrix;
   a liquid crystal layer including liquid crystal molecules; and
   a second substrate in this order,
   wherein the plurality of pixels each correspond to one of three primary colors of light,
   wherein each of the plurality of pixels includes a bright subpixel and a dark subpixel, luminance of light passing through the dark subpixel being lower than luminance of light passing through the bright subpixel when the liquid crystal panel displays an intermediate tone,
   wherein the bright subpixel includes M (M≥2) bright domains in which alignment directions of the liquid crystal molecules are different from each other, and
   wherein the dark subpixel includes (M−1) or less dark domains in which alignment directions of the liquid crystal molecules are different from each other.

2. The liquid crystal panel according to claim 1,
   wherein the bright subpixel and the dark subpixel of each of the plurality of pixels are arranged side-by-side in a first direction, which is either a column direction or a row direction,
   wherein the M bright domains of the bright subpixel of each of the plurality of pixels are arranged side-by-side in the first direction,
   wherein the (M−1) or less dark domains of the dark subpixels of each of the plurality of pixels are arranged side-by-side in the first direction,
   wherein alignment directions of liquid crystal molecules in K-th (1≤K≤M) bright domains among the M bright domains arranged side-by-side in the first direction of the plurality of pixels arranged side-by-side in a second direction, which is another of the column direction and the row direction, are the same, and
   wherein alignment directions of liquid crystal molecules in L-th (1≤L≤(M−1)) dark domains among the (M−1) or less dark domains arranged side-by-side in the first direction of the plurality of pixels arranged side-by-side in the second direction are the same.

3. The liquid crystal panel according to claim 2,
   wherein the alignment directions of the liquid crystal molecules in the bright domains and the alignment directions of the liquid crystal molecules in the dark domains are the same in 88 or more pixels arranged side-by-side in the second direction.

4. The liquid crystal panel according to claim 1,
   wherein the M bright domains of the bright subpixel of each of the plurality of pixels are arranged side-by-side in a first direction, which is either a column direction or a row direction, and
   wherein alignment directions of liquid crystal molecules in K-th (1≤K≤M) bright domains among the M bright domains arranged side-by-side in the first direction of the plurality of pixels arranged side-by-side in the first direction are the same.

5. The liquid crystal panel according to claim 1,
   wherein the dark subpixel includes two or more dark domains,
   wherein the dark domains of the dark subpixel of each of the plurality of pixels are arranged side-by-side in a first direction, which is either a column direction or a row direction, and
   wherein an angle between alignment directions of liquid crystal molecules in two adjacent dark domains is equal to or smaller than 135 degrees.

6. The liquid crystal panel according to claim 5,
   wherein the alignment directions of the liquid crystal molecules in the two adjacent dark domains are different from each other by 90 degrees.

7. The liquid crystal panel according to claim 1,
   wherein the dark subpixel includes two dark domains, wherein the two dark domains of the dark subpixel of each of the plurality of pixels are arranged side-by-side in a first direction, which is either a column direction or a row direction, and wherein a pattern of the alignment directions of the liquid crystal molecules in the two dark domains is repeated in every second pixel in the first direction of the plurality of pixels arranged in a matrix.

8. The liquid crystal panel according to claim 7, wherein the pattern of the alignment directions of the liquid crystal molecules in the two dark domains is repeated eight times or more in every second pixel.

9. The liquid crystal panel according to claim 7, wherein final points of the alignment directions of the liquid crystal molecules in the two dark domains are directed to a boundary line between the two dark domains, and wherein an angle between the alignment directions of the liquid crystal molecules in the two dark domains is equal to or smaller than 135 degrees.

10. The liquid crystal panel according to claim 1, wherein the dark subpixel includes one dark domain, and wherein a pattern of the alignment direction of the liquid crystal molecules corresponding to the dark domain is repeated in every fourth pixel in a first direction, which is either a column direction or a row direction, of the plurality of pixels arranged in a matrix.

11. The liquid crystal panel according to claim 10, wherein the pattern of the alignment direction of the liquid crystal molecules corresponding to the dark domain is repeated eight times or more in every fourth pixel.

12. The liquid crystal panel according to claim 1, wherein the dark subpixel includes N dark domains, and wherein, when an integral multiple of 4 is denoted by A and a quotient obtained when A is divided by N and a remainder is zero is denoted by B, a pattern of the alignment directions of the liquid crystal molecules in the N dark domains is repeated eight times or more in every B-th pixel in a first direction, which is either a column direction or a row direction, of the plurality of pixels arranged in a matrix.

13. The liquid crystal panel according to claim 1, wherein the plurality of pixels are driven by a line inversion driving method, in which polarities of driving of the liquid crystal layer are the same in a first direction, which is either a column direction or a row direction, and different in a second direction, which is another of the column direction and the row direction.

* * * * *